US012763848B2

(12) United States Patent
Martin

(10) Patent No.: US 12,763,848 B2
(45) Date of Patent: Oct. 13, 2026

(54) APPARATUS, SYSTEMS AND METHODS FOR PROVIDING EMERGENCY ASSISTANCE COMMUNICATION AND DATA TO EMERGENCY NETWORKS USING A SATELLITE COMMUNICATION SYSTEM

(71) Applicant: RAPIDSOS, INC., New York, NY (US)

(72) Inventor: Michael John Martin, New York, NY (US)

(73) Assignee: RAPIDSOS, INC., New York, NY (US)

( * ) Notice: Subject to any disclaimer, the term of this patent is extended or adjusted under 35 U.S.C. 154(b) by 277 days.

(21) Appl. No.: 18/676,481

(22) Filed: May 28, 2024

(65) Prior Publication Data

US 2024/0396625 A1 Nov. 28, 2024

Related U.S. Application Data

(60) Provisional application No. 63/469,102, filed on May 26, 2023.

(51) Int. Cl.

*H04B 7/185* (2006.01)
*H04W 4/029* (2018.01)
*H04W 4/90* (2018.01)

(52) U.S. Cl.

CPC ........ *H04B 7/18519* (2013.01); *H04W 4/029* (2018.02); *H04W 4/90* (2018.02)

(58) Field of Classification Search

CPC .... H04B 7/18519; H04W 4/029; H04W 4/90; H04W 4/02; H04W 4/00; H04W 76/50;
(Continued)

(56) References Cited

U.S. PATENT DOCUMENTS 5,379,337 A 1/1995 Castillo
5,479,482 A 12/1995 Grimes
(Continued)

FOREIGN PATENT DOCUMENTS

CA 2662606 A1 10/2009
CA 2697986 A1 9/2010
(Continued)

OTHER PUBLICATIONS

Abel et al. Semantics + Filtering + Search = Twitcident exploring information in social web streams. HT'12—Proceedings of 23rd ACM Conference on Hypertext and Social Media (10 pgs) (2012).
(Continued)

*Primary Examiner* — Nimesh Patel
(74) *Attorney, Agent, or Firm* — CYGAN LAW OFFICES PC; Joseph T. Cygan

(57) ABSTRACT

A disclosed method includes: receiving a satellite-initiated alert notification where the satellite-initiated alert is sent from a mobile device; pushing emergency data associated with the satellite-initiated alert to an emergency network entity comprising mobile device location data; displaying the satellite-initiated alert notification in an alarm queue of a cloud-application graphical user interface; monitoring the satellite-initiated alert notification at the cloud-application graphical user interface for an acceptance input indicating acceptance of the satellite-initiated alert notification; and initiating a call to the emergency network if no acceptance input is received within a timeout period.

8 Claims, 37 Drawing Sheets

(58) Field of Classification Search
CPC ..... H04W 12/63; H04W 12/12; H04W 12/64; H04W 4/027; H04W 84/042; G08B 25/008; G08B 27/003; G08B 19/005; G08B 19/00; G08B 25/002; G08B 13/00; G08B 25/10; G08B 21/0211; G08B 21/0227; G08B 21/0283; G08B 21/0288; G08B 25/009; G08B 27/00; G08B 17/10; G08B 26/007; G08B 21/00; G08B 21/043; G08B 25/00; G08B 25/005; G08B 25/016; G08B 17/00; G08B 17/117; G08B 21/02; G08B 21/182; G08B 25/001; Y02D 30/70; H04L 12/2803; H04L 41/0894; H04L 63/102; H04L 63/20; H04M 2242/04; H04M 15/66; H04M 2250/10; H04M 7/0057; H04M 1/72457; H04M 2207/18; H04M 2242/30; H04M 11/04; H04M 2201/38; H04M 3/5116
See application file for complete search history.

(56) References Cited

U.S. PATENT DOCUMENTS 5,563,931 A 10/1996 Bishop
5,596,625 A 1/1997 Leblanc
5,710,803 A 1/1998 Kowal
5,742,666 A 4/1998 Alpert
6,014,555 A 1/2000 Tendler
6,133,853 A 10/2000 Obradovich
6,167,255 A 12/2000 Kennedy, III
6,249,674 B1 6/2001 Verdonk
6,252,943 B1 6/2001 Johnson
6,256,489 B1 7/2001 Lichter
6,262,655 B1 7/2001 Yoshioka
6,292,687 B1 9/2001 Lowell
6,363,138 B1 3/2002 Aprile
6,459,782 B1 10/2002 Bedrosian
6,477,362 B1 11/2002 Raith
6,502,030 B2 12/2002 Hilleary
6,510,315 B1 1/2003 Arnson
6,556,816 B1 4/2003 Gafrick
6,571,092 B2 5/2003 Faccin
6,574,323 B1 6/2003 Manuel
6,587,545 B1 7/2003 Antonucci
6,594,666 B1 7/2003 Biswas
6,600,812 B1 7/2003 Gentillin
6,628,933 B1 9/2003 Humes
6,680,998 B1 1/2004 Bell
6,707,421 B1 3/2004 Drury
6,731,610 B2 5/2004 Sajikawa
6,993,118 B2 1/2006 Antonucci
7,054,611 B2 5/2006 Eisner
7,058,385 B2 6/2006 Lauper
7,076,211 B2 * 7/2006 Donner .................... H04Q 9/00
340/506
7,177,400 B2 2/2007 Eisner
7,224,773 B2 5/2007 Croak
7,271,704 B2 9/2007 McSheffrey
7,313,402 B1 12/2007 Rahman
7,324,801 B2 1/2008 Droste
7,349,706 B2 3/2008 Kim
7,409,044 B2 8/2008 Leduc
7,409,428 B1 8/2008 Brabec
7,436,938 B2 10/2008 Savaglio
7,437,143 B1 10/2008 Williams
7,469,138 B2 12/2008 Dayar
7,483,519 B2 1/2009 Binning
7,519,351 B2 4/2009 Malone, III
7,519,372 B2 4/2009 MacDonald
7,548,158 B2 6/2009 Titus
7,565,131 B2 7/2009 Rollender
7,646,854 B2 1/2010 Anderson
7,676,215 B2 3/2010 Chin
7,684,782 B2 3/2010 Ashley, Jr.
7,848,733 B2 12/2010 Bull
7,937,067 B2 5/2011 Maier
7,949,326 B2 5/2011 Gallagher
8,009,810 B2 8/2011 Seidberg
8,041,335 B2 10/2011 Khetawat
8,041,341 B1 10/2011 Malackowski
8,045,954 B2 10/2011 Barbeau
8,068,881 B2 11/2011 Schrager
8,102,972 B2 1/2012 Poremba
8,126,424 B2 2/2012 Piett
8,150,367 B1 4/2012 Malladi
8,165,560 B2 4/2012 Stenquist
8,165,562 B2 4/2012 Piett
8,185,087 B2 5/2012 Mitchell, Jr.
8,195,121 B2 6/2012 Dunn
8,219,135 B2 7/2012 De Amorim
8,244,205 B2 8/2012 Wu
8,249,546 B1 8/2012 Shah
8,249,547 B1 8/2012 Fellner
8,289,953 B2 10/2012 Ray
8,306,501 B2 11/2012 Moodbidri
8,326,260 B1 12/2012 Bradish
8,369,488 B2 2/2013 Sennett
8,396,970 B2 3/2013 Black
8,401,565 B2 3/2013 Sandberg
8,417,090 B2 4/2013 Fleming
8,417,212 B2 4/2013 Cepuran
8,442,481 B2 5/2013 Maier
8,442,482 B2 5/2013 Maier
8,472,973 B2 6/2013 Lin
8,484,352 B2 7/2013 Piett
8,489,062 B2 7/2013 Ray
8,494,868 B2 7/2013 Saalsaa
8,509,729 B2 8/2013 Shaw
8,516,122 B2 8/2013 Piett
8,538,370 B2 9/2013 Ray
8,538,468 B2 9/2013 Daly
8,588,733 B2 11/2013 Ferguson
8,594,015 B2 11/2013 Dunn
8,606,218 B2 12/2013 Ray
8,625,578 B2 1/2014 Roy
8,626,112 B2 1/2014 Ray
8,630,609 B2 1/2014 Ray
8,644,301 B2 2/2014 Tamhankar
8,649,806 B2 2/2014 Cuff
8,682,279 B2 3/2014 Rudolf
8,682,281 B2 3/2014 Dunn
8,682,286 B2 3/2014 Dickinson
8,712,366 B2 4/2014 Greene
8,747,336 B2 6/2014 Tran
8,751,265 B2 6/2014 Piett
8,755,767 B2 6/2014 Maier
8,760,290 B2 6/2014 Piett
8,761,721 B2 6/2014 Li
8,792,867 B1 7/2014 Negahban
8,811,935 B2 8/2014 Faccin
8,825,687 B2 9/2014 Marceau
8,848,877 B2 9/2014 Seidberg
8,866,606 B1 10/2014 Will
8,868,028 B1 10/2014 Kaltsukis
8,880,021 B2 11/2014 Hawkins
8,890,685 B1 11/2014 Sookman
8,918,075 B2 12/2014 Maier
8,948,732 B1 2/2015 Negahban
8,971,839 B2 3/2015 Hong
8,983,424 B2 3/2015 Binning
8,984,143 B2 3/2015 Serra
9,008,078 B2 4/2015 Kamdar
9,014,657 B2 4/2015 Rohde
9,019,870 B2 4/2015 Khan
9,020,462 B2 4/2015 Hodgson
9,071,643 B2 6/2015 Saito
9,077,676 B2 7/2015 Price
9,078,092 B2 7/2015 Piett
9,094,816 B2 7/2015 Maier
9,129,219 B1 9/2015 Robertson
9,130,963 B2 9/2015 Marshall

(56) References Cited

U.S. PATENT DOCUMENTS 9,167,379 B1 10/2015 Hamilton
9,244,922 B2 1/2016 Marceau
9,258,680 B2 2/2016 Drucker
9,277,389 B2 3/2016 Saito
9,351,142 B2 5/2016 Basore
9,369,847 B2 6/2016 Borghei
9,384,491 B1 7/2016 Briggs
9,402,159 B1 7/2016 Self
9,408,051 B2 8/2016 Finney
9,420,099 B1 8/2016 Krishnan
9,426,304 B2 8/2016 Biage
9,426,638 B1 8/2016 Johnson
9,497,585 B1 11/2016 Cooley
9,503,876 B2 11/2016 Ghen
9,544,260 B2 1/2017 Cuff
9,544,750 B1 1/2017 Self
9,591,467 B2 3/2017 Piett
9,609,128 B2 3/2017 Dahan
9,629,185 B1 4/2017 Gluckman
9,635,534 B2 4/2017 Maier
9,648,479 B2 5/2017 Michaelis
9,659,484 B1 5/2017 Mehta
9,693,213 B2 6/2017 Self
9,734,721 B2 8/2017 Stenneth
9,736,670 B2 8/2017 Mehta
9,756,169 B2 9/2017 Mehta
9,805,430 B2 10/2017 Miasnik
9,838,858 B2 12/2017 Anand
9,877,177 B2 1/2018 Lesage
9,924,043 B2 3/2018 Mehta
9,936,365 B1 4/2018 Elam
9,942,739 B2 4/2018 Bozik
9,986,404 B2 5/2018 Mehta
9,992,655 B2 6/2018 Anand
9,998,507 B2 6/2018 Mehta
10,002,375 B1 6/2018 Scythes
D829,222 S 9/2018 Choi
10,075,834 B1 9/2018 Kodaypak
10,089,854 B2 10/2018 Hender
10,136,294 B2 11/2018 Mehta
10,140,482 B2 11/2018 White
10,140,842 B2 11/2018 Mehta
10,142,213 B1 11/2018 Hart
10,142,469 B2 11/2018 Klaban
10,142,816 B2 11/2018 Cavendish
10,165,431 B2 12/2018 Bozik
10,264,122 B1 4/2019 Jensen
10,375,558 B2 8/2019 Katz
10,419,915 B2 9/2019 Mehta
10,425,799 B2 9/2019 Anand
10,447,865 B2 10/2019 Mehta
10,498,894 B1 * 12/2019 Mongrain ........... H04M 3/5232
10,582,053 B2 3/2020 Jensen
10,582,343 B1 3/2020 Patton
10,657,799 B2 5/2020 Mehta
10,701,541 B2 6/2020 Mehta
10,701,542 B2 6/2020 Martin
10,708,412 B1 7/2020 Killpack
10,771,951 B2 9/2020 Mehta
10,805,786 B2 10/2020 Pellegrini
10,820,181 B2 10/2020 Horelik
10,861,320 B2 12/2020 Martin
10,911,926 B2 2/2021 Pellegrini
10,922,776 B2 2/2021 Kumar
10,977,927 B2 4/2021 Katz
10,999,432 B2 5/2021 Jensen
11,153,742 B1 10/2021 Ekl
11,330,664 B1 5/2022 Martin
11,528,772 B2 12/2022 Horelik
11,539,839 B2 12/2022 Jensen
2001/0051849 A1 12/2001 Boone
2002/0001367 A1 1/2002 Lee
2002/0027975 A1 3/2002 Oxley
2002/0057678 A1 5/2002 Jiang
2002/0120698 A1 8/2002 Tamargo
2003/0069035 A1 4/2003 Shurvinton
2003/0109245 A1 6/2003 McCalmont
2003/0195775 A1 10/2003 Hampton
2004/0166828 A1 8/2004 Yosioka
2004/0190497 A1 * 9/2004 Knox .................. H04M 7/1285
370/352
2004/0203569 A1 10/2004 Jijina
2004/0203572 A1 10/2004 Aerrabotu
2004/0229620 A1 11/2004 Zhao
2004/0266390 A1 12/2004 Faucher
2005/0085215 A1 4/2005 Kokko
2005/0104745 A1 5/2005 Bachelder
2005/0111630 A1 5/2005 Potorny
2005/0151642 A1 7/2005 Tupler
2005/0190892 A1 9/2005 Dawson
2005/0192746 A1 9/2005 King
2005/0220277 A1 10/2005 Blalock
2005/0222829 A1 10/2005 Dumas
2005/0231350 A1 10/2005 Littrell
2005/0239477 A1 10/2005 Kim
2005/0242944 A1 11/2005 Bankert
2005/0282518 A1 12/2005 D'Evelyn et al.
2005/0285181 A1 12/2005 Yasui
2006/0085275 A1 4/2006 Stokes
2006/0087992 A1 * 4/2006 Ganesh .................. G01D 21/00
370/310
2006/0109960 A1 5/2006 D'Evelyn et al.
2006/0154642 A1 7/2006 Scannell, Jr.
2006/0217105 A1 9/2006 Kumar
2006/0265195 A1 11/2006 Woodard
2006/0293024 A1 12/2006 Benco
2007/0003024 A1 1/2007 Olivier
2007/0030144 A1 2/2007 Titus
2007/0030146 A1 2/2007 Shepherd
2007/0033095 A1 2/2007 Hodgin
2007/0049287 A1 3/2007 Dunn
2007/0053308 A1 3/2007 Dumas
2007/0058528 A1 3/2007 Massa
2007/0060097 A1 3/2007 Edge
2007/0161383 A1 7/2007 Caci
2007/0164872 A1 7/2007 Monroe
2007/0171854 A1 7/2007 Chen
2007/0218895 A1 9/2007 Saito
2007/0232328 A1 10/2007 Kramarz-Von Kohout
2008/0019268 A1 1/2008 Rollins
2008/0063153 A1 3/2008 Krivorot
2008/0077474 A1 3/2008 Dumas
2008/0081646 A1 4/2008 Morin
2008/0126535 A1 5/2008 Zhu
2008/0166990 A1 7/2008 Toiv
2008/0194238 A1 8/2008 Kwon
2008/0253535 A1 10/2008 Sherry
2008/0274721 A1 11/2008 Stagnetto
2008/0294058 A1 11/2008 Shklarski
2008/0309486 A1 12/2008 McKenna
2009/0041206 A1 2/2009 Hobby
2009/0094602 A1 4/2009 Ziskind
2009/0134982 A1 5/2009 Robertson
2009/0186596 A1 7/2009 Kaltsukis
2009/0214000 A1 8/2009 Patel
2009/0257345 A1 10/2009 King
2009/0311987 A1 12/2009 Edge
2009/0316683 A1 12/2009 Gass
2009/0322513 A1 12/2009 Hwang
2010/0002846 A1 1/2010 Ray
2010/0003946 A1 1/2010 Ray
2010/0003964 A1 1/2010 Khare
2010/0093305 A1 4/2010 Reich
2010/0156626 A1 6/2010 Story
2010/0159871 A1 6/2010 Tester
2010/0159976 A1 6/2010 Marocchi
2010/0161727 A1 6/2010 Shaffer
2010/0166153 A1 7/2010 Guleria
2010/0190468 A1 7/2010 Scott
2010/0202368 A1 8/2010 Hans
2010/0238018 A1 9/2010 Kelly
2010/0261448 A1 10/2010 Peters
2010/0261492 A1 10/2010 Salafia
2010/0262668 A1 10/2010 Piett

(56) References Cited

U.S. PATENT DOCUMENTS

2010/0317317 A1 12/2010 Maier
2011/0009086 A1 1/2011 Poremba
2011/0029600 A1 2/2011 Theimer
2011/0071880 A1 3/2011 Spector
2011/0086607 A1 4/2011 Wang
2011/0103266 A1 5/2011 Andreasen
2011/0134897 A1 6/2011 Montemurro
2011/0151829 A1 6/2011 Velusamy
2011/0153368 A1 6/2011 Pierre
2011/0201357 A1 8/2011 Garrett
2011/0263219 A1 10/2011 Hasenfang
2011/0263319 A1 10/2011 Hamalainen
2012/0002792 A1 1/2012 Chang
2012/0028599 A1 2/2012 Hatton
2012/0029970 A1 2/2012 Stiles
2012/0040636 A1 2/2012 Kazmi
2012/0066139 A1 3/2012 Guzman
2012/0092161 A1 4/2012 West
2012/0144019 A1 6/2012 Zhu
2012/0157795 A1 6/2012 Chiu
2012/0202428 A1 8/2012 Mirbaha
2012/0210325 A1 8/2012 De Lind Van Wijngaarden
2012/0218102 A1 8/2012 Bivens
2012/0256745 A1 10/2012 Piett
2012/0257729 A1 10/2012 Piett
2012/0258680 A1 10/2012 Piett
2012/0289243 A1 11/2012 Tarlow
2012/0295575 A1 11/2012 Nam
2012/0309341 A1 12/2012 Ward
2013/0005295 A1 1/2013 Park
2013/0012155 A1 1/2013 Forstall
2013/0030825 A1 1/2013 Bagwandeen
2013/0052983 A1 2/2013 Fletcher
2013/0065569 A1 3/2013 Leipzig
2013/0082837 A1 4/2013 Cosentino
2013/0084824 A1 4/2013 Hursey
2013/0102351 A1 4/2013 Mo
2013/0122932 A1 5/2013 Patel
2013/0138791 A1 5/2013 Thomas
2013/0183924 A1 7/2013 Saigh
2013/0185368 A1 7/2013 Nordstrom
2013/0203373 A1 8/2013 Edge
2013/0203376 A1 8/2013 Maier
2013/0222133 A1 8/2013 Schultz
2013/0226369 A1 8/2013 Yorio
2013/0237175 A1 9/2013 Piett
2013/0237181 A1 9/2013 Ray
2013/0260710 A1 10/2013 H R
2013/0309994 A1 11/2013 Karl
2013/0331055 A1 12/2013 Mckown
2013/0331058 A1 12/2013 Harvey
2014/0031000 A1 1/2014 Hanover
2014/0045450 A1 2/2014 Ballantyne
2014/0051379 A1 2/2014 Ganesh
2014/0057590 A1 2/2014 Romero
2014/0086108 A1 3/2014 Dunn
2014/0086145 A1 3/2014 Ramkumar
2014/0087680 A1 3/2014 Luukkala
2014/0096195 A1 4/2014 Morgan
2014/0113606 A1 4/2014 Morken
2014/0126356 A1 5/2014 Lee
2014/0134969 A1 5/2014 Jin
2014/0142979 A1 5/2014 Mitsunaga
2014/0148117 A1 5/2014 Basore
2014/0148120 A1 5/2014 Buck
2014/0155017 A1 6/2014 Fan
2014/0155018 A1* 6/2014 Fan ..................... H04W 72/51 455/404.1
2014/0164505 A1 6/2014 Daly
2014/0199959 A1 7/2014 Hassan
2014/0213212 A1 7/2014 Clawson
2014/0222462 A1 8/2014 Shakil
2014/0248848 A1 9/2014 Mufti
2014/0253326 A1 9/2014 Cho
2014/0257846 A1 9/2014 Hermiz
2014/0302810 A1 10/2014 Inha
2014/0324351 A1 10/2014 Dannevik
2014/0359008 A1 12/2014 Finney
2014/0368601 A1 12/2014 Decharms
2014/0370836 A1 12/2014 Gladstone
2014/0370839 A1 12/2014 Hatton
2014/0370841 A1 12/2014 Roberts
2015/0011176 A1 1/2015 Zhu
2015/0029836 A1 1/2015 Hans
2015/0031324 A1 1/2015 Zentner
2015/0055453 A1 2/2015 Chaki
2015/0055554 A1 2/2015 Sedlacek
2015/0065082 A1 3/2015 Sehgal
2015/0081209 A1 3/2015 Yeh
2015/0081927 A1 3/2015 Xu
2015/0085997 A1 3/2015 Biage
2015/0087259 A1 3/2015 Hinsen
2015/0094095 A1 4/2015 Johnson
2015/0099481 A1 4/2015 Maitre
2015/0109125 A1 4/2015 Kaib
2015/0111524 A1 4/2015 South
2015/0112883 A1 4/2015 Orduna
2015/0137972 A1 5/2015 Nepo
2015/0140936 A1 5/2015 Sachs
2015/0147995 A1 5/2015 Bontu
2015/0172897 A1 6/2015 Mariathasan
2015/0181401 A1 6/2015 Dhandu
2015/0201316 A1 7/2015 Khatibi
2015/0254972 A1 9/2015 Patterson
2015/0289121 A1 10/2015 Lesage
2015/0304827 A1 10/2015 Price
2015/0317392 A1 11/2015 Fernandez
2015/0317809 A1 11/2015 Chellappan
2015/0319284 A1 11/2015 Leonessi
2015/0350262 A1 12/2015 Rainisto
2015/0358794 A1 12/2015 Nokhoudian
2015/0365319 A1 12/2015 Finn
2016/0004224 A1 1/2016 Pi
2016/0026768 A1 1/2016 Singh
2016/0057595 A1 2/2016 Ahmed
2016/0065748 A1 3/2016 Li
2016/0088455 A1 3/2016 Bozik
2016/0173689 A1 6/2016 Klaban
2016/0210581 A1 7/2016 Braun
2016/0219084 A1 7/2016 Abiezzi
2016/0219397 A1 7/2016 Mayor
2016/0227589 A1 8/2016 Marshall
2016/0269535 A1 9/2016 Balabhadruni
2016/0283900 A1 9/2016 Johnson
2016/0307436 A1 10/2016 Nixon
2016/0315923 A1 10/2016 Riscombe-Burton
2016/0316493 A1 10/2016 Davis
2016/0330769 A1 11/2016 Edge
2016/0337831 A1 11/2016 Piett
2016/0345171 A1 11/2016 Kulkarni
2016/0353266 A1 12/2016 Winkler
2016/0363931 A1 12/2016 Yang
2016/0371973 A1 12/2016 Holleczek
2017/0004427 A1 1/2017 Bruchal
2017/0012815 A1 1/2017 Nekrestyanov
2017/0046216 A1 2/2017 Stenneth
2017/0078226 A1 3/2017 Daly
2017/0099579 A1 4/2017 Ryan
2017/0108862 A1 4/2017 Mikkelsen
2017/0124670 A1 5/2017 Becker
2017/0124852 A1 5/2017 Pauws
2017/0140637 A1 5/2017 Thurlow
2017/0142568 A1 5/2017 Saito
2017/0150335 A1 5/2017 Self
2017/0161614 A1 6/2017 Mehta
2017/0180963 A1 6/2017 Cavendish
2017/0180966 A1 6/2017 Piett
2017/0188218 A1 6/2017 Corley
2017/0208543 A1 7/2017 Zhang
2017/0213251 A1 7/2017 Nunally
2017/0238129 A1 8/2017 Maier
2017/0238136 A1 8/2017 Smith
2017/0245113 A1 8/2017 Hooker
2017/0287085 A1 10/2017 Smith

(56) References Cited

U.S. PATENT DOCUMENTS

| | | | | |
|---|---|---|---|---|
| 2017/0310827 | A1 | 10/2017 | Mehta | |
| 2017/0316698 | A1 | 11/2017 | Stenneth | |
| 2017/0323209 | A1 | 11/2017 | Rinzler | |
| 2017/0325056 | A1 | 11/2017 | Mehta | |
| 2017/0331954 | A1 | 11/2017 | Kotnis | |
| 2017/0359712 | A1 | 12/2017 | Meredith | |
| 2017/0374538 | A1 | 12/2017 | Gellens | |
| 2018/0013889 | A1 | 1/2018 | Klaban | |
| 2018/0020091 | A1 | 1/2018 | Self | |
| 2018/0039737 | A1 | 2/2018 | Dempers | |
| 2018/0053401 | A1 | 2/2018 | Martin | |
| 2018/0077282 | A1 | 3/2018 | Herron | |
| 2018/0077553 | A1 | 3/2018 | Gideon, III | |
| 2018/0150928 | A1 | 5/2018 | Dejewski | |
| 2018/0176271 | A1 | 6/2018 | Laurent | |
| 2018/0199179 | A1 | 7/2018 | Rauner | |
| 2018/0262544 | A1 | 9/2018 | Mehta | |
| 2018/0352408 | A1 | 12/2018 | Baer | |
| 2019/0020993 | A1 | 1/2019 | Nguyen | |
| 2019/0130719 | A1 | 5/2019 | D'Amico | |
| 2019/0149661 | A1 | 5/2019 | Klaban | |
| 2019/0166244 | A1 | 5/2019 | Ravichandran | |
| 2019/0166480 | A1 | 5/2019 | Rauner | |
| 2019/0174288 | A1 | 6/2019 | Bozik | |
| 2019/0230476 | A1 | 7/2019 | Qi | |
| 2019/0246260 | A1 | 8/2019 | Edge | |
| 2019/0281165 | A1 | 9/2019 | Mehta | |
| 2019/0306664 | A1 | 10/2019 | Mehta | |
| 2019/0320310 | A1 | 10/2019 | Horelik | |
| 2019/0327597 | A1 | 10/2019 | Katz | |
| 2019/0335298 | A1 | 10/2019 | Mbonye | |
| 2019/0335310 | A1 | 10/2019 | Anand | |
| 2019/0355237 | A1* | 11/2019 | Singh .................. | G08B 27/008 |
| 2019/0373112 | A1 | 12/2019 | Jensen | |
| 2019/0380020 | A1 | 12/2019 | Pellegrini | |
| 2020/0059776 | A1 | 2/2020 | Martin | |
| 2020/0100084 | A1 | 3/2020 | Martin | |
| 2020/0126174 | A1 | 4/2020 | Halse | |
| 2020/0135005 | A1 | 4/2020 | Katz | |
| 2020/0221279 | A1 | 7/2020 | Mehta | |
| 2020/0274962 | A1 | 8/2020 | Martin | |
| 2020/0288011 | A1 | 9/2020 | Petty | |
| 2020/0314240 | A1 | 10/2020 | Leavitt | |
| 2021/0006961 | A1 | 1/2021 | King-Berkman | |
| 2021/0014659 | A1 | 1/2021 | Mehta | |
| 2021/0037368 | A1 | 2/2021 | Pellegrini | |
| 2021/0110686 | A1 | 4/2021 | Jane | |
| 2021/0120393 | A1 | 4/2021 | Jensen | |
| 2021/0120394 | A1 | 4/2021 | Martin | |
| 2021/0127228 | A1 | 4/2021 | Baarman | |
| 2021/0204108 | A1 | 7/2021 | Horelik | |
| 2021/0239489 | A1 | 8/2021 | Gotschall | |
| 2021/0266722 | A1 | 8/2021 | Pellegrini | |
| 2021/0289334 | A1 | 9/2021 | Martin | |
| 2022/0377841 | A1 | 11/2022 | Martin | |
| 2023/0093284 | A1 | 3/2023 | Jensen | |

FOREIGN PATENT DOCUMENTS

| | | | |
|---|---|---|---|
| CA | 2773749 | A1 | 10/2012 |
| CA | 2773881 | A1 | 10/2012 |
| CA | 2790501 | A1 | 3/2013 |
| CA | 2809421 | A1 | 9/2013 |
| CA | 2646607 | C | 9/2016 |
| CA | 2886535 | A1 | 10/2016 |
| CN | 104487976 | A | 4/2015 |
| CN | 104539776 | A | 4/2015 |
| CN | 106021508 | A | 10/2016 |
| EP | 2161912 | A2 | 3/2010 |
| JP | H10314133 | A | 12/1998 |
| JP | H1170086 | A | 3/1999 |
| JP | 2006319946 | A | 11/2006 |
| JP | 2006334369 | A | 12/2006 |
| JP | 2011223285 | A | 11/2011 |
| JP | 2012222443 | A | 11/2012 |
| KR | 20090019606 | A | 2/2009 |
| KR | 20090092900 | A | 9/2009 |
| KR | 20100055746 | A | 5/2010 |
| KR | 101305286 | B1 | 9/2013 |
| KR | 20140052780 | A | 5/2014 |
| KR | 20140093568 | A | 7/2014 |
| KR | 20150097031 | A | 8/2015 |
| KR | 101602482 | B1 | 3/2016 |
| KR | 101612423 | B1 | 4/2016 |
| KR | 20160097933 | A | 8/2016 |
| KR | 20170100422 | A | 9/2017 |
| WO | 0022593 | A1 | 4/2000 |
| WO | 0165763 | A2 | 9/2001 |
| WO | 0167419 | A2 | 9/2001 |
| WO | 2007109599 | A2 | 9/2007 |
| WO | 2012129561 | A1 | 9/2012 |
| WO | 2014025563 | A1 | 2/2014 |
| WO | 2014063121 | A1 | 4/2014 |
| WO | 2014074420 | A1 | 5/2014 |
| WO | 2014176646 | A1 | 11/2014 |
| WO | 2015127867 | A1 | 9/2015 |
| WO | 2015196155 | A1 | 12/2015 |
| WO | 2016044540 | A1 | 3/2016 |
| WO | 2017079354 | A1 | 5/2017 |
| WO | 2017083571 | A1 | 5/2017 |
| WO | 2017100220 | A1 | 6/2017 |
| WO | 2017106775 | A1 | 6/2017 |
| WO | 2017112820 | A1 | 6/2017 |
| WO | 2017189610 | A2 | 11/2017 |
| WO | 2017196753 | A1 | 11/2017 |
| WO | 2018039142 | A1 | 3/2018 |
| WO | 2019113129 | A1 | 6/2019 |
| WO | 2020172612 | A1 | 8/2020 |
| WO | 2020205033 | A1 | 10/2020 |
| WO | 2021034859 | A1 | 2/2021 |

OTHER PUBLICATIONS

ArcGIS REST Services Directory. Folder: TIGERWeb. Available at https://tigerweb.geo.census.gov/arcgis/rest/services/TIGERweb. (1 pg.) (Accessed Sep. 2017).

Chowdhury et al. Tweet4act: Using incident-specific profiles for classifying crisis-related messages. Proceedings of the 10th International ISCRAM Conference (pp. 834-839) (2013).

Cipolla et al. A tool for Emergency Detection with Deep Learning Neural Networks. KDWeb (2016) How to predict a disaster. ICAR—National Research Council of Italy—Palermo, Italy (Dec. 1, 2016) (10 pgs).

Homeland Security Science and Technology. Using Social Media for Enhanced Situational Awareness and Decision Support. Virtual Social Medial Working Group and DHS First Responders Group. (44 pgs.) (Jun. 2014).

Marcus et al. TwitInfo: Aggregating and Visualizing Microblogs for Event Exploration. ACM CHI Conference 2011 (10 pgs).

Meier. MatchApp: Next Generation Disaster Response App? iRevolution (12 pgs.) (Feb. 27, 2013).

National Emergency Number Association (Nena) Technical Committee Chairs: NENA Functional and Interface Standards for Next Generation 9-1-1 Version 1.0 (i3). (Dec. 18, 2017). Retrieved from the Internet: URL:https://c.ymcdn.com/sites/nena.site-ym.com/resource/collection/2851C951-69FF-40F0-A6B8-36A714CB085D/NENA_08-002-vl_Functional_Interface_Standards_NG911_i3.pdf [retrieved on Feb. 5, 2018] (121 pgs).

National Emergency Number Association (NENA). Social Networking in 9-1-1 PSAPs Information Document. Available at https://c.ymcdn.com/sites/www.nena.org/resource/resmgr/Standards/NENA-INF-001.1.1-2012_Social (18 pgs) (2012).

Seattle Real Time Fire 911 Calls. Available at https://catalog.data.gov/dataset/seattle-real-time-fire-911-calls-6cdf3 (3 pgs.) (Accessed Sep. 2017).

Song. Next Generation Emergency Call System with Enhanced Indoor Positioning, Columbia University. Thesis [online] [retrieved Apr. 20, 2020 from < url:https://scholar.google.co.kr/citations/?user=h_4uUqAAAAAJ&hl=ko > (156 pgs) (2014) < /url: < a >.

(56) References Cited

OTHER PUBLICATIONS

Tazaki. Floating Ground: An Architecture for Network Mobility and Ad Hoc Network Convergence. Thesis. Graduate School of Media and Governance Keio University 5322 Endo Fujisawa, Kanagawa, Japan 2520882 (pp. 1-162) (2010).
U.S. Census Bureau. Developers: Population Estimates APIs. Available at https://www.census.gov/data/developers/data-sets/popest-popproj/popest.html (2 pgs.) (Accessed Sep. 2017).
Weather Company Data for IBM Bluemix APIs. Available at https://twcservice.mybluemix.net/rest-api/ (100 pgs) (Accessed Sep. 2017).

* cited by examiner

APPARATUS, SYSTEMS AND METHODS FOR PROVIDING EMERGENCY ASSISTANCE COMMUNICATION AND DATA TO EMERGENCY NETWORKS USING A SATELLITE COMMUNICATION SYSTEM

CROSS-REFERENCE TO RELATED APPLICATIONS

The present application claims priority to U.S. Provisional Patent Application No. 63/469,102, filed May 26, 2023, entitled "APPARATUS, SYSTEMS AND METHODS FOR PROVIDING ALARM AND SENSOR DATA TO EMERGENCY NETWORKS," which is assigned to the same assignee as the present application and which is hereby incorporated by reference herein in its entirety.

FIELD OF THE DISCLOSURE

The present disclosure relates generally to emergency calls, enhanced 9-1-1 (E911) and next generation 9-1-1 (NG911) emergency networks, and more particularly, to acquisition of emergency event data and emergency communications via satellite systems for use in responding to emergencies.

BACKGROUND

Emergency networks which may also be referred to as emergency dispatch centers (EDC) including public safety answering points (PSAPs), utilize various enhanced 9-1-1 (E911) or next generation 9-1-1 (NG911) emergency network infrastructures which provide interconnection to the Internet protocol (IP) domain. An emergency network refers to this infrastructure which is operative to receive emergency calls, emergency alerts and alarms and coordinate emergency assistance accordingly.

Alarm feeds such as home security alarms may include burglar alarms, fire alarms or other types of alarms. Commercial buildings and institutions may also have such alarms with alarm feeds going to emergency network infrastructures. Some mobile devices such as mobile phones and medical bracelets can also send emergency alerts to emergency network infrastructures. Statistics show that these alarms and alerts generate large numbers of false alarms which can be disruptive to emergency responder dispatching by taking away valuable emergency responder resources from actual emergencies. Some emergency network operators are forced to deprioritize alarms over emergency calls due to the high probability of an alarm being false. Unfortunately, many alarms corresponding to legitimate emergencies may be overlooked, or otherwise responded to too late.

In some situations, mobile device cellular coverage, or other radio coverage such as WiFi™ may be unavailable. For example, in remote areas such as forests, mountain ranges, deserts, etc., a mobile device may not have sufficient, or any, radio coverage and may not be able to place an emergency call or send an emergency text message. Radio coverage may also not be available during a network outage. Network outages may occur for any number of reasons such as, natural disasters, network failures, cyber-attacks, etc. Emergency calls may also not be possible if the radio coverage is insufficient to maintain a call, and the call drops before the 911 operator can properly communicate with the caller. In such situations, if any emergency call cannot be made via a cellular or other wireless network, then satellite communications may be the only available mechanism for emergency communication.

DETAILED DESCRIPTION

Figure 1:
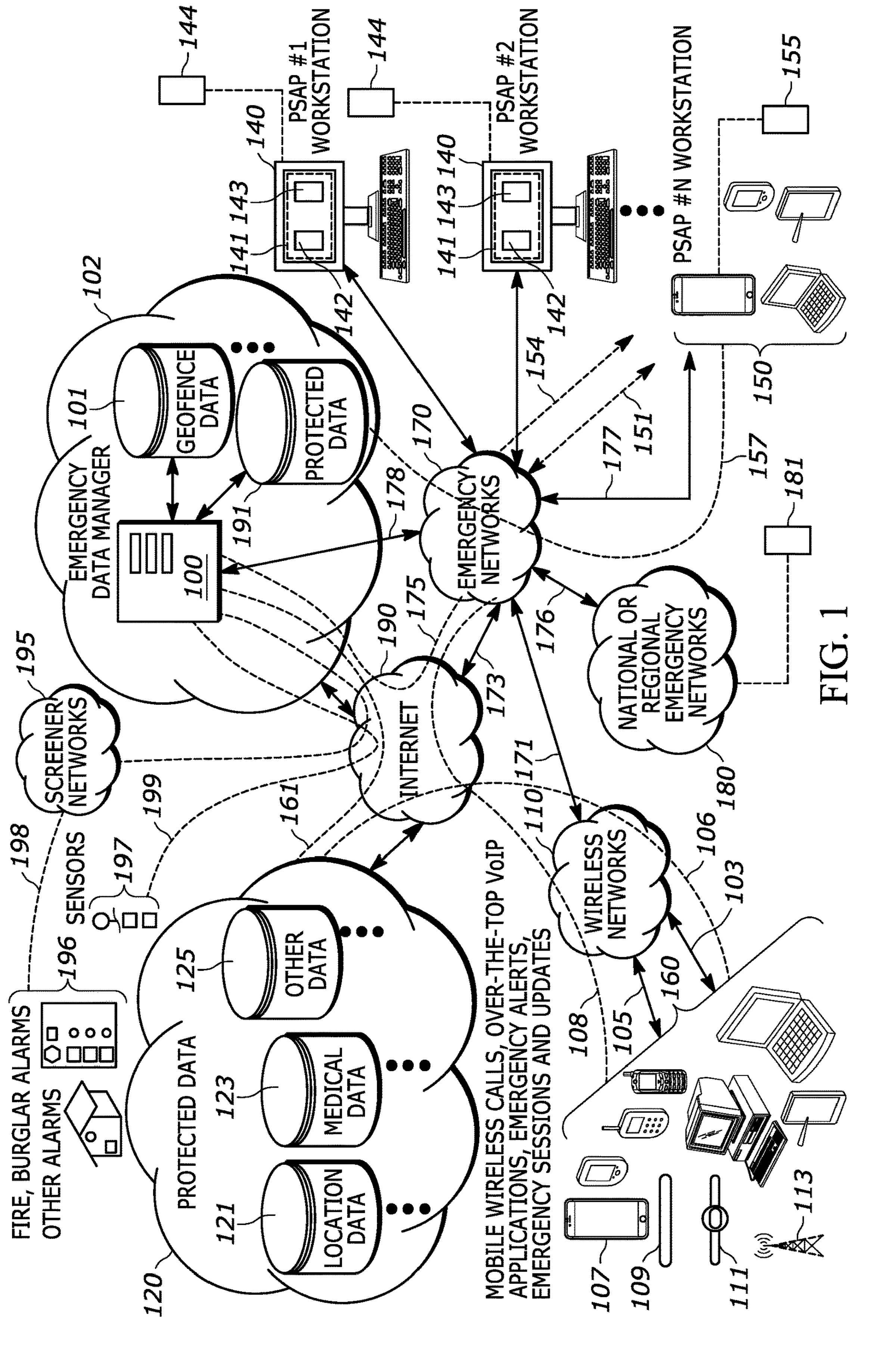
FIG. 1 is a diagram illustrating an emergency data manager in communication with various emergency networks, mobile devices, alarms and sensors.

Briefly, the present disclosure provides apparatuses and methods for facilitating satellite-initiated emergency services when mobile devices have no radio coverage and are not able to place an emergency call or send an emergency text via the usual radio mechanisms. The described apparatuses and methods facilitate getting emergency data, such as, but not limited to, critical mobile device location data, to emergency networks (such as PSAPs) for satellite-initiated emergency communications. The satellite-initiated emergency communications may be text or voice.

A disclosed method includes: receiving a satellite-initiated alert notification where the satellite-initiated alert is sent from a mobile device; pushing emergency data associated with the satellite-initiated alert to an emergency network entity comprising mobile device location data; displaying the satellite-initiated alert notification in an alarm queue of a cloud-application graphical user interface; monitoring the satellite-initiated alert notification at the cloud-application graphical user interface for an acceptance input indicating acceptance of the satellite-initiated alert notification; and initiating a call to the emergency network if no acceptance input is received within a timeout period.

The method may further include receiving location information from the mobile device. The method may further include receiving location information from the mobile device via the satellite-initiated alert. The method may further include receiving the satellite-initiated alert as a text message from the mobile device, sent from the mobile device using a satellite communications link. The method may further include establishing a text messaging session between the mobile device and the emergency network entity, using a satellite communication link; and receiving the satellite-initiated alert at a cloud-based server, where the cloud-based server provides the cloud-application graphical user interface to the emergency network entity. The method may further include providing the cloud-application graphical user interface to the emergency network entity as an instance of the cloud-application. The method may further include: receiving the satellite-initiated alert at a cloud-based server, where the cloud-based server provides the cloud-application graphical user interface to the emergency network entity; determining that the satellite-initiated alert does not contain location data for the mobile device; and sending a query from the cloud-based server to obtain a historical location of the mobile device. The method may further include pushing the historical location of the mobile device to the cloud-application graphical user interface, to establish a search perimeter for user of the mobile device.

Another described method includes: receiving a satellite-initiated alert sent from a mobile device; pushing emergency data associated with the satellite-initiated alert to an emergency network entity including mobile device location data; displaying the satellite-initiated alert notification in an alarm queue of a cloud-application graphical user interface; determining that the satellite-initiated alert was accepted at the cloud-application graphical user interface by an emergency network operator; receiving a second satellite-initiated alert from the same mobile device; and indicating on the cloud-application graphical user interface to the emergency network operator that the same mobile device is attempting to reestablish a communication link.

The method may further include: obtaining an incident identifier from the emergency network that identifies the emergency network entity associated with the emergency network operator; and sending emergency data from the second satellite-initiated alert from the same mobile device, to a record corresponding to the incident identifier. The method may further include receiving location information from the mobile device. The method may further include receiving location information from the mobile device via the satellite-initiated alert. The method may further include receiving the satellite-initiated alert as a text message from the mobile device, sent from the mobile device using a satellite communications link. The method may further include: establishing a text messaging session between the mobile device and the emergency network entity, using a satellite communication link; and receiving the satellite-initiated alert at a cloud-based server, the cloud-based server providing the cloud-application graphical user interface to the emergency network entity. The method may further include providing the cloud-application graphical user interface to the emergency network entity as an instance of the cloud-application. The method may further include: receiving the satellite-initiated alert at a cloud-based server, the cloud-based server providing the cloud-application graphical user interface to the emergency network entity; determining that the satellite-initiated alert does not contain location data for the mobile device; and sending a query from the cloud-based server to obtain a historical location of the mobile device. The method may further include displaying a location indicator on a map section of the cloud-application graphical user interface showing the historical location. The method may further include displaying a location indicator on a map section of the cloud-application graphical user interface showing the mobile device location. The method may further include displaying a location indicator on a map section of the cloud-application graphical user interface showing the mobile device location.

Another described method includes: receiving a satellite-initiated alert, the satellite-initiated alert sent from a mobile device; determining that the mobile device is attempting to send a text message to an emergency network; determining that the emergency network is not capable of receiving the text message; and displaying the text message in a cloud-application graphical user interface at the emergency network.

The method may further include: determining that the mobile device is attempting to send a text message to an emergency network as a rich communication services (RCS) message; and displaying the RCS message in a cloud-application graphical user interface at the emergency network.

The present disclosure also provides apparatuses and methods for providing alarm data to an emergency network entity within an emergency network infrastructure, and for verifying the alarms to avoid dispatch of emergency responders based on false alarms. Alarm data is provided to the emergency network entity via an alarm queue in a graphical user interface and the alarm data is obtained for emergency calls based on a geospatial query of related alarms and/or sensors that can provide emergency network entity operators with additional data related to the emergency call.

One disclosed method includes receiving an alarm notification; determining that there is a verification for the alarm notification such that the alarm notification is not a false alarm; and pushing the alarm notification to an emergency network entity along with an indication that the alarm has been verified in response to determining that there is a verification. The method may further include determining that there is at least one sensor in proximity to an alarm that sent the alarm notification; and determining from sensor data obtained from the at least one sensor that there is a verification of the alarm notification. The method may further include determining a severity score for the alarm notification from the sensor data; and pushing the alarm notification to the emergency network entity along with the severity score. The method may further include providing a graphical user interface with an alarm queue on a display of the emergency network entity, where the alarm queue includes the alarm notification. The method may further include providing a map view along with the alarm queue, where the map view displays at least one location indicator corresponding to a location of the alarm that sent the alarm notification.

In some embodiments, the method may further include providing a graphical user interface with an alarm queue on a display of the emergency network entity, where the alarm queue includes the alarm notification; and providing a map view within the graphical user interface, along with the alarm queue, where the map view shows at least a first location indicator corresponding to a location of the alarm that sent the alarm notification, and at least a second indicator corresponding to location of the at least one sensor.

Determining that there is a verification for the alarm notification such that the alarm notification is not a false alarm, may be performed via a logic component trained using machine learning. The method may further include establishing a plurality of network connections with a plurality of emergency network entities; and pushing multiple verified alarm notifications to each emergency network entity based on each alarm location corresponding to each emergency network entity's geographic boundary. The method may further include determining an event type for each alarm notification as an event type selected from the group of: a fire emergency event, a police emergency event and a medical emergency event; and pushing the event type to the emergency network entity along with the alarm notification and the indication that the alarm has been verified. The method may further include establishing an interactive voice response (IVR) call to a contact phone number associated with the alarm notification via an IVR call flow logic; receiving a verification input to the IVR call flow logic in response to the IVR call; and determining that there is a verification for the alarm notification such that the alarm notification is not a false alarm based on the verification input. The method may further include determining that the alarm notification has been in the alarm queue of the emergency network entity without a response for a predetermined period of time based on monitoring the alarm notification; establishing an interactive voice response (IVR) call to phone number of the emergency network associated with the emergency network entity via an IVR call flow logic; receiving an acknowledgement input to the IVR call flow logic in response to the IVR call; and ceasing to monitor the alarm notification in response to the acknowledgement input.

A disclosed apparatus includes: a network component, operative to connect to the Internet and to establish an Internet connection with an emergency network entity; and alarm signal processor, operatively coupled to the network component. The alarm signal processor is operative to: receive an alarm notification; determine that there is a verification for the alarm notification such that the alarm notification is not a false alarm; and push the alarm notification to the emergency network entity along with an indication that the alarm has been verified in response to determining that there is a verification. The alarm signal processor may be further operative to: determine that there is at least one sensor in proximity to an alarm that sent the alarm notification; and determine from sensor data obtained from the at least one sensor that there is a verification of the alarm notification. The alarm signal processor may be further operative to: determine a severity score for the alarm notification from the sensor data; and push the alarm notification to the emergency network entity along with the severity score.

The apparatus may further include an emergency network manager, operatively coupled to the alarm signal processor and to the network component. The emergency network manager is operative to provide a graphical user interface with an alarm queue on a display of the emergency network entity, where the alarm queue displays the alarm notification. The emergency network manager may be further operative to provide a map view along with the alarm queue, where the map view displays at least one location indicator corresponding to a location of the alarm that sent the alarm notification.

In some embodiments, the apparatus may include an emergency network manager operative to: provide a graphical user interface with an alarm queue on a display of the emergency network entity, where the alarm queue displays the alarm notification; and provide a map view within the graphical user interface, along with the alarm queue, where the map view displays at least a first location indicator corresponding to a location of the alarm that sent the alarm notification, and at least a second indicator corresponding to location of the at least one sensor.

The alarm signal processor may be trained to determine that there is a verification for the alarm notification such that the alarm notification is not a false alarm, using machine learning. The alarm signal processor may be further operative to: establish a plurality of network connections with a plurality of emergency network entities; and push multiple verified alarm notifications to each emergency network entity based on each alarm location corresponding to each emergency network entity's geographic boundary. The alarm signal processor may be further operative to: determine an event type for each alarm notification as an event type selected from the group of: a fire emergency event, a police emergency event and a medical emergency event; and push the event type to the emergency network entity along with the alarm notification and the indication that the alarm has been verified.

In some embodiments, the apparatus may further include interactive voice response (IVR) call flow logic, operatively coupled to the alarm signal processor and to the network component. In such embodiments, the alarm signal processor is operative to: establish an interactive voice response (IVR) call to a contact phone number associated with the alarm notification via the IVR call flow logic; receive a verification input to the IVR call flow logic in response to the IVR call; and determine that there is a verification for the alarm notification such that the alarm notification is not a false alarm based on the verification input. The alarm signal processor may be further operative to: determine that the alarm notification has been in the alarm queue of the emergency network entity without a response for a predetermined period of time based on monitoring the alarm notification; establish an interactive voice response (IVR) call to phone number of the emergency network associated with the emergency network entity via the IVR call flow logic; receive an acknowledgement input to the IVR call flow logic in response to the IVR call; and cease to monitor the alarm notification in response to the acknowledgement input.

A disclosed emergency data manager includes a network component that is operative to connect to the Internet and to establish an Internet connection with an emergency network entity; and an alarm signal processor, operatively coupled to the network component. The alarm signal processor is operative to: determine valid alarms and false alarms for a plurality of alarm inputs received by the alarm signal processor from a plurality of alarms systems; push alarms that are determined to be valid alarms and not false alarms to the emergency network entity over the Internet connection; and provide a portal graphical user interface to the emergency network entity that displays alarms pushed by the alarm signal processor to the emergency network entity in an alarm queue.

The emergency data manager may further include interactive voice response logic, operatively coupled to the network component and to the alarm signal processor. The alarm signal processor is then further operative to control the interactive voice response (IVR) logic to place an IVR call to at least one contact associated with an alarm to obtain verification that the alarm is a valid alarm and not a false alarm.

The emergency data manager may further include messaging logic, operatively coupled to the network component and to the alarm signal processor. The alarm signal processor is then further operative to provide a second portal graphical user interface to an alarm screener network central station; and control the messaging logic to provide a chat capability between the portal graphical user interface to the emergency network entity and the second portal graphical user interface to the alarm screener network central station to facilitate communication of alarm related information for alarms in an alarm queue displayed on both the portal graphical user interface to the emergency network entity and the second portal graphical user interface to the alarm screener network central station.

Another disclosed method includes determining valid alarms and false alarms for a plurality of alarm inputs received by an alarm signal processor from a plurality of alarms systems; pushing alarms that are determined to be valid alarms and not false alarms to an emergency network entity over an Internet connection; and providing a portal graphical user interface to the emergency network entity that displays alarms pushed by the alarm signal processor to the emergency network entity in an alarm queue.

The method may further include controlling interactive voice response (IVR) logic to place an IVR call to at least one contact associated with an alarm to obtain verification that the alarm is a valid alarm and not a false alarm.

The method may further include: providing a second portal graphical user interface to an alarm screener network central station; and providing a chat capability between the portal graphical user interface to the emergency network entity and the second portal graphical user interface to the alarm screener network central station to facilitate communication of alarm related information for alarms in an alarm queue displayed on both the portal graphical user interface to the emergency network entity and the second portal graphical user interface to the alarm screener network central station.

Another disclosed method may include: providing an emergency call queue to an emergency network entity; providing an emergency alert queue to the emergency network entity; prioritizing emergency alerts in the emergency alert queue; and arranging the order in which the emergency alerts are presented to the emergency network entity based on the prioritizing.

The method may further include receiving, from the emergency network entity, an indication that a specific emergency alert in the emergency alert queue is claimed. The method may further include initiating a fail-safe emergency call if the indication is not received within a threshold time interval. Prioritizing emergency alerts in the emergency alert queue may include assigning each emergency alert in the emergency alert queue a priority based on emergency type, emergency severity, user input, emergency call volume within a geographic area, network outages, power outages, emergency personnel availability, and number of sensor readings outside of normal range.

The method may further include assigning a verified emergency alert a higher priority. The method may further include assigning a sensor triggered emergency alert a lower priority. The method may further include prioritizing emergency alerts with a higher priority than emergency calls during connectivity outages, natural disasters, shooting incidents and mass emergencies.

In another aspect of the present disclosure, apparatuses and methods of correlating queue entries on an emergency network entity display such as a computer-aided-dispatch (CAD) workstation, an emergency call handling workstation etc., to help facilitate an emergency network entity operator's workflow by reducing the number of apparently unrelated events are provided. The consolidation of queue entries helps with resource allocation and related decision making for dispatching responders and equipment.

One disclosed method includes monitoring an emergency queue at an emergency network entity for incoming queue entries from an emergency data manager; determining correlations for the incoming queue entries based on data associated with each incoming queue entry; and generating a link for each correlated queue entry linking each correlated queue entry to a primary queue entry in response to determining correlations.

The method may further include providing a consolidated emergency queue entry that combines incoming queue entries that are determined to be correlated. The method may further include providing a consolidated emergency queue entry with a primary queue entry and a link for each correlated queue entry that is correlated to the primary queue entry. The method may further include providing a notification on a graphical user interface having the emergency queue, where the notification provides information about the consolidated emergency queue entry.

The method may further include monitoring an emergency call queue and an alarm queue; and providing a consolidated emergency queue entry that combines incoming queue entries from both the emergency call queue and the alarm queue that are determined to be correlated. The method may further include performing a database lookup of an alarm identifier associated with an alarm entry in the alarm queue, and retrieving an associated telephone number; and matching the associated telephone number with an emergency call in the emergency call queue. The method may further include providing a graphical user interface with an emergency call queue and an alarm queue on a display of the emergency network entity, and a third queue for consolidated queue entries. The method may further include providing a map view along with the alarm queue, where the map view shows at least one location indicator corresponding to a location of a consolidated queue entry. The method may include determining correlations for the incoming queue entries by determining matches of at least one of a caller identifier, an associated telephone number, an associated address, or a location. The method may further determine correlations for the incoming queue entries by determining matches of at least one of a trajectory or a velocity. The method may further include determining an event type for each incoming queue entry as an event type selected from the group of: a fire emergency event, a police emergency event and a medical emergency event; and displaying each event type for each queue entry included in the consolidated emergency queue entry.

The present disclosure provides an apparatus that includes a network component that is operative to connect to the Internet and to establish an Internet connection with an emergency network entity; and at least one processor, operatively coupled to the network component. The processor is operative to: monitor an emergency queue at an emergency network entity for incoming queue entries from an emergency data manager; determine correlations for the incoming queue entries based on data associated with each incoming queue entry; and generate a link for each correlated queue entry linking each correlated queue entry to a primary queue entry in response to determining correlations.

The processor may be further operative to provide a consolidated emergency queue entry that combines incoming queue entries that are determined to be correlated. The processor may be further operative to provide a consolidated emergency queue entry that has a primary queue entry and a link for each correlated queue entry that is correlated to the primary queue entry. The processor may be further operative to provide a notification on a graphical user interface having the emergency queue, where the notification provides information about the consolidated emergency queue entry. The processor may be further operative to monitor an emergency call queue and an alarm queue; and provide a consolidated emergency queue entry that combines incoming queue entries from both the emergency call queue and the alarm queue that are determined to be correlated. The processor may be further operative to perform a database lookup of an alarm identifier associated with an alarm entry in the alarm queue, and retrieve an associated telephone number; and match the associated telephone number with an emergency call in the emergency call queue. The processor may be further operative to provide a graphical user interface with an emergency call queue and an alarm queue on a display of the emergency network entity, and a third queue for consolidated queue entries. The processor may be further operative to provide a map view along with the alarm queue, where the map view shows at least one location indicator corresponding to a location of a consolidated queue entry. The processor may be further operative to determine matches of at least one of a caller identifier, an associated telephone number, an associated address, or a location. The processor may be further operative to determine matches of at least one of a trajectory or a velocity. The processor may be further operative to determine an event type for each incoming queue entry as an event type selected from the group of: a fire emergency event, a police emergency event and a medical emergency event; and display each event type for each queue entry included in the consolidated emergency queue entry. The processor may be trained to determine correlations for incoming queue entries based on data associated with each incoming queue entry using machine learning.

Turning now to the drawings wherein like numerals represent like components, FIG. 1 illustrates an emergency data manager 100 which is operative to communicate with various emergency networks 170 including, but not limited to, multiple Enhanced 9-1-1 (E911) or Next Generation 9-1-1 (NG911) emergency networks 170, via network connections 175. E911 and NG911 emergency networks are defined according to the National Emergency Number Association (NENA) standards which define applicable network architectures and protocols for communication between various network entities within the network architectures. Emergency networks are owned and operated by various emergency service providers (ESPs) such as, but not limited to, municipalities, state governments, and other public safety services (PSS) as well as private emergency service providers such as corporate security, college campus security, etc. The emergency services provided are for example, police, fire department, ambulance, etc. One type of emergency network is a public safety answering point (PSAP), which may handle emergency calls for police, fire and medical emergencies. Put another way, an ESP is an organization that owns and operates an emergency network where the emergency network includes the infrastructure, network entities, communication devices and other equipment required to provide the emergency services.

In FIG. 1, double arrowed lines represent operative coupling which may be implemented as backhaul connections between network entities, or as wireless connections between network entities and devices. Curved, dotted lines in FIG. 1 represent network connections or data connections over which data may be sent and received by respective devices, network entities or by combinations of devices and network entities sending data to, and receiving data from, each other, accordingly. The network connections may be Internet connections and may further include Virtual Private Network (VPN) pathways or other secure connections. The emergency data manager 100 is operatively coupled to emergency networks 170 via operative coupling 178, which may be implemented as network connections 175 through the Internet 190. The network connections 175 may include an Internet protocol (IP) connection between each of the emergency networks 170 and the emergency data manager 100 and may be connection oriented or connectionless. For example, the network connections 175 may include IP connections which may include a TCP (Transmission Control Protocol, also referred to as Transport Control Protocol) connection, a UDP (User Datagram Protocol) connection or a combination of both such as UDP over TCP, etc., or a combination of TCP and UDP connections, etc. An IP connection may further employ one or more TCP sockets or one or more WebSocket connections. The emergency networks may have backhaul connections 173 to the Internet 190 and backhaul connections 176 to national or regional emergency networks 180.

The emergency data manager 100 is also operatively coupled to various alarms 196 such as, but not limited to, burglar alarms, fire alarms, carbon monoxide alarms, water level alarms etc., and to various sensors 197 such as, but not limited to video cameras, motion detectors, audio sensors, glass break detectors, heat sensors, water level sensors, and automobile sensors such as airbag deployment sensors, collision sensors, gyroscopes and inertia detectors, etc. Each of the various alarms 196 is a device that is operative to send an alarm notification which may be a digital signal, a logic output such as a voltage high or low, a normally closed, normally open relay contact signal, a threshold signal range, or any other appropriate signal type etc. Some automobile sensors are devices that may be considered alarms in that the automobile sensors are operative to send an alarm notification. An alarm panel for a home or commercial fire alarm system, burglar alarm system etc., is also a device that may send an alarm notification based on various sensor inputs that are received at the alarm panel.

An "alarm system" may include one or more devices operative to detect intrusions, hazardous conditions, etc. based on one or more sensor conditions. Each of the one or more devices may be operative to individually send an alarm notification, or a specific device of the alarm system may send an alarm notification based on input it receives from the one or more devices operative to detect conditions. The one or more devices may be, for example, sensors, IoT devices, or networks of sensors or IoT devices. Alarm systems may be, but are not limited to: burglar alarms, glass breakage alarms, carbon monoxide detectors, door alarms, fire alarms, flood detectors, security systems, smoke alarms, carbon monoxide alarms, car alarms, crash detection alarms, air bag deployment, etc. Alarm systems may be peripherally paired with other devices such as an owner's mobile device (i.e. smartphone or tablet) in order to send alarm notifications to the owner and to provide other information such as camera views, sensor data, etc.

The various alarms 196 may be operatively coupled to screener networks 195 that receive the alarm data 198 outputs and perform alarm validation and scoring procedures. The screener networks 195 are operatively coupled to the emergency data manager 100 via an Internet connection. The various sensors 197 may also provide sensor data 199 to the emergency data manager 100 via the Internet using an appropriate connectivity networks such as wireless networks 110 or via some other means of Internet 190 connection.

The emergency data manager 100 may operate as an interface between the emergency networks 170, databases 120 and devices 160, to provide emergency data to the emergency networks 170. The emergency data manager 100 is operative to retrieve various types of emergency data such as location data, medical data, sensor data, camera data and other data, etc., determine the appropriate emergency network 170 authorized to receive specific emergency data, and provide that specific emergency data to the authorized emergency network. The emergency data manager 100 may, under some circumstances and for certain types of emergency data, store obtained emergency data in one or more databases which may be distributed databases. Protected data may be stored in protected data database 191 that may contain data that is subject to laws, regulations or policies that define how the data is accessed and handled. Among other things, the emergency data manager 100 is operative to obtain mobile device location data in response to a mobile device initiating an emergency call 103 or sending an emergency alert 105.

The emergency data manager 100 may communicate with, and retrieve and obtain data from, any of the various databases 120, any of which may contain protected data, and may also receive and store emergency data from the devices 160. The emergency data manager 100 is operative to determine the authorized emergency network using a geofence database 101 which includes boundary information for all of the emergency networks 170 and also for national or regional emergency networks 180.

The various emergency networks 170 may include various public safety answering points (PSAPs) which may answer emergency calls and accordingly dispatch police, fire departments and ambulances. Each emergency network such as, but not limited to a PSAP, may include an emergency dispatch center and employ a computer aided dispatch (CAD) system. Each emergency network 170 includes various emergency network entities such as at least one emergency network entity 140 which may be a PSAP workstation implementing a CAD system, a call handling system etc., and which provides various graphical user interfaces (GUIs) on a display 141 for use by emergency network personnel. The term “emergency network entity” refers to a hardware apparatus used to access or implement an emergency network such as, but not limited to, workstations, servers, routers, switches, laptops, desktop computers, etc. An emergency network entity hardware apparatus may include software or firmware related to its emergency network function.

Each individual emergency network 170 may include an emergency call handling system which is operatively coupled to a PSTN (public switched telephone network) and various wireless networks 110 via appropriate backhaul connections and call routing 171. The various emergency networks 170 are each operative to receive emergency calls 103 from a variety of devices 160 and a variety of device types. Each individual emergency network 170 may also receive emergency alerts 105 and establish emergency sessions 108 from the various devices 160 over the Internet 190. An emergency alert 105 may be sent as, for example, short message service (SMS) messages, SMS data messages, instant messages (IM), multi-media messages (MMS), email, or other formats of messages sent as Internet Protocol (IP) messages. For example, IP based messages may be sent using TCP, UDP, SIP, HTTP, or other mechanisms, etc. Emergency sessions 108 may also be established using these same, or other, IP protocols. An emergency session 108 refers to communication over an Internet connection between any the various types of devices 160 and an emergency network, where there is communication between one of the devices 160 and a particular emergency network of the emergency networks 170. The communication may be bi-directional. One example of a bi-directional emergency session 108 is a Voice-over-IP (VoIP) call using Session Initiation Protocol (SIP). Another example is an IP call using H.323 protocol, or some other communication protocol, etc. An emergency alert 105 may be, but is not limited to, data sent from a device 160 to a given one of the emergency networks 170. Because the emergency alert 105 will contain information that identifies the specific device 160 that sent the alert, the specific emergency network that received the emergency alert 105 may be able to respond to the device 160 by sending a response or acknowledgement message, or by making a call-back if the device 160 is for example, a mobile telephone such as a smartphone 107. The information that identifies a specific device 160 is referred to herein as a “device identifier.” That is, a “device identifier” refers to information allowing identification of the device or a user of the device, such as for example, a phone number associated with a user, an email address, physical address, coordinates, IMEI number, IMSI, TMSI, IP address, BSSID, SSID or MAC address.

The various types of devices 160 that may communicate with an emergency network include, but are not limited to, desktop computers, laptop computers, tablets, mobile phones, smartphones 107, smartwatches 111 (or other health and medical tracking devices), medical bracelets 109, and various wired devices which may be Internet-of-Things (IoT) devices 113 which are operative to send and receive data from a wireless network such as, but not limited to, a 5th generation mobile network (5G network). A medical bracelet 109 may be a type of IoT device and may be operative to transmit an emergency alert 105 to an emergency network. Emergency calls may also be made from landline phones connected to a PSTN and medical bracelet 109 and/or health monitoring device, such as a medical bracelet 109, may use a wireless access point connected to the PSTN to place an emergency call 103 or send emergency alert 105. Some medical devices, which may be implanted in the human body or connected with the human body such as, but not limited to, a pacemaker, an insulin pump, etc., may also be operative to send emergency alerts 105.

An “emergency alert” refers to a communication relating to an emergency or non-emergency situation. That is, an emergency alert may be an emergency request for assistance where the emergency alert is associated with an emergency situation. An emergency alert may include information related to a device, the device user, past and current location, or an indication of the type of emergency such as, but not limited to, police, fire, medical, CO level, traffic accident or some other information in various combinations. An emergency alert may be associated with a non-emergency situation such as a request for a tow truck after a car breaks down. In other words, a situation that requires assistance, but is not necessarily a life-or-death critical situation. Emergency alerts may be associated with a device that sent the alert, or may be associated with a device not sending the alert such as a device making a proxy request on behalf of a second device or a member device in a group of devices, etc. An emergency alert may be “associated” with a device or user when the emergency alert relates to an emergency or non-emergency situation involving the device or user. Emergency alerts may include pointers to other sources of information such as, but not limited to, medical records and health data for the device user, or for another device user in a proxy situation, etc.

In one example of operation, an emergency alert 105 may be triggered by a device 160 in any of various ways such as, but not limited to, device fall detection, by the user pressing a soft button or a physical button (i.e. a “panic button”), a voice command, a gesture, or autonomously based on other sensor data such as via a smoke, carbon-monoxide, burglar alarm, or some other alarm, etc. In some situations, the user may confirm the emergency or provide authorization for sending the emergency alert 105.

Emergency data, such as enhanced location data, medical data, or other data, may be sent by the devices 160 to the various databases 120 and pushed to the emergency data manager 100 as part of the emergency alert 105. The emergency data may be sent from the devices 160 as updates 106 to a specific database of the various databases 120. The data updates 106 may be pushed to the emergency data manager 100 based on a subscription of a particular device 160 to the emergency data manager 100 services, or when a device 160 initiates an emergency session 108. In either case, the emergency data manager 100 may store the data in the protected data database 191 for a period of time in anticipation of an emergency data request from one of the emergency networks 170. The emergency data manager 100 is operative to provide emergency data in the protected data database 191, or access and provide emergency data in the databases 120 in response to an emergency data request. An emergency network 170 or an emergency responder device 150 may send an emergency data request to the emergency data manager 100.

Each of the devices 160 may be operative to send data updates 106 from time-to-time, or based on a schedule, to various databases 120 and this data may subsequently be used as information included in emergency alerts 105. The databases 120 may contain protected data in that the data is subject to various statutorily defined protections, such as, but not limited to, HIPPA, GDPR, or other statutorily defined data protection and data privacy requirements. The databases 120 may include location databases 121, medical databases 123 and other databases 125 with various personally identifiable data related to device 160 users. The data contained in the databases 120 is referred to as "emergency data" in that it may be retrieved by the emergency data manager 100, via an IP connection 161, in response to a detected emergency detected by the emergency data manager 100 or in response to an emergency data request.

Each emergency network 170 has at least one emergency network entity 140 which may be, for example, a workstation that includes one or more processors that are operative to execute one or more emergency services related applications, a display 141 and emergency data manager portal 144 in accordance with the various embodiments. In some embodiments, the emergency data manager portal 144 may be implemented as an application executed by the one or more processors of the emergency network entity 140. The emergency data manager portal 144 is operative to provide a graphical user interface (GUI) 143 on the workstation display 141. During operation, the emergency network entity 140 may also display other GUIs such as GUI 142, which may be related to, and provided by, other emergency response applications such as, but not limited to, an emergency call handling application or a computer aided dispatch (CAD) application.

The emergency data manager portal 144 is operative to communicate with the emergency data manager 100. The emergency data manager 100 may be included within an emergency data management network 102 which may include one or more servers, and one or more databases such as geofence database 101 and protected data database 191. The emergency data manager 100 may be implemented as a server having at least one processor, or may be implemented as a distributed system with multiple servers, processors, memory and databases, and may further provide cloud-based, software-as-a-service (SaaS) features and functions and/or may be implemented as SaaS using a platform-as-a-service (PaaS).

The emergency data manager portal GUI 143, in conjunction with the emergency data manager portal 144, are operative to retrieve and display emergency data provided by the emergency data manager 100 including, but not limited to, an emergency call queue and an alarm queue. More particularly, the emergency data manager portal GUI 143 provides communication between an emergency network entity such as the emergency network entity 140, and the emergency data manager 100. The emergency data manager portal GUI 143 may be implemented as a web browser interface, such as a cloud-based application interface (i.e. a software-as-a-service SaaS interface), or via a web browser plug-in, or may be associated with an application running as executable instructions, executed by one or more processors on the emergency network entity 140, or by any other software implementation mechanism. Emergency services personnel may receive appropriate emergency services information and view emergency data via the emergency data manager portal GUI 143.

Depending on the specific operations of the emergency network and the particular type of emergency network entity 140 software, the GUI 142 may be used by emergency services personnel to place dispatch calls to emergency responders, who receive the dispatch calls and emergency data on various emergency responder devices 150 accordingly. Emergency responders, also referred to as emergency service providers (ESPs) may utilize a variety of emergency responder devices 150 which may include, but are not limited to, desktop computers, laptop computers, tablets, mobile phones, smartphones, radios (i.e. walkie-talkies), in-vehicle computers, etc., all of which are operative to display emergency data to the emergency responders. The devices 150 may be operative to send emergency data requests 151 to a respective emergency network 170 and also authentication data 153.

The devices 150 communicate with the emergency networks 170 over a combination of wireless networks 110 and proprietary wireless networks that provide wireless communications links 177. Each of the devices 150 may include a mobile emergency data application, that provides a GUI 155 and that is operative to communicate with the emergency data manager portal 144 and the emergency data manager 100. In response to emergency data requests 151, the emergency data manager 100 is operative to provide limited access to emergency data 157 to the emergency responder devices 150 based on the authorization level of the specific emergency responder device 150 and associated user.

An emergency data request 151 from an emergency responder device 150, may be sent either by a responder device 150, or by an appropriate one of the emergency networks 170, to the emergency data manager 100 such that the emergency data manager 100 may identify the emergency and any emergency data pertaining to the emergency stored by the emergency data manager 100 or contained within the various databases 120. In response, the emergency data manager 100, may check authorization, and then proceed to send the pertinent emergency data 157 to the requesting emergency responder device 150. In other words, in some implementations, the emergency data manager 100 may serve as a data pipeline for emergency responder devices 150 through which the emergency responder devices 150 may request and retrieve reliable emergency data through secure pathways using defined protocols and formats. The emergency data may be, but is not limited to: accurate location data, that is critical for responding to an emergency, medical data, sensor data, or other data, etc. The emergency data manager 100 is operative to obtain emergency data from various sources including other servers, databases 120, devices 160, alarms 196 and sensors 197.

In one example of operation, an emergency alert 105 may be triggered by a device 160 in any of various ways such as, but not limited to, device fall detection, by the user pressing a soft button or a physical button (i.e. a "panic button"), a voice command, a gesture, or autonomously based on alarm 196 data or sensor 197 data such via a smoke, carbon-monoxide, burglar alarm, or some other alarm, motion detector, camera, etc. In some situations, the user may confirm the emergency or provide authorization for sending the emergency alert 105. In one example, an alarm data 198 from a burglar of fire alarm may be sent to one of various screener networks 195. Screener network personnel may place a call to a keyholder and request further validation. If the alarm is validated by the keyholder, the screener network personnel may assign a priority score to the alarm and send it as a prioritized alarm to the emergency data manager 100. Some alarm data 198 that does not first pass through one of the screener networks 195 is received by the emergency data manager 100 as unprioritized alarm data. The emergency data manager 100 is operative to perform alarm verification and scoring procedures to determine whether the alarm data should be pushed to one of the emergency networks 170.

Emergency data, such as enhanced location data, medical data, or other data, may be sent by a device 160 to an appropriate one of the emergency networks 170 as part of an emergency alert 105, or may be sent as data updates 106 to a specific database of the various databases 120. In some implementations, and/or for certain types of emergency data, the emergency data manager 100 may push emergency data to a given emergency network 170 as that emergency data is obtained by the emergency data manager 100. An emergency network 170 may also, at any time, send an emergency data request to the emergency data manager 100 such that the emergency data manager 100 may search or query the various databases 120. In some implementations, an emergency data search may be performed by the emergency data manager 100, using the IP connections 161 to the various databases 120, in response to an emergency alert 105, emergency call 103, or emergency session 108 between a device 160 and one of the emergency networks 170. In one example, the emergency data manager 100 is operative to receive Android™ Emergency Location Service (ELS) or Advance Mobile Location (AML) data upon initiation of an emergency call 103, emergency alert 105, or emergency session 108 by a device 160 that utilizes the Android™ operating system. Upon receipt of ELS or AML data, the emergency data manager 100 is operative to push the ELS or AML data to the appropriate emergency network 170 based on a geofence analysis using the geofence database 101. The emergency data manager 100 may also perform a search of the various databases 120 using a device identifier in the ELS or AML data to identify additional related emergency data and push that emergency data to the appropriate emergency network 170.

The emergency data manager 100 or the emergency network 170 may format stored emergency data or any received emergency data into a format that is compatible with industry standards for storing and sharing emergency data. For example, the emergency data may be formatted to be compatible with National Emergency Number Association (NENA) standards. Where emergency data is stored by the emergency data manager 100, emergency data requests may be sent to the emergency data manager 100 by an emergency network, such as via an HTTP GET request. For example, protected data may be stored in the protected data database 191 pending receipt of appropriate authorization credential by the emergency data manager 100. In other words, some emergency data may be pushed to emergency networks 170 upon receipt by the emergency data manager 100, while other data, if subject to the categorization of protected data, may only be sent upon receipt of proper authorization and/or in conjunction with an authorized emergency data request.

Emergency data requests 151, whether sent directly by a responder device 150 or via an emergency network 170 may utilize Location Information Server (LIS) protocol. For emergency data related to location, the data may include, but is not limited to, device generated location data (such as device 160 GPS chipset data), location information such as Location-by-Reference, Location-by-Value, etc. from, for example a, Location Information Server (LIS) or from other sources. Such location data that contains multiple location determination method data is referred to as hybrid location data.

Each of the emergency networks 170 may be operatively coupled, via appropriate backhaul connections 176, to one or more national or regional emergency networks 180. The national or regional networks 180 each include an emergency event application 181 which is operative to, among other things, display emergency events for a hierarchical view of emergencies being handled by one or more of the emergency networks 170.

The emergency data manager 100 may receive alarm data associated with an alarm from a monitoring center such as one of the screener networks 195, determine an appropriate emergency network 170 (such as police department, fire department, etc.) to receive the alarm data associated with the alarm, and generate a digital emergency service request (also referred to as a “digital primary request for emergency service” or a “digital service request”) for the alarm data, and transmit the digital emergency service request to the appropriate emergency network.

Figure 2:
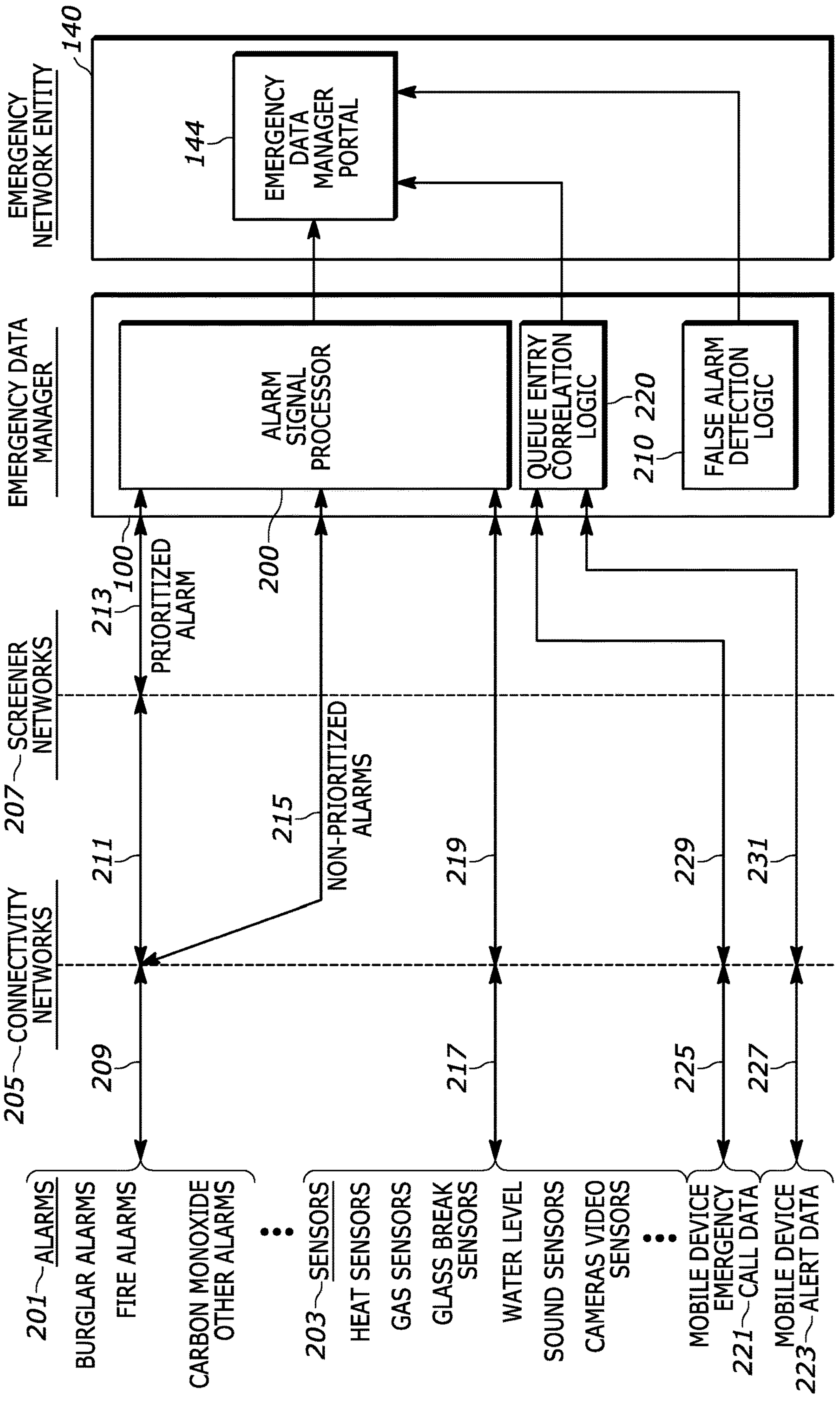
FIG. 2 is a block diagram showing further details of an emergency data manager having an alarm signal processor, queue entry correlation logic and false alarm detection logic in accordance with various embodiments.

FIG. 2 provides further details of the emergency data manager 100, which includes an alarm signal processor 200, queue entry correlation logic 220, and false alarm detection logic 210, all of which are apparatuses in accordance with the present disclosure. The emergency data manager 100 is operatively coupled to the emergency network entity by one or more Internet Protocol (IP) connections which may include one or more web socket connections. The alarm signal processor 200, queue entry correlation logic 220 and false alarm detection logic 210 are also thereby operatively coupled to the emergency network entity and to an emergency data manager portal 144 displayed on a display of the emergency network entity 140. In some embodiments, the false alarm detection logic 210, the queue entry correlation logic 220, or both, may be either be integrated with the alarm signal processor 200, or may be implemented as executable instructions (i.e. software or firmware code) executing on the alarm signal processor 200. The queue entry correlation logic 220 is operative to perform heuristics on alarm and call data received by the emergency data manager 100 and to make associations between mobile numbers that match up with those associated with alarms. For example, a key holder of a home that has a home alarm system, will have their telephone number in a database associated with the home alarm system. If an emergency call is received from the key holder mobile number and an alarm is also received, the queue correlation logic will make or suggest an associate of the two queue items on the emergency data manager portal 144. The emergency network entity 140 operator may then accept the association if the suggestion is correct, and the two queue entries will be moved together in the queue. As the operator performs queue entry association procedures, a machine learning algorithm within the queue entry correlation logic can be trained in accordance with the operator’s actions. After collection of enough data via the machine learning algorithm's observation of the operator's actions, the machine learning algorithm may be set by the operator to perform these operations automatically without the operator's intervention, or with operator verification of each queue entry association or merger performed by the machine learning algorithm.

The emergency data manager 100 and the alarm signal processor 200 are operatively coupled to multiple emergency network entities of multiple emergency networks 170. The alarm signal processor 200 is operative to receive prioritized alarm data 213 from various screener networks 207, and non-prioritized alarm data 215 from various alarms 201 via various connectivity networks 205. The alarms 201 are operatively coupled to the connectivity networks 205 via various connections 209 which may include wired connections or wireless connections. The connectivity networks 205 include the wireless networks 110 and the Internet 190. The screener networks 207 are operatively coupled to various alarms 201 via the connectivity networks 205 and receive alarm data 211 which includes identification information such as an alarm identifier, and address or other information.

The alarm signal processor 200 is also operatively coupled to various sensors 203 via the connectivity networks 205 and various connections 217 which may include wired connections or wireless connections. The sensors 203 are operative to send sensor data 219 alarm signal processor 200 and to the queue entry correlation logic 220, via the various connectivity networks 205 which may include the Internet 190. The queue entry correlation logic 220 also receives mobile device emergency call data 229 from various mobile devices 221, and mobile device alert data 231 from the same or other mobile devices 223. The mobile devices 221 communicate wirelessly by wireless connections 225 with the various connectivity networks 205. Likewise, mobile devices send alert data over connections 227 which may be Internet connections implemented using the same wireless connections. The sensors 203 may be integrated with, or connected to, the alarms 201 in some implementations, or may be separate sensors that are not directly associated with a specific alarm. The alarms may be associated with an alarm panel that provides call communication features in some implementations. That is, a key holder may be able to speak with an alarm screener network attendant via the alarm panel. In an example in which sensors are connected to an alarm, a residential burglar alarm may include associated sensors such as a front door entry sensor, glass break sensors, rear door entry sensor, etc. In an example where sensors are not part of any alarm, a commercial building may have a burglar alarm, and fire alarm, and a video camera may be located in the building parking lot. Although the video camera is not directly part of the burglar alarm or fire alarm, it is a sensor that can be used for verification or for supplemental emergency data related to the burglar alarm or fire alarm. In another example, an automobile may have a collision detector with various sensors and a roadside camera located nearby can provide additional emergency data in the event of collision detection by the vehicle's sensors. All of the sensors, including video from cameras etc. may be routed via an alarm panel located somewhere in the building being monitored.

The alarm signal processor 200 is operative to identify sensors that are near in proximity to alarm locations, and to use sensor data to determine whether alarms are legitimate and not false alarms. In some embodiments, the false alarm detection logic 210 may implement rules that are used to make the false alarm or valid alarm determination. In other embodiments, the false alarm detection logic 210 may be integrated with the alarm signal processor 200. The alarm signal processor 200 receives input data from alarms 201 and sensors 203 and evaluates whether incoming data is related to other data received during a given time interval. The decisions regarding data relationships may be made by the queue entry correlation logic 220 which may also be integrated with the alarm signal processor 200 in some embodiments. Incoming alarm 201 and sensor 203 data is initially compared by the alarm signal processor 200, or via the queue entry correlation logic 220, based on physical proximity and timestamp of data.

The screener networks 207 are operated by alarm service providers and these networks provide verification for alarms related to their specific services. For example, a home security company may provide residential burglar alarms where each alarm includes various sensors that are installed in a residence. The screener networks 207 have operating procedures for verifying alarms prior to contacting emergency networks for dispatch of emergency responders such as police or the fire department. The screener networks 207 may have workstations with applications that are operatively coupled to the alarm signal processor 200 via an Internet web-socket connection. Whenever an alarm is verified by one of the screener networks 207, they may push the associated alarm data to the alarm signal processor 200 as prioritized alarm data 213. The alarm data is "prioritized" in that is has been verified and therefore constitutes an actual emergency that requires a response by emergency service providers; and has been assigned a priority score.

In one example of operation, if alarm signal processor 200 receives prioritized alarm data 213, the alarm signal processor 200 will push the data to an emergency network entity's emergency data manager portal 144 for display in an alarm queue. The alarm identifier will be displayed, and any other associated data will be pushed to the emergency data manager portal 144. The alarm signal processor 200 may also assign a score to the alarm, such as a score of "100," to indicate that the alarm requires emergency dispatch.

The emergency data manager 100 determines to which emergency network entity to push the alarm data based on the location of the alarm, type of alarm, and geofence database 101. More particularly, the emergency data manager 100 determines the appropriate emergency network based on one or more geofences within with the alarm is physically located. Thus, if the alarm is a burglar alarm, the emergency data manager 100 will push the alarm data to a police department that serves a geofence area within which the residence or commercial building having the burglar alarm is located.

By default, any determinations of alarm scores that are made by the alarm signal processor 200 are conveyed to the emergency data manager portal 144 along with the alarm data to enhance the emergency network response to the situation. The alarm signal processor 200 is operative to analyze non-prioritized alarm data 215 to determine whether an actual alarm condition exists, or whether a false alarm condition has been generated. The alarm signal processor is also operative to obtain alarm verification for non-prioritized alarm data 215 using an Interactive Voice Response (IVR) call system. The alarm signal processor 200 is operative to report on alarm conditions to the emergency data manager portal 144 such that emergency network personnel operating the emergency network entity 140 can appropriately respond to alarms and more particularly, to avoid dispatching emergency service personnel based on false alarm conditions.

The alarm signal processor 200 is able to evaluate non-prioritized alarm data 215 based on a variety of factors including proximity. For example, if non-prioritized alarm data 215 is received, sensor data 219 may be received that is related to sensors 203 that are in a physical proximity to the alarms 201 that generated the non-prioritized alarm data 215. Additionally, mobile device emergency call data may have also been received by the emergency data manager 100 from mobile devices that are in a location nearby the location from which the non-prioritized alarm data 215 was generated. The emergency call data can also be used by emergency data manager 100 and alarm signal processor 200 for alarm verification. In addition to location, the time of receipt of data is also used by the alarm signal processor 200 to make alarm verification determinations.

The alarm signal processor 200 evaluates alarm event data based on additional criteria such as whether prioritized alarm data 215 and sensor data 219 have additional relationships useful for indicating that an alarm is legitimate. For example, if non-prioritized alarm data 215 is received from a burglar alarm, in conjunction with sensor data 219 from glass break sensors that are located in the same building as the burglar alarm, this information may be used to determine that the burglar alarm is an actual alarm rather than a false alarm. Additional sensor data 219 may also be such as, but not limited to, sound sensor data including gunshot detectors, camera video sensor data, motion detector data, etc. The alarm signal processor 200 is operative to assign a score to non-prioritized alarm data 215 and convey the previously non-prioritized alarm data 215 along with the score as a prioritized alarm data to the emergency data manager portal 144 where emergency personnel may respond accordingly.

Figure 3:
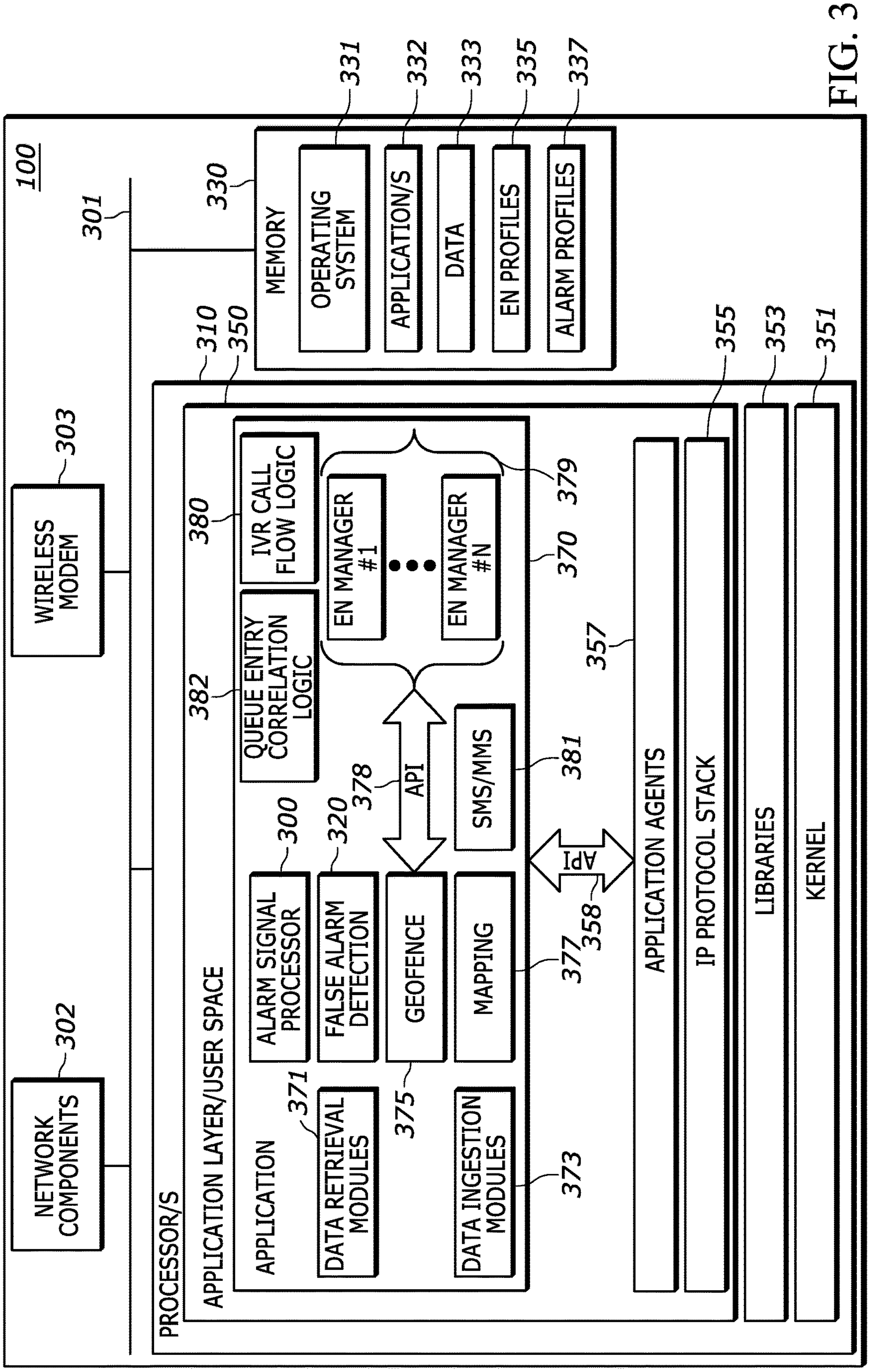
FIG. 3 is a diagram providing further details of an emergency data manager in accordance with one embodiment.

FIG. 3 provides an example implementation of the emergency data manager 100 which is an apparatus shown in FIG. 1 and FIG. 2. The emergency data manager 100 includes network components 302, a wireless modem 303, at least one processor 310, and at least one non-volatile, non-transitory memory 330 in addition to RAM (random access memory). The at least one processor 310 is an emergency data management processor and is another type of apparatus disclosed herein. The network components 302 may include one or more network transceivers for Ethernet connectivity to other network entities and an Internet connection. The wireless modem 303 is operative to place wireless phone calls, such as robocalls, and to send and receive text or multimedia messages. The memory 330 stores executable instructions and data such as operating system 331 executable instructions and various application executable instructions 332. The operating system 331 executable instructions and the application executable instructions 332 may be executed by the at least one processor 310. The memory 330 also stores data 333 which may provide a location and geofence data cache, other data caches and other data, etc., and emergency network profiles 335 which provide login credentials, settings and other data related to emergency networks that access the emergency data manager 100.

The processor 310 may be implemented as one or more microprocessors, such as a system on a chip (SoC), or using one or more, or combinations of, ASICs, FPGAS, microcomputers, microcontrollers, digital signal processors, central processing units, state machines, logic circuitries, and/or devices that manipulate signals based on operational instructions. Among other capabilities, the processor 310 is configured and operative to fetch and execute computer-readable instructions (i.e. executable instructions) stored in the memory 330. For example, the operating system 331 executable instructions, when executed by the at least one processor 310, may provide a kernel 351, libraries 353 (i.e. application programming interfaces or "APIs"), an application layer 350 or "user space" within which the various applications are executed, and an IP protocol stack 355. The applications executable instructions 332, when executed by the at least one processor 310, may also provide alarm signal processor 300, queue entry correlation logic 382, false alarm detection logic 320, IVR (interactive voice response) call flow logic 380, short message service (SMS)/multimedia message service (MMS) SMS/MMS client 381, data retrieval modules 371, data ingestion modules 373, a geofence module 375, a mapping module 377, and one or more emergency network managers 379. Emergency network profiles 335, stored in memory 330, may be accessed by the various modules and the emergency network managers 379 to access information needed to communicate with various emergency networks. Alarm profiles 337 may include settings specific to emergency networks regarding how alarm queues should be displayed on their respective emergency data manager portal, and may also contain information related to various central stations in communication with the emergency data manager 100. The processor 310 is operative to perform the various methods of operation of an emergency data manager as described herein including, but not limited to, the methods of operation disclosed herein and described with respect to various flowcharts provided in the drawings.

The emergency network managers 379 communicate with the other modules of application 370 via a set of APIs 378. Each emergency network manager 379 provides an emergency data manager portal as a graphical user interface (GUI) 143 to the emergency network entities to which it is connected. The processor 310 may further execute a set of application agents 357 which facilitate communication between the IP protocol stack 355 and the application 370 via various APIs 358. The application agents 357 are operative to, among other things, provide API communication between the various applications and the kernel 351.

In accordance with an embodiment, the emergency data manager 100 includes alarm signal processor 300, queue entry correlation logic 382 and false alarm detection logic 320 which may each be implemented as an application executed by the at least one processor 310. The alarm signal processor 300, queue entry correlation logic 382 and false alarm detection logic 320 performs operations as described with respect to FIG. 2. In some embodiments, one or more of the alarm signal processor 300, queue entry correlation logic 382 and false alarm detection logic 320 may be implemented using ASICs, FPGAs, DSPs, or combinations thereof. In one example embodiment, the queue entry correlation logic 382 and the and alarm signal processor 300 may be implemented as an ASIC and the false alarm detection logic 320 may be implemented as another ASIC that are operatively coupled to each other and to the at least one processor 310. In another example embodiment, the alarm signal processor 300 and false alarm detection logic 320 may be implemented as an ASIC. In yet other embodiments, the alarm signal processor 300, queue entry correlation logic 382 and the false alarm detection logic 320 may be implemented as a single ASIC of may be implemented as a system on a chip (SoC).

The emergency data manager 100 may be implemented as a cloud server. The term "cloud server" as used herein, refers to a server, accessible by an Internet connection, that is operative to host one or more applications that may be accessed by a computing device using a Web browser or an application resident on the computing device. The emergency data manager 100 is operative to provide a cloud-based application such as a software-as-a-service (SaaS) accessible remotely using a computer or workstation connected to the Internet and operatively coupled to the emergency data manager 100. The emergency data manager 100 may be implemented as SaaS software executed using a platform-as-a-service (PaaS) that enables development and execution of cloud-based applications.

All of the components of the emergency data manager 100 are operatively coupled by an internal communication bus 301. As used herein, components may be "operatively coupled" when information can be sent between two such components, even though there may be one or more intermediate or intervening components between, or along the connection path. Therefore, any of the various components with the emergency data manager 100, and in other example network entities and devices described herein, may be understood herein to be operatively coupled to each other where appropriate, and to be executing on one or more processors that are further operatively coupled to a memory that stores executable instructions (also referred to as "software code" or "code") for implementing the various components. Operative coupling may also exist between engines, system interfaces or components implemented as software or firmware executing on a processor and such "software coupling" may be implemented using libraries (i.e. application programming interfaces (APIs)) or other software interfacing techniques as appropriate. Such libraries or APIs provide operative coupling between various software implemented components of FIG. 3. A "module" as used herein may be a software component. That is, the alarm signal processor 300, IVR call flow logic 380, SMS/MMS client 381, data retrieval modules 371, data ingestion modules 373, geofence module 375, mapping module 377, and one or more emergency network managers 379 are all operatively coupled to each other via APIs 378 and are operatively coupled to the IP protocol stack 355 and to the application agents 357 via APIs 358.

All of the components and modules described herein may be implemented as software or firmware (or as a combination of software and firmware) executing on one or more processors, and may also include, or may be implemented independently, using hardware such as, but not limited to, ASICs (application specific integrated circuits), DSPs (digital signal processors), hardwired circuitry (logic circuitry), or combinations thereof. That is, any of the components or modules disclosed herein may be implemented using an ASIC, DSP, FPGA executable instructions executing on a processor, logic circuitry, or combinations thereof. In other words, the components and modules may be implemented as hardware, software or by combinations thereof. Therefore, each of the components and modules disclosed herein may be considered a type of apparatus that may be implemented and operate independently from the other components in the system. For example, any one of the data retrieval modules 371, data ingestion modules 373, geofence module 375, mapping module 377, queue entry correlation logic 382, false alarm detection logic 320, alarm signal processor 300, IVR call flow logic 380, SMS/MMS client 381, or emergency network managers 379 may be implemented using an ASIC, DSP, FPGA, executable instructions executing on a processor, logic circuitry, or combinations thereof. In one example embodiment, the alarm signal processor 300, geofence module 375 and mapping module 377 may be implemented together as a single ASIC that is operatively coupled to the at least one processor 310.

The various embodiments also include computer readable memory that may contain executable instructions, for execution by at least one processor, that when executed, cause the at least one processor to operate in accordance with the emergency data manager 100 and other functionality herein described. The computer readable memory may be any suitable non-volatile, non-transitory, memory such as, but not limited to, solid-state storage (SSS) such as a solid-state device (SSD) or solid-state disk, programmable chips such as EEPROMS, flash ROM (thumb drives), compact discs (CDs) digital video disks (DVDs), optical drives, etc., that may be used to load executable instructions or program code to other processing devices or electronic devices such as those that may benefit from the features and methods of operation herein described. The executable instructions may also include the various operating system environments and the kernel. For example, the memory 330, which is a non-volatile, non-transitory memory, may store executable instructions for execution by the at least one processor 310 that when executed, provide the data retrieval modules 371, data ingestion modules 373, geofence module 375, mapping module 377, queue entry correlation logic 382, false alarm detection logic 320, alarm signal processor 300, IVR call flow logic 380, SMS/MMS client 381 or emergency network managers 379.

The emergency data manager 100 is operatively coupled to a geofence database 101 which stores jurisdictional boundary data for various emergency networks 170 as well as for the national or regional emergency networks. The geofence module 375 is operative to access the geofence database 101 and determine which emergency network 170 should receive specific emergency data obtained by the data ingestion modules 373, based on analysis of the geofences specified in the geofence database 101. The emergency data manager 100 is operative to store and retrieve emergency data from the various databases 120, and may function as an interface between emergency networks, the various databases 120 and devices 160 to receive and store emergency data. The stored emergency data can be transmitted or distributed to emergency networks and emergency responder devices 150 before, during, or after emergencies. The emergency data manager 100 is operatively coupled to a protected data database 191 which stores protected data related to emergencies. Protected data is either not stored by the emergency data manager 100 or is stored only for a predetermined period of time as defined by laws, regulations or policies, in the protected data database 191. The emergency data manager 100 may receive emergency data from any of the devices 160 and such data may include, but is not limited to, locations, medical history, personal information, or contact information. The emergency data manager 100 may receive emergency data from any of the devices 160 and such data may include, but is not limited to, locations, medical history, personal information, or contact information. The emergency network managers 379 are operative to check emergency network credentials to determine authorization and access levels to protected data stored in the protected data database 191 or in the other databases 120.

The emergency data manager 100 includes data ingestion modules 373 and data retrieval modules 371. The data ingestion modules 373 are operative to communicate with the various databases 120 and with the various alarms 196 and sensors 197 to obtain emergency data and may include a location ingestion module, an additional data ingestion module, and one or more multimedia ingestion modules.

The location ingestion module is an emergency location service ingestion interface which is operative to post or receive emergency locations. The location ingestion module may be a REST API that is operative to receive an HTTP POST including location data when an emergency alert 105 is generated or when an emergency call 103 is received from a device 160. The location data may include a location generated concurrently or in response to the generation of the emergency alert 105, which may initiate an emergency call 103 or emergency session for requesting emergency assistance. This generated location data may be, for example, location data from a device 160 GPS chipset, such as GPS coordinates. This data may also include data from a device 160 inertial-measurement-unit (IMU). The location data may be generated before an emergency alert 105 such as, for example, when a medical bracelet IMU detects that a patient has fallen. In another example, when an emergency call 103 is made from a device 160, the location ingestion module of the data ingestion modules 373 may receive a location recently generated by the device 160 GPS chipset, or by a device 160 triangulation algorithm, or other device 160 location mechanism, thereby ensuring that a location for the emergency is available as quickly as possible. The location data may include a device-based hybrid location generated by a device 160 which has sent an emergency alert 105. A GPS chipset within the device 160 may generate the location data. The location data may also include a location data generated by a second device 160 that is communicatively coupled to the device 160 that sent the emergency alert 105. For example, a wearable device such as a medical bracelet or smartwatch, that does not include location capabilities, may use the location services location from a mobile phone with which it is paired. The location ingestion module of the data ingestion modules 373 may communicate with a device 160 via a mobile application installed on the device 160 or via firmware or an operating system of the device 160.

The location data generated by a device 160 prior to an emergency occurrence may be accessible by an authorized one (based on device 160 location) of the emergency networks 170 during an emergency. For example, a taxi company may have software that transmits the location of its cars or assets to the emergency data manager 100, or another server, preemptively. Thus, when an emergency arises, the location of the affected taxi can be made accessible quickly to send for help. Further, location data generated by a device 160 after an emergency has commenced may be made accessible to one of the emergency networks 170 during the on-going emergency. For example, updated location data of a hijacked taxi may be periodically transmitted to the emergency data manager 100 and made accessible to one or more of the emergency networks 170.

The data ingestion modules 373 may also provide an interface for posting or receiving static or dynamic emergency profile data. Such additional data may include, but is not limited to, medical data, personal data, demographic data, and health data, which may be obtained from the various databases 120. For example, medical data may include information relating to a person's medical history, such as medications the person is currently taking, past surgeries or preexisting conditions. Personal data may include a person's name, date of birth, height, weight, occupation, addresses such as home address and work address, spoken languages, etc. Demographic data may include a person's gender, ethnicity, age, etc. Health data may include information such as a person's blood type or biometrics such as heart rate, blood pressure or temperature. Additional data may further include data received from connected devices such as vehicles, IoT devices 113, and wearable devices such as medical bracelet 109, smartwatch 111 or other devices, alarms 196 and sensors 197, etc. Each of the sensors 197 may be IoT devices. Some sensors may be clustered and connected to a centralized sensor hub that is operative to connect to the Internet 190 and communicate with the emergency data manager 100 via the data ingestion modules 373.

The data ingestion modules 373 are operative to receive data from alarms 196 and from sensors 197. Some alarms 196 may also be accompanied by, or integrated with, various sensors. For example, intelligent vehicle systems may generate and send sensor data regarding a crash, such as the speed at which the vehicle was moving just before the collision, where the vehicle was struck, the number of occupants, etc. as part of, or along with, a collision alarm indication. The data ingestion modules 373 may be implemented in whole or in part using a REST API, for example using JSON (JavaScript Object Notation).

In one example of operation, if an emergency call 103 is made from a mobile phone, or if an emergency alert 105 is sent, the mobile phone may receive a heart rate of the person who made the emergency call from a smartwatch 111 worn by the person and communicatively coupled to the cell phone via a Wi-Fi™ or Bluetooth™ connection or some other wireless connection. The mobile phone may therefore send the heart rate to the data ingestion modules 373, along with any other additional data, in an HTTP POST. The data ingestion modules 373 may communicate with a device 160 via a mobile application installed on the device 160 or integrated into the firmware or operating system of the device 160. Additional data may also be sent to the data ingestion modules 373 from a network server. The data ingestion modules 373 may be accessed by any connected platform that receives data that might be relevant in an emergency. Connected platforms, such as the various databases 120, may therefore send additional data to the data ingestion modules 373 at any time. A website, web application, or mobile application may communicate with the data ingestion modules 373 and may allow device 160 users to create profiles to send additional data included in the profiles to the data ingestion modules 373 every time a profile is created or updated. Profiles may also be created for each of the alarms 196 and sensors 197 such that the data ingestion modules 373 receive additional data in addition to alarm data, such as a keyholder's phone number or other contact information, medical information, or other information contained in the profile, etc.

The data ingestion modules 373 may also include a multimedia ingestion module to provide an interface for posting or receiving data such as audio or video streams obtained during an emergency from a device 160 or sensor 197 that is proximal to the emergency, for example data may be received from a video camera operating as a sensor 197 or from some other type of sensor such as a gunshot detection system. In one example of operation, if an emergency alert 105 is generated by an intelligent vehicle system installed in a vehicle in response to the vehicle experiencing a collision, the emergency alert 105 is sent to one of the emergency networks 170 by the intelligent vehicle system or by another device 160 communicatively coupled to the intelligent vehicle system, such as a mobile phone coupled to the intelligent vehicle system via Bluetooth™. In response to generating the emergency alert 105, the intelligent vehicle system, or a proximal camera serving as a sensor 197, may additionally begin streaming audio and video from microphones and cameras. The intelligent vehicle system may include cameras installed inside or outside of the vehicle. The streaming audio and video are streamed to the emergency data manager 100 through the data ingestion modules 373. A mobile phone communicatively coupled to the intelligent vehicle system may additionally or alternatively stream audio or video from microphones and cameras integrated into the mobile phone to the emergency data manager 100 through the data ingestion modules 373. One or more multimedia ingestion modules of the data ingestion modules 373 may be implemented wholly or partly using REST APIs that are accessed with an HTTP POST. Audio or video may also be collected in response to the data ingestion modules 373 receiving data from one of the alarms 196.

After receiving the relevant data, the data ingestion modules 373 can store the data in one or more databases operatively coupled to the emergency data manager 100, such as the protected data database 191. The emergency data manager 100 may be operatively coupled to databases such as, but not limited to, a location database, the geofence database 101, the protected data database 191 etc. The emergency data manager 100 databases may also be operatively coupled to, or otherwise accessible by, one of the emergency networks 170. The data ingestion modules 373 are operative to tag or otherwise associate received data with an identifier of a user or specific device 160 associated with the data. For example, the data ingestion modules 373 may tag received data with a user ID number, an email address, or a phone number (i.e. caller ID), a MAC address, an alarm ID, a sensor ID, or other device or user identification information, etc. The data ingestion modules 373 may also tag received data based on the data source using, for example, a device name or type, an application name, user name, phone number, corporate account, or etc. All data received by the data ingestion modules 373 is also analyzed by the geofence module 375 to determine which emergency network 170 should receive the data. Alarm 196 data is also analyzed by the alarm signal processor 300, as well as by the false alarm detection logic 320 and queue entry correlation logic 382, to determine an alarm scoring and determine whether the alarm is a false alarm or not, prior to pushing alarm data to an emergency network entity. The queue entry correlation logic 382 analyzes whether an alarm queue displayed on the emergency data manager portal at the relevant emergency network entity, already has a display entry related to the incoming alarm. If so, the queue entry correlation logic 382 will either make a suggestion to the network entity operator to combine alarm queue entries, or will do so automatically depending upon the specific emergency network's operational procedures and preferences which may be specified in the en profiles 335 and alarm profiles 337 stored in memory 330.

An individual or group of individuals may be associated with multiple identifiers. In an example of operation, if the data ingestion modules 373 receive a location generated by a phone associated with the phone number +1-555-555-5555, associated with John Doe, the data ingestion modules 373 may also receive a heart rate from a smartwatch associated with the email address jobndoe@email.com, which is an identifier that is also associated with John Doe. In this example, the data ingestion modules 373 tag the location with the phone number "+1-555-555-5555," and tag the heart rate with the email address "johndoe@email.com," thereby associating both the location and the heart rate with John Doe in the emergency data manager 100 databases. An alarm ID corresponding to one of the alarms 196 may also be associated with a phone number and email address associated with an individual or group of individuals. The queue entry correlation logic 382 checks incoming emergency calls against alarm ID databases and determines whether incoming emergency calls are related to alarm entries in the emergency data manager portal alarm queue, and suggests combining these entries on the display to the emergency network entity operator. As discussed above, specific emergency network operating procedures and preferences may be set to enable the queue entry correlation logic 382 to combing queue entries on the display automatically without operator intervention. The settings may alternatively allow the suggested combinations to be accepted or rejected by the emergency network entity operator.

Ingestion data that enters the emergency data manager 100 may include various data fields and associated data entries within the data fields. The emergency data manager 100 maintains a list of expected data fields so that the data entries can be entered within a specific data field.

The emergency data manager 100 may include data retrieval modules 371 such as a location retrieval module, an additional data retrieval module, and one or more multimedia retrieval modules. For example, a location retrieval module may provide an interface for retrieving location data from the emergency data manager 100 databases. The location retrieval module may be implemented wholly or partly via a JSON REST API that is operative to receive a query or request such as, but not limited to, an HTTP GET request, from the emergency networks 170 or an emergency responder device 150.

The data retrieval modules 371 may provide a single GET endpoint for retrieving either the latest or paginated list of locations for a specific caller ID, and/or associated protected data from the protected data database 191. For example, a phone number associated with a device 160 from which a location was received may be included in a header, body, or metadata of a request sent to the data retrieval modules 371. The emergency data manager 100 may then retrieve a location or set of locations from the emergency data manager 100 databases and deliver the location or set of locations to the relevant authorized emergency network 170 or to an emergency responder device 150 associated with the authorized emergency network. The location retrieval module of the data retrieval modules 371 may be a location information server (LIS), in which the LIS may further be a NG911 standards-based XML API for the retrieval of location data from the emergency data manager 100 databases. The location retrieval module of the data retrieval modules 371 may be operative to accept HELD requests from the emergency networks 170 or from emergency responder devices 150 and to return location data for a specific caller ID or anonymous reference.

The data retrieval modules 371 may also include an additional data retrieval module implemented as a JSON REST API for the retrieval of emergency or additional data. Additional data may include, but is not limited to, medical data, personal data, demographic data, health data or other data which may be protected data. Additional data may also include data received from connected devices 160 such as, but not limited to, vehicles, IoT devices, and wearable devices, alarms 196 and sensors 197. The additional data retrieval module of the data retrieval modules 371 may be operative to receive a query or request, such as an HTTP GET request, from an emergency network 170 or emergency responder devices 150. The additional data retrieval module of the data retrieval modules 371 may then, in response to a request, retrieve additional data associated with a specific or particular identifier of a user or a device 160 associated with the user, such as a phone number, and return the data to the emergency network 170 or emergency responder device 150. The data retrieval modules 371 may further include one or more multimedia retrieval modules, which function similarly to the location retrieval module and additional data retrieval module, for the retrieval of data stored in the emergency data manager 100 databases not retrieved by the location retrieval module or additional data retrieval module such as multimedia streaming data.

The emergency data manager 100 determines which of the emergency networks 170 and associated emergency responder devices 150 have authorization to receive particular types of emergency data. The emergency network managers 379 are operative to access emergency network profiles 335 and determine access levels to emergency data for emergency network entities and personnel. For example, a given emergency network 170 or emergency responder device 150 may, in certain circumstances, be granted access only to a particular subset of emergency data. For example, a police officer may only be given access to the location emergency data, while an EMT (emergency medical technician) may only be given access to an additional data emergency data. However, a given emergency network such as a national or regional emergency network, or associated emergency responder device 150, may be given differential access to the entirety of the emergency data, or to particular emergency data categories within the databases based on any factor or set of factors. A management portal may be provided by the emergency network managers 379 to determine which emergency data categories are returned from one of the emergency networks 170 to a particular emergency network 170 or emergency responder device 150. Other data services corresponding to the various databases 120 may also be coordinated with respect to granting access to protected data.

During an emergency, the emergency data manager 100 is operative to detect the emergency and/or otherwise identify the need to provide emergency data pertaining to the emergency. In response to detecting an emergency, the emergency data manager 100 is operative to identify any emergency data pertaining to the emergency stored within the databases 120 and protected data database 191, and retrieve and transmit the pertinent emergency data to the appropriate emergency network 170. The emergency data manager 100 may act as a data pipeline that automatically pushes emergency data to emergency networks that would otherwise be without access to emergency data that is critical to most effectively and efficiently respond to an emergency. Location data stored within, and/or obtained and provided by, the emergency data manager 100, enables emergency responders to arrive at the scene of an emergency faster, and the additional emergency data stored within, and/or obtained and provided by, the emergency data manager 100 enables emergency responders to be better prepared for the emergencies they face. The alarm signal processor 300 performs scoring operations for alarm data from alarms 196, and pushes alarm data to emergency network entities which enable emergency network personnel to prioritize dispatch operations and avoid responding to false alarms.

The emergency data manager 100 is operative to provide a cloud-based application to multiple emergency networks 170 by establishing network connections via the IP protocol stack 355, with various emergency network entities such as a call handling workstation, CAD workstation etc. Other examples of emergency network entities include, but are not limited to, servers, desktop computers, laptops, routers, switches, etc. that are operative to send and receive data. The network connections may be transport control protocol (TCP) connections and may utilize WebSocket connections between the emergency data manager 100 and an emergency network entity. The geofence module 375 is operative to determine emergency network jurisdictional boundaries and to show the jurisdictional boundaries on a graphical user interface as a jurisdictional map view. The mapping module 377 is operative to generate the jurisdictional map view and to also post emergency data locations as location indicators on the map. For example, location indicators may show the location of incoming emergency calls that the emergency network has received, or is receiving, as well as any incoming alarms and alerts. The emergency network managers 379 provide authentication and login capabilities for the various emergency networks and enable APIs 378 for communication between the emergency network entities and the data ingestion modules 373, data retrieval modules 371, alarm signal processor 300, IVR call flow logic 380, queue entry correlation logic 382, false alarm detection 320, geofence module 375, and mapping module 377.

Emergency networks 170 and their corresponding emergency network entities are associated with a given geographic boundary. Based on the geographic boundary for a respective emergency network 170, a jurisdictional map view customized for the respective emergency network 170 may be generated and provided to emergency network entities 140, such as workstations, for display. Within the jurisdictional map view for a given emergency network 170, location indicators for emergencies occurring within its geographic boundary may be displayed. The jurisdictional map view for a given emergency network 170 may include one or more geofences associated with the respective emergency network 170 and surrounding areas. For emergency data received by the emergency data manager 100, the emergency data manager 100 may perform a geospatial query of all devices with a given geographic boundary using the geofence module 375, to search for additional emergency data related to the received emergency data and to obtain data from those devices such as sensors 197.

The geofence module 375 is operative for managing geofence data for emergency networks 170 including assigning geofences to one or more emergency responder devices 150 or emergency network members, etc. The emergency data manager 100, via the geofence module 375, is operative to filter all incoming emergency data related to devices 160, alarms 196 and sensors 197 by geofences. Emergency networks 170 utilize geofences that define jurisdictional boundaries within which a specific emergency network is authorized to respond to emergencies. For example, a city police department may have jurisdictional authority over the entire city, or of only a portion of the city. A geofence would represent the perimeter of the portion of the city that the respective police department serves. A geofence may therefore be considered a representation of a virtual perimeter overlaying a real-world geographic area.

Geofences may be used to define a county boundary, a state boundary, a collection of postal/zip codes, a collection of cell sectors, or etc. A geofence may be defined using simple shapes such as rectangle, triangle, circle, etc., or may be defined using complex polygons, etc. Geofences may also refer to approximations where the “approximated” geofence encloses an approximation of a jurisdictional boundary or some other boundary and may also include buffer regions extending outside the perimeter, for example one-mile or such beyond the primary geofence perimeter.

Some geofences can be dynamically generated by the emergency data manager 100. For example, a dynamic geofence may be generated as a radius around a point location at which an emergency is occurring. In another example, a geofence may be represent non-emergency network boundaries such as school zones or neighborhood boundaries, etc. The use of a geofence is referred to as geofencing. One example of geofencing involves a location-aware device or a location-based service (LBS) monitoring when the device enters or exits a given geofence. This means that the device is monitored within the geographic boundaries defined by the given geofence. Entry or exit from given geofence by the device may trigger an alert to the device's user as well as messaging a given network monitoring the geofence. The monitoring network may be an emergency network 170 but could be other types of networks as well. The geofence information may contain the device location, which could be sent to a mobile telephone, an email account or to some other system or network entity.

In the context of emergency services, one or more geofences may correspond to the jurisdictional boundaries of an emergency network 170. The emergency network 170 may be operated by a public entity and may be for example, a public safety answering point (PSAP), a police department, a fire department, a federal disaster management agency, national highway police, etc., which have jurisdiction over a designated area and, sometimes, overlapping areas. Geofences are used to define the jurisdictional boundaries using various Geographic Information System (GIS) formats. A GIS file format refers to one or more standards for encoding geographical information into a computer file.

For maintaining the privacy, security and integrity of emergency data, geofencing is applied to ensure that emergency data flows only the emergency network 170 having authority to access the information and responds to the given emergency. Applying geofence filters to the emergency data also allows additional avenues for monitoring, both visibility and control, over the emergency data manager 100 to detect anomalies or spikes and to reduce the risk of security breaches. The geofence module 375 monitors all accesses to emergency data, both incoming and outgoing from the emergency data manager 100 and is operative to filter emergency data to the appropriate authorized emergency network 170 or emergency responder device 150.

In an example of emergency data manager 100 operation, an emergency alert may be triggered by a given device 160, for example by fall detection, by a user pressing a soft button, a physical button, initiating a voice command, or gesture, or autonomously based on sensor data such as from a smoke detector. In this example, the user may be prompted to confirm the emergency or otherwise provide authorization for sending the emergency alert. However, for a fall detection scenario, a confirmation would not be required because the patient may be incapacitated. Emergency data, such as an enhanced location and additional data regarding the user, such as the user's medical history, may then be delivered by the device 160 to the emergency data manager 100 and stored in a database such as protected data database 191. The emergency data manager 100 may format the emergency data into a format that is compatible with industry standards for storing and sharing emergency data. For example, the emergency data may be formatted to be compatible with National Emergency Number Association (NENA) standards. The emergency data manager 100 may then perform a push operation to push the emergency data to an authorized emergency network entity. After the push operation, the emergency data manager 100 may delete any temporarily stored data if required for compliance with privacy laws, regulations and policies. For medical data, the emergency data manager 100 may push a candidate profile that provides basic information to be used by emergency network 170 personnel to identify a patient. Once the emergency network 170 personnel select the candidate profile on their emergency data manager portal GUI 143, the protected data for which they are authorized to receive will be pushed to their emergency network entity 140. Likewise, emergency personnel in the field may receive the protected data using an emergency data application and via a GUI 155 on an emergency responder device 150.

Alternatively, or in addition to push operations, emergency data may also be obtained by the emergency networks 170, such as by a PSAP responding to an emergency alert, by sending a query to the emergency data manager 100. The query may be an emergency data request using, for example, an HTTP GET request. The emergency data request may also be in the form required by the Location Information Server (LIS) protocol. In response to the emergency data request, the emergency data manager 100 sends an appropriate response including relevant emergency data to the requesting party via an encrypted pathway. The emergency data request may be in the form of an HTTP-Enabled Location Delivery (HELD) and the response from the emergency data manager 100 may be in the form of a Presence Information Data Format Location Object (PIDF-LO) as defined by the Internet Engineering Task Force (IETF).

The emergency data request includes an authorization code, also referred to as an "authorization token", in the body, header, or metadata of the request, and the emergency data manager 100 checks that the authorization code is active before providing a response to the requesting party. Authorization may be provided in the "Authorization" header of the emergency data request using HTTP Basic Authentication. For example, authorization may be a base64-encoded user name and password for an account associated with the requesting party. Emergency data requests are sent over public networks using API access keys or credentials. Transport Layer Security (TLS) may be used in the requests and responses from the emergency data manager 100 for encryption security. In some implementations, the API access keys or credentials are sent using Extensible Markup Language (XML) in a message header and may be further encrypted for additional security. If an emergency data request includes an inactive or expired credential or access key, an error response may be generated and sent to the requesting entity by the emergency data manager 100. The emergency network managers 379 are operative to verify the access keys or credentials and enable the data retrieval modules 371 to respond to verified authorized emergency data requests by sending the pertinent emergency data.

Emergency data may include locations and additional data such as protected data. Emergency data may include one or more emergency data categories, also referred to as "data categories". The emergency data categories may include, for example: service data reference, full name, email, emergency contacts, addresses, language, occupation, phone numbers, websites, gender, height, weight, ethnicity, profile picture, allergies, medical conditions, medications, disabilities, blood type, medical notes, birthday, and additional comments. Emergency data categories may be tagged with tags for specific types of data such as "demographics" or "medical data." For example, gender, height, weight, ethnicity, profile picture (image-url) may be tagged as demographic data. Medical data protected under HIPAA and other laws may be tagged as "HIPAA" or "private." Medical data may include information on one or more of allergies, medical conditions or illnesses, medications, disabilities, blood type, medical notes, and other medical information. Medical information protected under HIPAA are encrypted and/or anonymized. Some data are tagged as "general" or another similar tag, wherein access is not specifically restricted.

The emergency data manager 100 may store emergency data requested by an emergency network entity 140 in a remote database, such as the protected data database 191, for a certain period of time after receiving the request for the emergency data regarding a user and any electronic devices 160. A purge period of time may be set as a timer value, such as a timer countdown or a set time point, which may be defined by the emergency network that sent the emergency data request. An emergency data purge period may be, for example an interval between one to forty-eight hours, or between one to twelve hours. However, a purge period may be less than one hour due to security and privacy concerns, such as between one and forty-five minutes, or any time interval from five to thirty minutes.

After a timer for an emergency data purge has expired, and if no new requests for the emergency data pertaining to the particular user and the particular electronic device 160, or other devices associated with the user, are received, the emergency data manager 100 may mark any particular related database entries for deletion and wait for another, different, time-out interval. After a particular second time-out interval has also been completed, and if no new requests for emergency data for the particular user or associated electronic devices 160 are received, then the emergency data manager 100 may remove the specific marked entries from the databases in the next cycle of database updates.

After adding the emergency data in a database such as protected data database 191, the emergency data manager 100 may proceed to keep updating the emergency data on a periodic, or as-needed basis. In other words, the data regarding a user or electronic device 160 is kept current such that the most recent and accurate emergency data can be provided to emergency responders. The emergency data manager 100 is updated with emergency data from devices 160, and/or databases 120, for all the emergency data pertaining to all users and their associated electronic devices 160. As an alternative to having a purge period defined by a timer, a purge period may be based on an on-going emergency session such as an emergency call. For session-based purging, emergency data may be deleted after the emergency session has been terminated. To further ensure that the specific emergency data is no longer required, session-based emergency data purging may be performed after a predetermined time delay following emergency session termination, such as a time delay of between one and fifty minutes. A time delay is also beneficial in the case of dropped calls, follow-up calls, etc.

In some non-emergency situations, there is a need to access location data, user data, emergency data or sensor data. For example, a user of an electronic device 160 may grant authorization to family members to access the user's location data. Accordingly, if a family member requests location data for a user, access is granted if there is proper authorization. In another example of location data access, an employee may be required to share location data with an employer, for example through a corporate operations center, such that the corporate operations center is notified when the employee is in an emergency. In another example, a taxi operations company may request and obtain location data of one or more fleet members to keep track of its vehicles, for example, via an onboard vehicle console or terminal. All of these emergency data accesses are monitored by the emergency data manager 100 and are subject to proper authentication credential before being provided.

The alarm signal processor 300 receives alarm and sensor data from the data ingestion modules 373, and to push the alarm and sensor data to an emergency network entity within an emergency network have a geofence that includes the location at which the alarms and sensors are located. The alarm signal processor 300 provides an alarm queue displayed on an emergency data manager portal at an emergency network entity, and monitors the queue to ensure that each alarm condition is handled by emergency network personnel. After a predetermined period of time, if the alarm is not handled or cleared, the alarm signal processor 300 is operative to establish an IVR call, i.e. a robocall, to an emergency network using the IVR call flow logic 380. The call provides an interactive menu so that the emergency network entity operator can locate the alarm in an alarm queue and verify that an action will be taken, such as emergency dispatch. Once the alarm signal processor 300 receives the verification via the IVR call flow logic 380, the alarm will no longer be monitored by the alarm signal processor 300 from the standpoint of the emergency network entity alarm queue.

The alarm signal processor 300 may also obtain alarm verification from a contact using the IVR call flow logic 380. For example, for unverified alarms the IVR call flow logic 380 may initiate a call to contacts associated with the alarms and provide and IVR response menu to the contact if they answer the call. For example, a message may be played to the contact such as, "A fire alarm was detected at your home, to verify this alarm please press one, if this is a false alarm please press two." Once a response is received, the alarm signal processor 300 will add a score to the alarm in an alarm queue on the emergency network entity emergency data manager portal GUI 143 that indicates whether the alarm has been verified or if it is a false alarm. False alarms may be automatically cleared from the alarm queue and/or may not be pushed to the emergency network entity such that they never appear on the emergency data manager portal GUI 143.

The alarm signal processor 300 may also send a text or multimedia message using the SMS/MMS client 381 and wireless modem 303 to a contact to request alarm verification. The text or multimedia message may also be sent to a contact's mobile device via the Internet without using the wireless modem 303. Similar to the IVR call, a message may include a query such as "reply to this message with "1" to verify this alarm or "2" if this is a false alarm. Messages may be sent subsequent to IVR calls, or at the same time in order to increase the probability of receiving a quick response.

Figure 4:
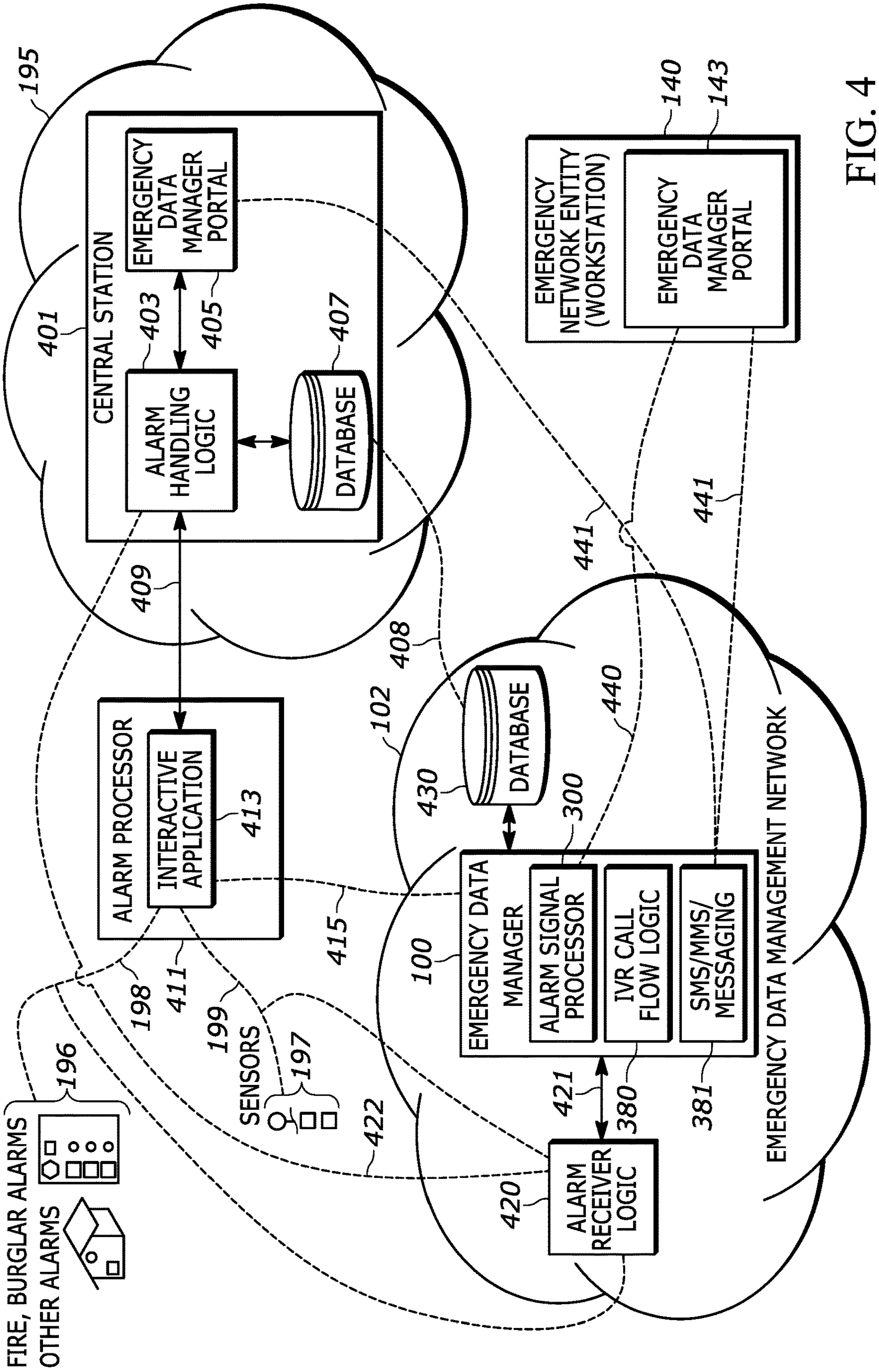
FIG. 4 is a diagram illustrating an emergency data manager in communication with an emergency network entity, an alarm screener network, and alarms and sensors.

FIG. 4 is a diagram illustrating further details of a screener network 195 and an example of interconnection with the emergency data management network 102. The example implementation shown in FIG. 4 provides full redundancy of alarm traffic reception with a first alarm traffic path to the screener network 195 and a second redundant alarm traffic path to the emergency data management network 102.

The screener network 195 includes a central station 401 that is operatively coupled to an alarm processor 411. The central station 401 includes alarm handling logic 403 which is operatively coupled to a database 407. The database 407 contains all customer information including contact information for owners of the alarms 196 and sensors 197. The alarm handling logic 403 is operative to receive alarm data and sensor data via connection 422 from alarm receiver logic 420. The connection 422 may be an Internet connection and may utilize various APIs for communication of data. The alarm receiver logic 420 is operative to route and identify which account each alarm is coming from, and to assign a unique identifier to each incoming alarm. For example, each alarm may have a contact identifier that includes a subscriber identifier, an event code and a zone or user number among other information. The DNIS (Dialed Number Identification Service) is used to assign a dealer receiver ID. A dealer receiver ID is usually four digits which identifies the dealer, or if it is a large dealer, a subset of their accounts. The dealer ID is paired with the account ID at the start of the Contact ID string which consists of four digits. The account number for the account is constructed by combining the eight digits together, and this is what the central station 401 uses to identify and assign signals to accounts.

The event code may be, for example a three-digit code that specifies medical, fire alarms, panic alarms, burglar alarms, general alarms, and other non-burglary alarms, supervisory alarms of various types and sensors of various types without limitation. In other words, the event code specifies the alarm type or sensor type for which alarm or sensor data is received.

The alarm handling logic 403 at the central station 401 is operative to communicate with an emergency data manager portal GUI 405. The emergency data manager portal 405 may be accessed using a web browser and may be provided by the emergency data manager 100 as a software-as-a-service (SaaS) GUI.

The alarm processor 411 may be owned and operated by an alarm system dealer, and includes an interactive application 413 that is operative to receive alarm data 198 and sensor data 199, and provide the alarm and sensor data to alarm handling logic 403 at the central station 401. The interactive application is operatively coupled to the alarm handling logic 403 via connection 409 which may be an Internet connection and may include one or more web socket connections and utilize application programming interfaces (APIs) to communicate.

The emergency data manager 100 is operatively coupled to, and in communication with, an emergency network entity 140, the alarm screener network 195, the alarm processor 411, alarms 196 and sensors 197. The alarm receive logic 420 may be included in the emergency data management network 102 and may be implemented via hardware to receive alarm data 198 and sensor data 199 provide alarm and sensor data to the alarm signal processor 300 via connection 421. The alarm receive logic 420 may also provide alarm and sensor data to the alarm handling logic 403 via connection 422. In some implementations, the alarm receive logic 420 may be a separate cloud-based function such as an SaaS function that handles the alarm and sensor inputs and provides the data to the alarm signal processor 300 via an Internet connection and using APIs.

The emergency data manager 100 is operative to communicate with the interactive application 413 using various APIs via a connection 415 which may be an Internet connection. In some implementations, the emergency data manager 100 may communicate the alarm and sensor data to the interactive application via connection 415 such that the interactive application 413 does not need any direct communication with the alarms 196 and sensors 197 or with the alarm receive logic 420.

The alarm signal processor 300 is operative to process all incoming alarm data 198 and sensor data 199 and communicate alarms to the emergency data manager portal GUI 143, which is a GUI operating on the emergency network entity 140. The alarm signal processor 300 maintains one or more persistent web-socket connections over Internet connection 440 to the emergency data manage portal 143 to communicate the alarm information. The emergency data manager 100 facilitates a secured chat communication capability via the SMS/MMS/messaging client 381 and an Internet communication link 441 between the emergency data manage portal 405 at the central station 401, and the emergency data manager portal 143 at the emergency network entity 140.

Alarm information communicated to the emergency data manager portal GUI 143 that is communicated from the emergency data manage 100 includes contact information from database 407 and is displayed in an alarm queue shown on the emergency data manage portal GUI 143. A lookup database 430 may include a mirror of the database 407 that is updated via a database connection 408 which may be an Internet connection. The lookup database 430 may contains supplemental static profile data and or other critical data that may be needed for cases in which alarm data received only includes contact identifiers but is missing such other critical information. Updates or changes to the database 407 made at the central station 401 may be reflected in the lookup database 430.

In operation of the emergency data manager 100, as alarms are received by the alarm signal processor 300 the associated contact identifier strings are interpreted and multiple associated alarm or sensor events are combined into a single alert record with time-stamped events. Alarms and sensor inputs are verified by the alarm signal processor 300 by placing IVR robo-calls and messages to the alarm contacts in order to receive verifications. The IVR robo-calls are facilitated by the IVR call flow logic 380 and messages are facilitated by the SMS/MMS/messaging client 381. Verified alarms are pushed to the emergency data manage portal GUI 143 for display in an alarm queue as verified alarms. Unverified alarms may also be pushed, but marked as unverified. Unverified alarms may not be pushed if the authority operating the emergency network entity 140 specifies that they do not wish to receive unverified alarms. The alarm signal processor also performs analysis on the alarm data 198 and sensor data 199 to perform false alarm detection using machine learning in addition to the verification procedures using IVR robo-calls and messages.

An operator at the central station 401 also sees incoming alarms received by the alarm handling logic 403 and may perform alarm verification by placing phone calls to alarm contacts. During an alarm situation, if an alarm is pushed to the emergency data manager portal GUI 143 at the emergency network entity 140, emergency network personnel may communication with staff at the central station 401 using the chat feature to the emergency data manager portal 405 at the central station 401. The central station 401 operator may also use the emergency data manager portal 405 to push alarms to the emergency network entity 140 for display in an alarm queue of the emergency data manager portal GUI 143. The emergency network entity 140 operator may then dispatch emergency responders to the alarm location.

The emergency data manager portal GUI 143 includes inputs such that an operator may receive, claim and confirm dispatch on each alert, in addition to providing a chat communication feature to the central station 401. The emergency data manager portal GUI 143 also provides a capability to associate incoming emergency calls, i.e. 9-1-1 calls, with alarms in the alarm queue.

Thus, in the example implementation of FIG. 4, there is complete redundancy of alarms and sensor data traffic to the central station 401 and the emergency data manager 100. The central station 401 performs alarm verification and the emergency data manger 100 performs further enhanced analysis and provides enhanced data to the emergency network entity 140.

Figure 5:
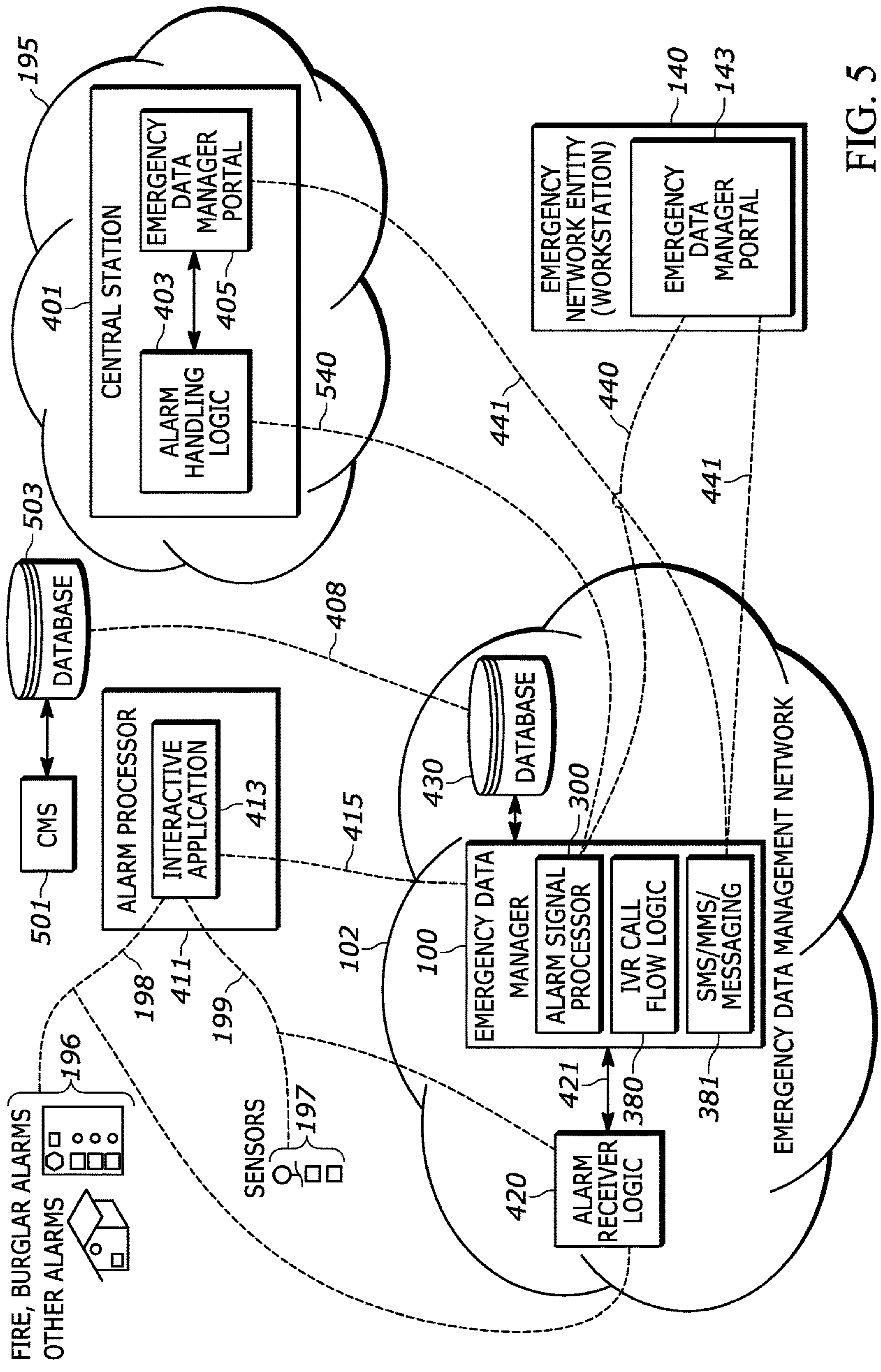
FIG. 5 is a diagram illustrating an emergency data manager in communication with an emergency network entity, an alarm screener network, an alarm customer management system database and alarms and sensors.

FIG. 5 is a diagram illustrating another example implementation of communication between a screener network 195, the emergency data management network 102 and an emergency network entity 140. In the example of FIG. 5, a customer management system (CMS) 501 is operatively coupled to a database 503 of all customer information for alarms. In this case, the lookup database 430 is operatively coupled to the database 503 via an Internet connection 408, and may mirror the database 503 in some implementations. In the example of FIG. 5, all alarm traffic flows through the emergency data manager 100 and is provided to the screener network 195 by the emergency data manager 100 over an Internet connection 540 to the alarm handling logic 403. The emergency data manager 100 can verify and send alarms to the emergency network entity 140 without any interaction from the central station 401.

Thus, in the example implementation of FIG. 5, the central station 401 may verify alarms as requested by the emergency data manager 100 and the emergency data manger 100 otherwise may handle all alarm and sensor data independently.

Figure 6:
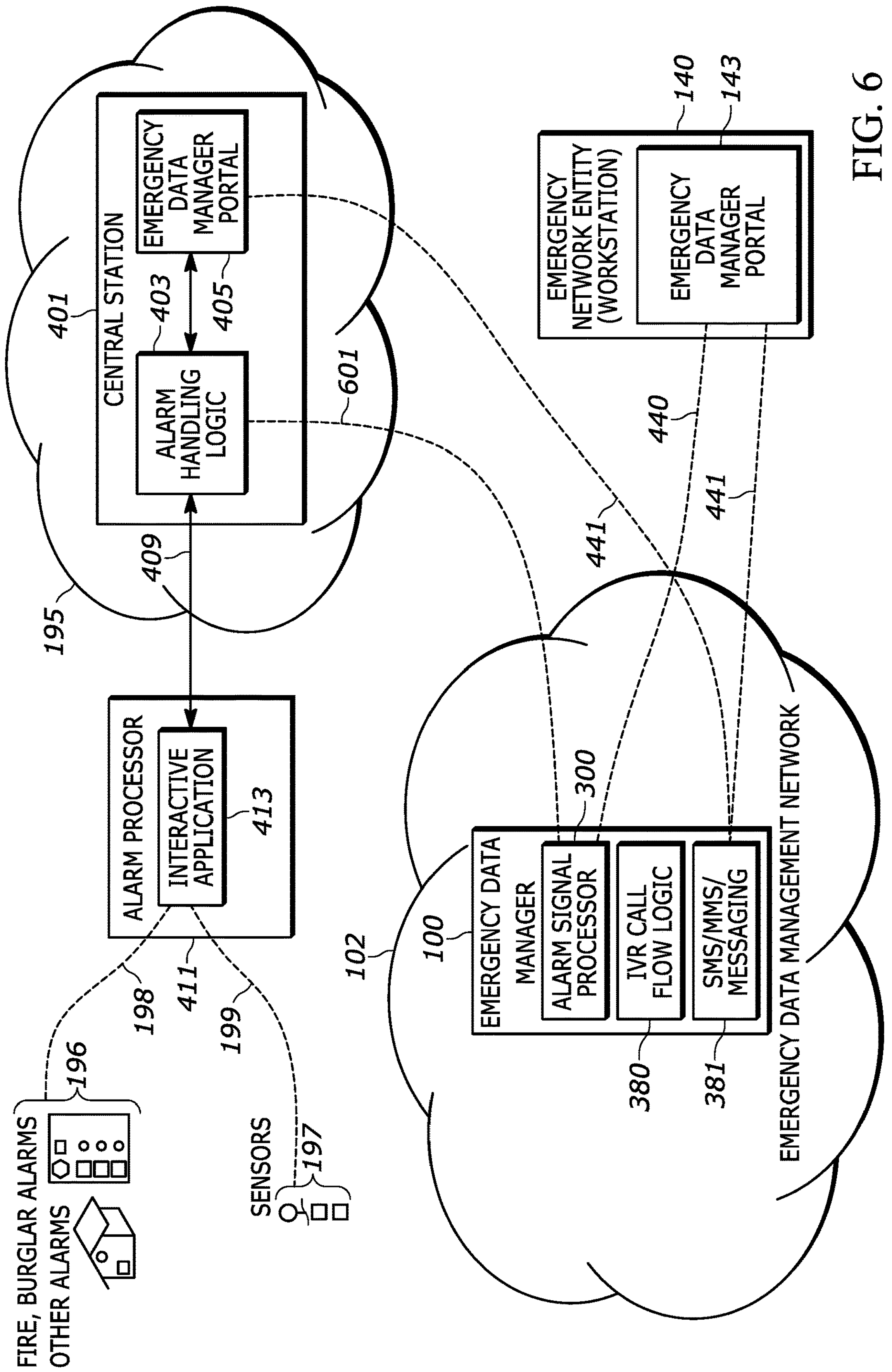
FIG. 6 is a diagram illustrating an emergency data manager in communication with an emergency network entity, and an alarm screener network.

FIG. 6 is a diagram illustrating another implementation of an emergency data manager 100 in communication with an emergency network entity 140, and an alarm screener network 195. The example implementation shown in FIG. 6 provides full redundancy of alarm traffic reception. In FIG. 6 the alarm handling logic 403 either includes, or is operatively coupled to alarm receiver logic. The alarm handling logic 403 is operatively coupled to the alarm signal processor 300 in the emergency data manager 100 via an Internet connection 601, and provides all alarm and sensor data via that connection. In the FIG. 6 implementation, there is no communication between the alarm processor 411 and the emergency data manager 100. As in the FIG. 4 implementation, the emergency data manager 100 may analyze alarm data separately from the central station 401 and provide enhanced alarm and sensor data to the emergency network entity 140 in conjunction with alarm verification by the central station 401. However, in the FIG. 6 implementation, alarms are only pushed to the alert queue of the emergency data manager portal GUI 143 from the emergency data manager 100.

Figure 7:
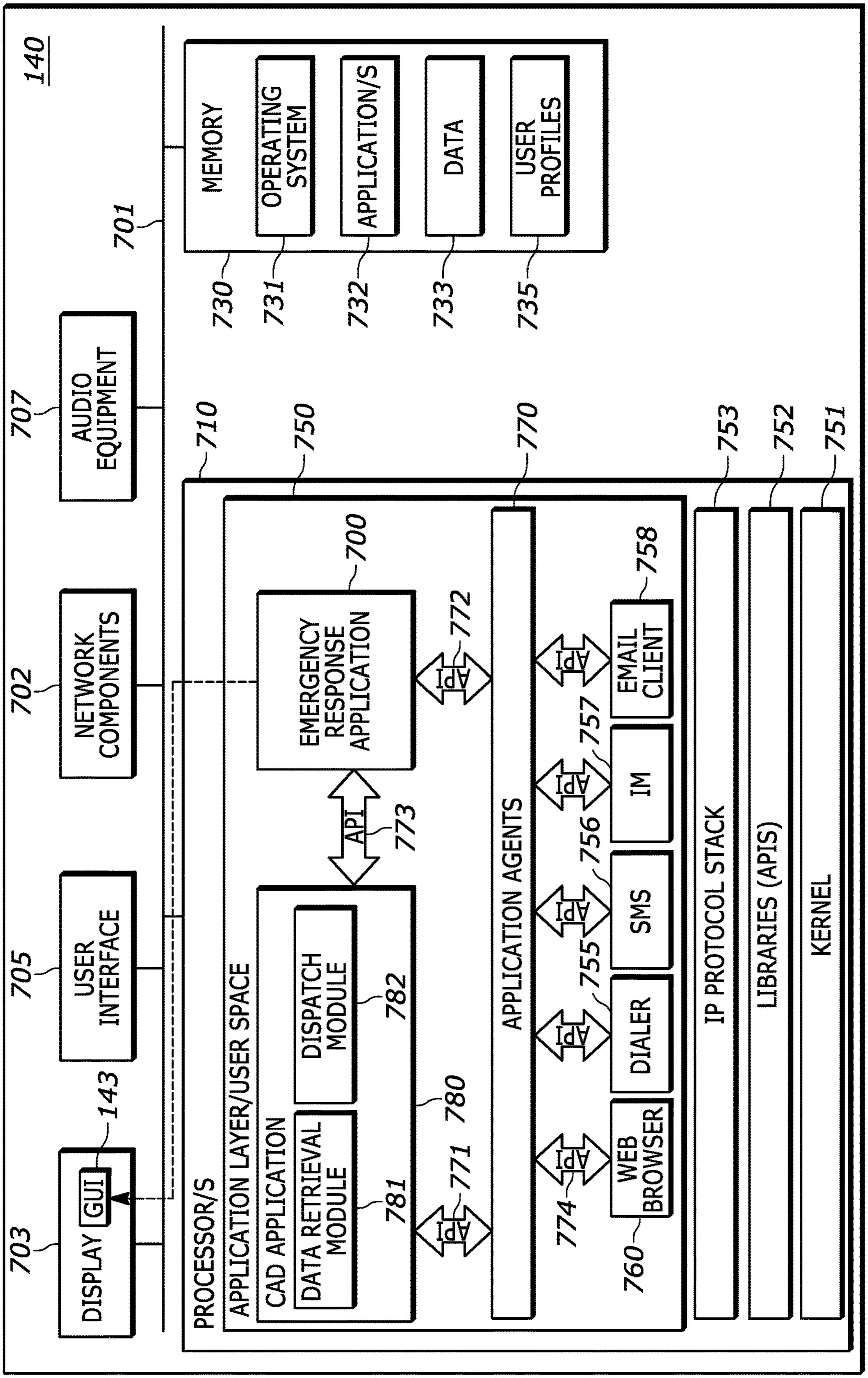
FIG. 7 is a diagram of an example emergency network entity, within an emergency network infrastructure, having an emergency response application in accordance with one embodiment.

FIG. 7 provides an example emergency network entity 140 which is a computer aided dispatch (CAD) workstation and is one example of an emergency network entity. An emergency network may be implemented with multiple emergency network entities of various kinds and therefore may have multiple workstations for example one or more call handling workstations, one or more CAD workstations, etc., in addition to routers, switches, hubs, access points, and other emergency network entities, etc. The example CAD emergency network entity 140 may include a display 703, a user interface 705, audio equipment 707, network components 702, at least one processor 710, and at least one non-volatile, non-transitory memory 730 in addition to RAM. All of the components of the emergency network entity 140 are operatively coupled by an internal communication bus 701. The network components may include one or more network transceivers for Ethernet connectivity to other workstations and devices and an Internet connection. The memory 730 stores executable instructions and data such as executable instructions for an operating system 731 and various applications 732. The memory 730 also stores data 733 which may provide data caching. User profiles 735 store emergency network personnel profiles including login credentials for authorized users of the emergency network entity 140.

The processor 710 may be implemented as one or more microprocessors, DSPs, ASICs, FPGAs, microcomputers, microcontrollers, digital signal processors, central processing units, state machines, logic circuitries, and/or devices that manipulate signals based on operational instructions. Among other capabilities, the processor 710 is configured and operative to fetch and execute computer-readable instructions (i.e. executable instructions) stored in the memory 730. For example, the applications 732 executable instructions, when executed by the at least one processor 710, may provide an operating system, a dialer application 755, a short-message-service (SMS) application 756, an instant message (IM) application 757, a web browser 760, an email client 758 and one or more instant message (IM) and voice applications which may each provide IM and voice call capability separately or in combination. The operating system may include a kernel 751, libraries 752 (also referred to as "application programming interfaces" or APIs), an IP protocol stack 753, and an application layer 750 or user space within which the various applications are executed.

In the example emergency network entity 140 of FIG. 7, the applications 732 executable instructions, when executed by the at least one processor 710, provide a standalone emergency response application 700 with associated emergency data manager portal GUI 143, a computer aided dispatch (CAD) application 780 including an data retrieval module 781, a dispatch module 782, and an associated GUI 142 described in FIG. 1. In the example implementation illustrated in FIG. 7, the emergency data manager portal 144 shown in FIG. 1 is operatively implemented as the standalone emergency response application 700 in accordance with an embodiment.

The standalone emergency response application 700 is operative to communicate with the emergency data manager 100 and to request emergency data such as medical data and other emergency data which may be protected data. For example, an API 772 enables communication between the emergency response application 700 and the IP protocol stack 753. Application agents 770 may also enable communication between the emergency response application 700 and other applications such as the web browser 760 which uses an API 774. The CAD application 780 may also communication with other applications using an API 771, and with the emergency response application 700 via an API 773.

The emergency data manager portal GUI 143 of the emergency response application 700 is operative to communicate with the emergency data manager 100 to send emergency data queries using a device identifier, and also to receive emergency data that is pushed to the emergency response application 700 by the emergency data manager 100. The alarm signal processor 300 also communicates with the emergency response application 700 to provide a queue of alarm events and to provide scoring related to the queue entry events.

The emergency response application 700 provides the emergency data manager portal GUI 143 on the emergency network entity display 703, and displays augmented emergency data such as, but not limited to, augmented location data received from the emergency data manager 100, and sensor data related to alarm events in an alarm queue. Communication is established between the emergency response application 700 and the emergency data manager 100 using the IP protocol stack 753 and a network connection is established which may be a TCP connection and which may include one or more WebSocket connections.

Figure 8:
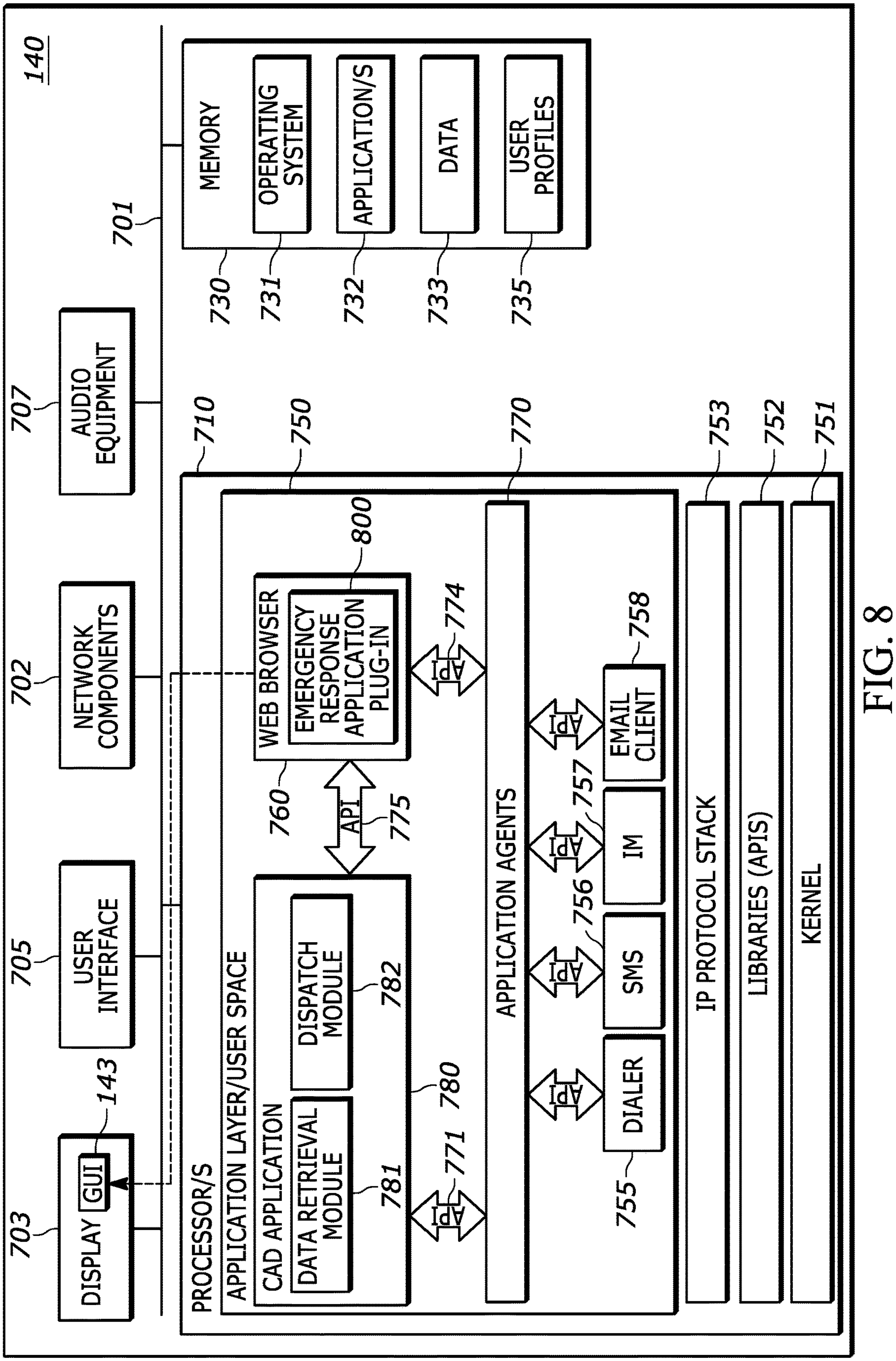
FIG. 8 is a diagram of an example emergency network entity, within an emergency network infrastructure, having an emergency response application plug-in in accordance with one embodiment.

FIG. 8 is a diagram illustrating another example emergency network emergency network entity 140 having an emergency response application plug-in 800 with a Web browser 760 in accordance with another embodiment. In the example implementation of FIG. 8, the Web browser 760 communicates with the emergency data manager 100 to provide the emergency data manager portal GUI 143 as a SaaS interface. In other words, the emergency response application plug-in 800 is operative to use an established IP protocol stack 753 connection between the emergency network entity 140 and the emergency data manager 100 using the Web browser 760. The emergency response application plug-in 800 is operative to receive pushed emergency data from the emergency data manager 100 and display the emergency data on the emergency data manager portal GUI 143. The emergency response application plug-in 800 in conjunction with the Web browser 760 also enables emergency data queries to the emergency data manager 100 to obtain emergency data, in addition to any emergency data received via a push operation. In some embodiments, the emergency response application plug-in 800 may communicate with the CAD application 780 via an API 775 to send and receive data such as, but not limited to, ALI/ANI (Automatic Location Identification/Automatic Number Identification) data, ELS data, AML data, etc. An emergency data query sent to the emergency data manager 100 by the emergency response application plug-in 800 may utilize one or more WebSocket connections.

Figure 9:
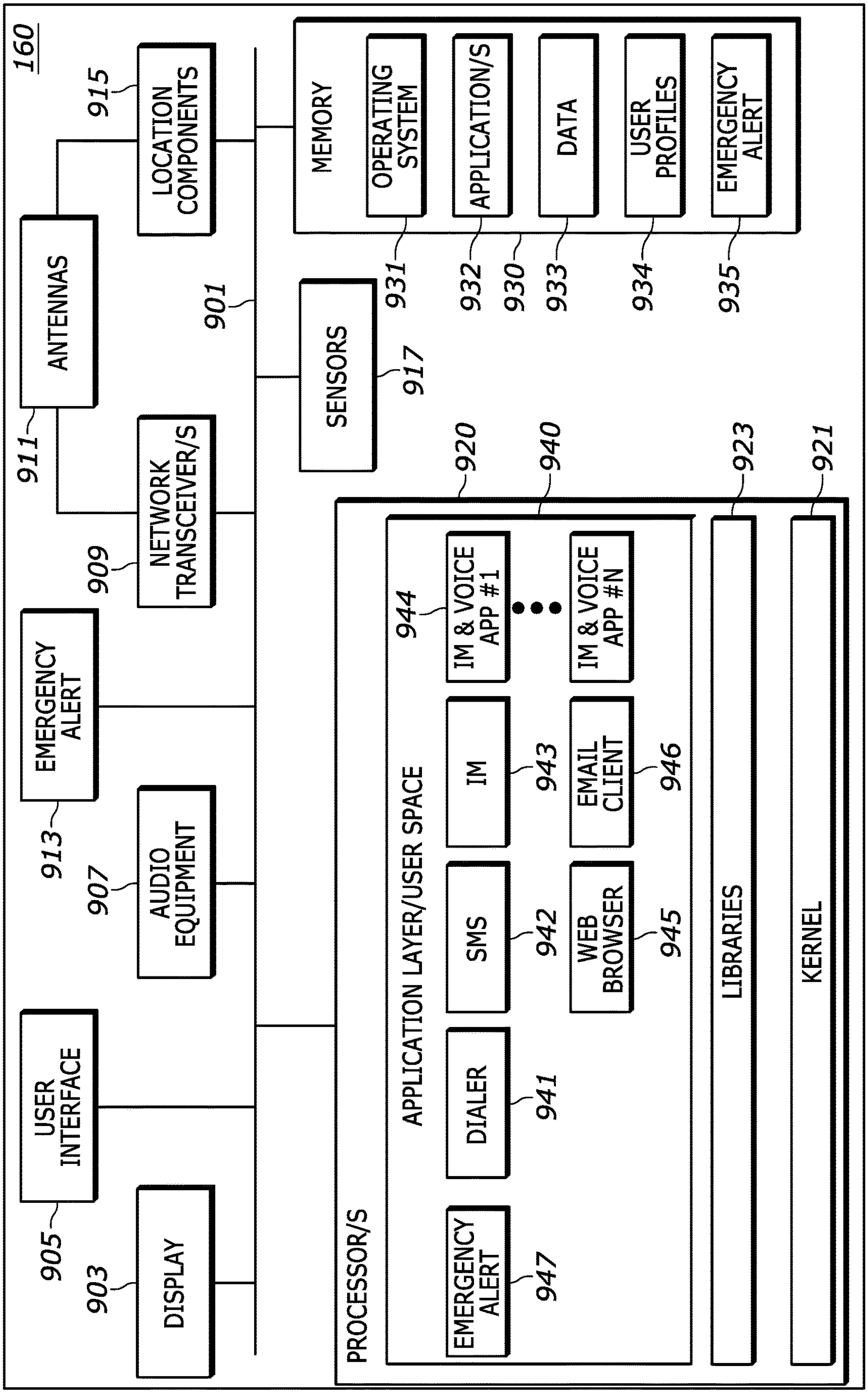
FIG. 9 is a block diagram providing an example of internal components of a device which may be used as an emergency caller device or to send an emergency alert.

FIG. 9 is a block diagram providing an example of internal components of a device 160. It is to be understood that FIG. 9 is an example only, and that a given device 160 may have more components, less components, or different components than shown, depending on the specific function and type of device. Further, depending on the type of device, there may be hardware only, hardware and firmware, hardware and software, etc. and may therefore be implemented in various ways not limited by the components shown in the FIG. 9 example. The example device 160 may be, but is not limited to: a mobile or cellular phone such as a smartphone; a wearable device such as a medical information bracelet, a fitness tracker or a smartwatch; a computer, laptop, or tablet; a vehicle console; an Internet of Things (IoT) device, such as a home assistant (e.g., a connected speaker) or a connected sensor such as a connected smoke and carbon monoxide alarm, a burglar alarm, etc.; or a walkie-talkie or two-way radio; etc. The example device 160 may include a display 903, a user interface 905, audio equipment 907, network transceiver/s 909, antennas 911, location components 915, sensors 917, at least one processor 920, and at least one non-volatile, non-transitory memory 930 in addition to RAM. Network components may include one or more wireless network transceivers for wireless communication such as for cellular communication, Wi-Fi™, Bluetooth™, etc. The memory 930 stores executable instructions and data such as executable instructions for an operating system 931, various applications 932 and an emergency alert application 935 in some implementations. The memory 930 also stores data 933 which may provide a location data cache and a user data cache. The device 160 may, in the case of mobile telephones, include a SIM card or other removable, replaceable memory components in addition to memory 930. The location data cache be used to store locations generated by the one or more location components 915 which may include a GPS chipset, triangulation processing, or other location determination technology, etc. User profiles 934 stored in memory 930 may contain information related to specific devices user configuration preferences, data sharing permissions, etc.

The processor 920 may be implemented as one or more microprocessors, ASICs, FPGAs, microcomputers, microcontrollers, digital signal processors, central processing units, state machines, logic circuitries, and/or devices that manipulate signals based on operational instructions. Among other capabilities, the processor 920 is configured and operative to fetch and execute computer-readable instructions (i.e. executable instructions) stored in the memory 930. For example, the applications 932 executable instructions, when executed by the at least one processor 920, may provide, a dialer application 941, a short-message-service (SMS) application 942, an instant message (IM) application 943, a web browser 945, an email client 946 and one or more IM and voice applications 944 which may each provide IM and voice call capability separately or in combination. The IM and voice applications 944 are referred to as "over-the-top" applications because the operate within the application layer of a mobile operating system. The operating system 931 executable instructions, when executed by the at least one processor 920, may provide a kernel 921, libraries 923 (also referred to as "application programming interfaces" or APIs) and an application layer 940 or user space within which the various applications are executed.

All of the components of the device 160 are operatively coupled by an internal communication bus 901. The display 903 is operatively coupled to the user interface 905 or may be considered a part of the user interface 905 such as in the case of a touchscreen which is both a display and a user interface in that it provides an interface to receive user input or user interactions. In some devices, the display 903 may not include a touchscreen, but may include one or more lights, indicators, lighted buttons, or combinations of these. The user interface 905 may also include physical buttons such as an on/off button or volume buttons, and the audio equipment 907 may include a microphone and a speaker.

The example device 160 may also include various accessories that allow for additional functionality. Such accessories (not shown) may include one or more of the following: a microphone, a camera, speaker, a fingerprint scanner/reader, health or environmental sensors, a USB or micro-USB port, a headphone jack, a card reader, a SIM card slot, or any combination thereof. The one or more sensors may include, but are not limited to: a gyroscope, and an accelerometer which may be incorporated into an Inertial Measurement Unit (IMU); a thermometer; a heart rate sensor; a barometer; or a hematology analyzer, or some other type of biometric sensor.

An emergency alert component 913 may be an ASIC or may be implemented as, or in conjunction with, an emergency alert application 947 where the emergency alert application 935 executable instructions are stored in memory 930 and executed by the processor 920. The emergency alert component 913 may be configured and operative to record user data, such as a name, address, or medical data of a user associated with the device 160. The emergency alert component 913 may also detect an emergency using features of the device 160 for example, when a user places an emergency call on a device that has phone call capabilities. The emergency alert component 913 may also work in conjunction with "fall detection" such as in a medical bracelet which uses the sensors 917, such as an IMU (inertial-measurement-unit), to detect if the wearer of the bracelet has fallen and to initiate an emergency call or emergency alert accordingly. The emergency alert component 913 may also work in conjunction with sensors 917 such as biometric sensors to detect for example, a cardiac event or some other critical health or safety event and to initiate an emergency call or emergency alert accordingly.

A device 160 user may initiate an emergency alert 105 by interacting with the user interface 905, or the emergency may be detected by sensors 917. In response to detecting an emergency alert or a request for assistance, such as a via native dial 9-1-1 call via the dialer application 941 (which is the phone's native dialer), which may be generated or sent by the device 160, the emergency alert component 913 may send a notification to the emergency network. The notification may be sent as an HTTP post containing information regarding the emergency request for assistance. The notification may include a location (e. g., a device-based hybrid location) generated by or for the electronic device. In response to detecting an emergency request generated or sent by the device, the emergency alert component 913 may send user data to the emergency network.

Figure 10:
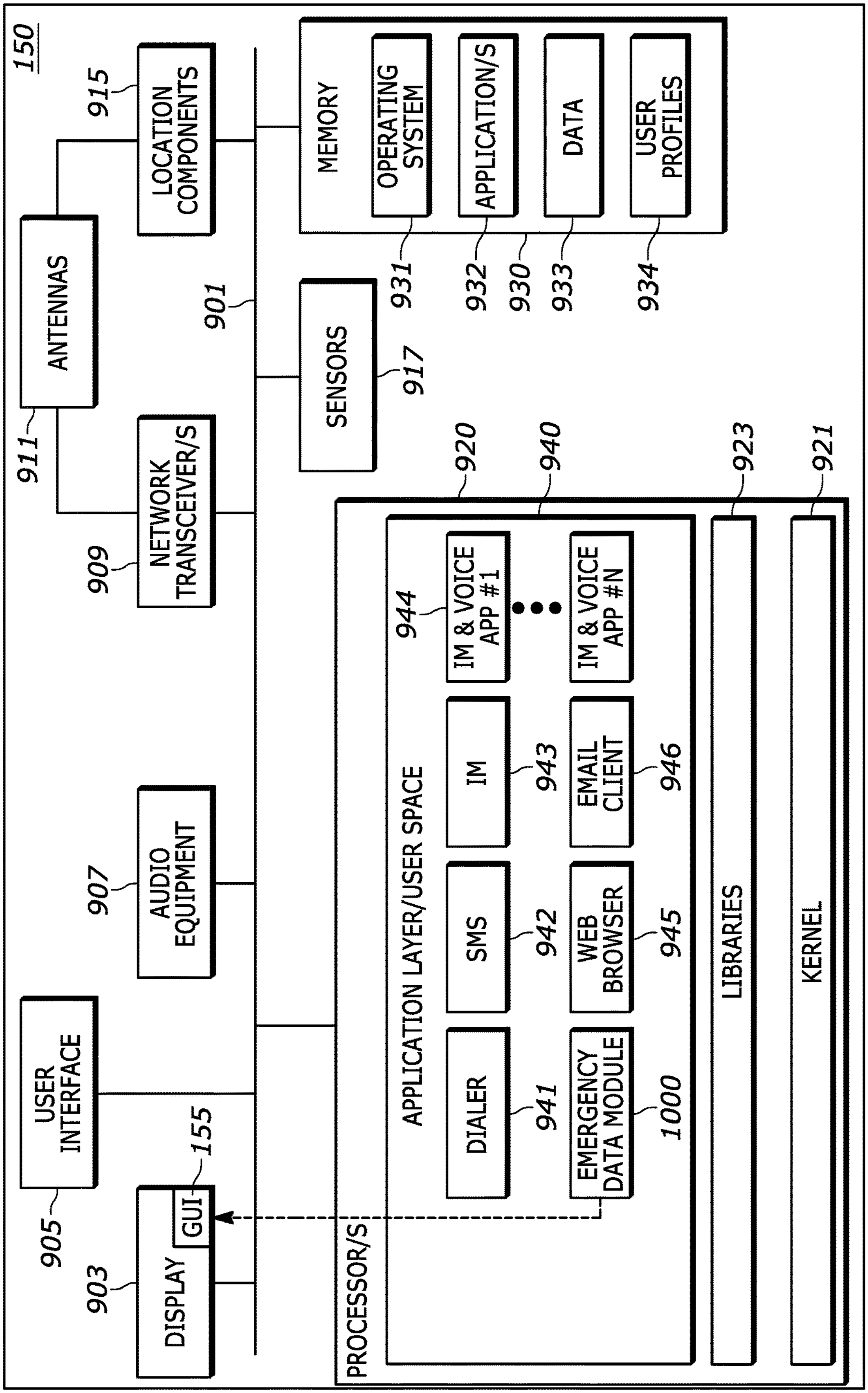
FIG. 10 is a block diagram providing an example of internal components of an emergency responder device which may be used to receive emergency data.

FIG. 10 is a block diagram providing an example of internal components of an emergency responder device 150 which may be used to receive emergency data. The internal components of the emergency responder device 150 are similar to the internal components of device 160 described with respect to FIG. 9. However, the emergency responder device 150, may include an emergency data module 1000 that provides the GUI 155 for displaying emergency data including medical data, location data, etc. The emergency data module 1000 may be implemented as an application executed by the at least one processor 920. Emergency responder devices 150 are designed to display emergency data related to incidents within authoritative, administrative or assigned jurisdiction of the specific responder, and for which proper credentials are provided depending on the type of emergency data requested. The credentials of the responders may be matched to one or more geofences and incidents with current location within the geofences are displayed. Emergency responder devices 150 may display incidents based on a proximity radius on an interactive map. For example, a proximity radius may be within ten meters to five kilometers, between fifty meters to one thousand meters, for example five hundred meters. As the responder moves towards an area, new incidents within the proximity radius may be "unlocked" and viewed.

The emergency responder devices 150 are operative to send emergency data requests 151 to the emergency data manager 100 and also authentication data. The emergency data manager 100 may send an authentication request 154 to an emergency responder device 150 prior to receiving authentication data. The authentication request 154 may be, for example, a GUI 155 prompt to enter an authentication code. The authentication code may be a numerical code, a pattern, a biometric identifier, or a combination of these. The biometric identifier may be obtained from a patient at the scene of an emergency or may be a biometric that identifies the emergency responder. For example, either a device 160 owned by a bystander, or an emergency responder device 150, may receive an authentication request 154. In that case, where information is being obtained from a patient, the authentication request 154 may be a GUI prompt to scan an authentication code such as, but not limited to, a bar code, QR code, or RFID code on a medical bracelet or some other mechanism or a static code such as obtainable from a label, identification card, etc. In some implementations, an authentication code may be a dynamic code that may be generated by the emergency data manager 100, or by another server, using random or pseudorandom code generation techniques. For data security, the generated authentication code may be conveyed to a device, that allegedly sent an emergency data request 151 to the emergency data manager 100, by using SMS (short message service), email, a callback, etc. The emergency responder devices 150 may have biometric sensors or may be operative to connect to biometric sensor accessories such as, but not limited to, photoplethysmography sensors, fingerprint scanners, palm print scanner, facial recognition, retinal or iris scanners, hand geometry detection, ear geometry detection, odor/scent detection, DNA, behavior characteristics, or other biometric sensors, etc. A biometric identifier may be obtained from any of such biometric sensors or biometric sensor accessories and may be a combination of two or more biometric sensor measurements. If the emergency responder device 150 user is authorized, then the emergency data manager 100 will respond to an emergency data request 151 by providing emergency data 157 from various emergency data databases 120. The emergency responder devices 150 each have a web browser application or other application that provides the GUI 155 for displaying emergency data 157. The emergency data databases 120 may include, but are not limited to, location data 121, medical data 123 and other emergency data 125. Emergency data requests may also be sent from the emergency data manager portal GUI 143 during call handling procedures, emergency dispatch procedures or both, and emergency data requests 151 may be sent from the GUI 155 by an emergency responder device 150. Authentication data may also be sent by the GUI 155, or may be sent automatically by the emergency responder device 150 as part of, or in conjunction with, an emergency data request 151 initiated by an emergency responder device 150 user.

In response to an emergency data request 151 from an emergency responder device 150, the emergency data manager 100 may request authentication data prior to sending any protected data. Alternatively, an emergency responder device 150 may send authentication data to the emergency data manager 100 at the time of sending the emergency data request 151. If the authentication data authenticates the emergency responder device 150, then the emergency data manager 100 sends an appropriate response including relevant emergency data 157 to via an encrypted pathway. The emergency data request 151 may be, for example, an HTTP-Enabled Location Delivery (HELD) message and the response from the emergency data manager 100 or the emergency data manager 100 may be a Presence Information Data Format Location Object (PIDF-LO) in accordance with NENA requirements.

For some emergency networks, emergency data requests 151 may be sent over public networks using API access keys or credentials. Transport Layer Security (TLS) may be used in the emergency data requests to the emergency data manager 100 and for sending emergency data 157 to emergency responder devices 150 for encryption security. The emergency responder device 150 may display the emergency data 157 using a web portal GUI or an application GUI.

Figure 11:
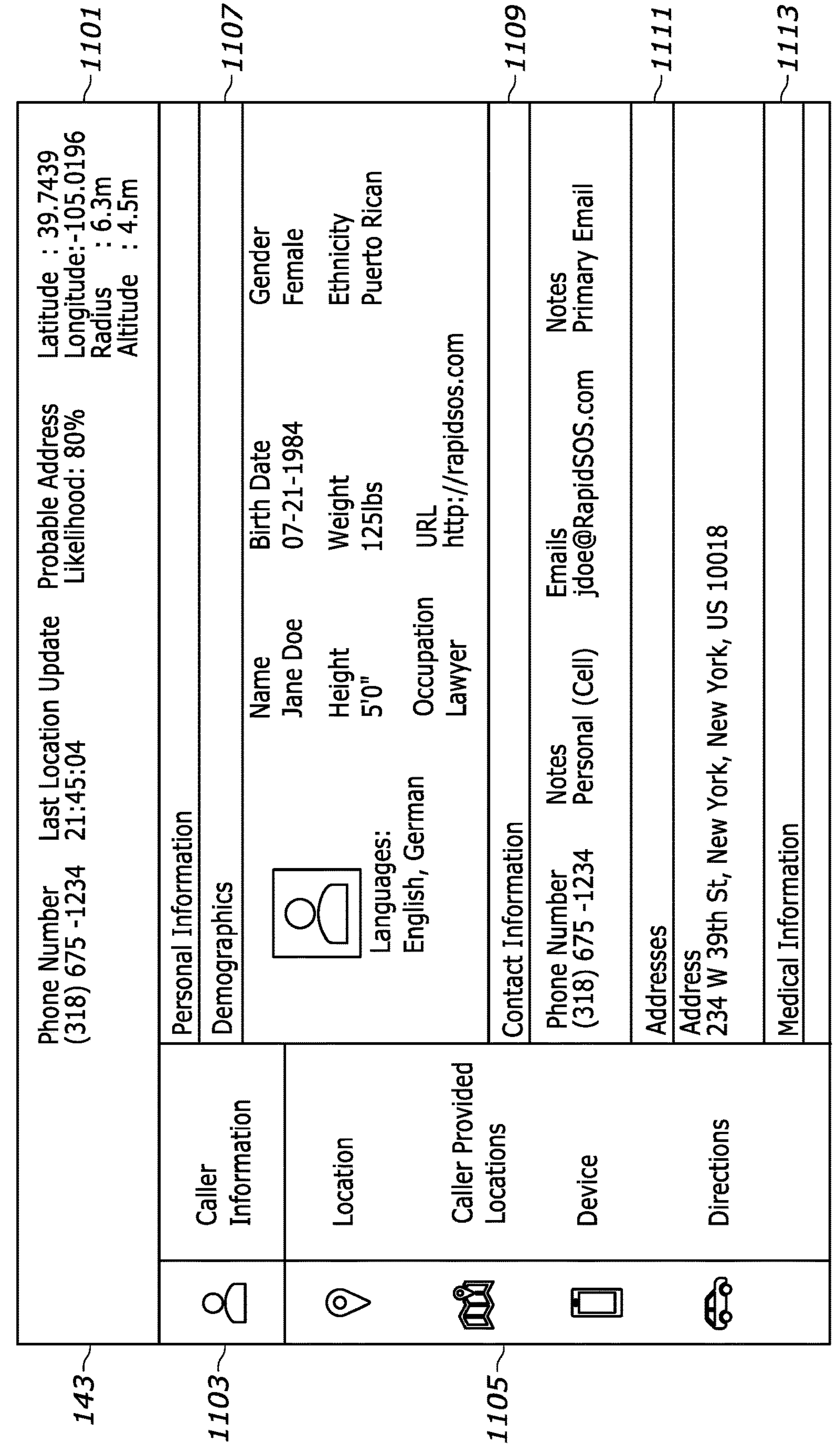
FIG. 11 is an example graphical user interface (GUI) displayed on an emergency network entity display in accordance with an embodiment.

An example of the emergency data manager portal GUI 143 displayed on an emergency network entity 140 display is shown in FIG. 11. Emergency data sent to the emergency data manager portal GUI 143 by the emergency data manager 100 may include information such as, but not limited to: service data reference, full name, email, emergency contacts, addresses, language, occupation, phone numbers, websites, gender, height, weight, ethnicity, profile picture, allergies, medical conditions, medications, disabilities, blood type, medical notes, birthday, and additional comments. The emergency response application emergency data manager portal GUI 143 displays information included in the emergency data associated with a device identifier as depicted by FIG. 11. An emergency network entity 140 user can access the page displaying the additional information by selecting an additional information button or tab within the emergency data manager portal GUI 143.

As shown in FIG. 11, the emergency data manager portal GUI 143 displays emergency data returned from the emergency data manager 100 within discrete emergency data categories in separate data fields. For example, the emergency data manager portal GUI 143 may include a location field 1101, a demographics field 1107, a contact Information field 1109, an addresses field 1111, and a medical information field 1113. The "Demographics," "Contact Information," and "Addresses" emergency data categories are displayed sequentially under a "Personal Information" section of the emergency data manager portal GUI 143. A Medical Information field 1113 is displayed below the Personal Information section. The emergency data manager portal GUI 143 may include one or more tabs to filter emergency data categories. For example, as depicted in FIG. 8, emergency data manager portal GUI 143 can include a "Caller Information" tab 1103, and a menu 1105 including a "Location" tab, a "Caller-Provided Locations" tab, a "Devices" tab, and a "Directions" tab. A "Directions" tab can be selected within the emergency data manager portal GUI 143 to render a map displaying directions from a PSAP to a location of an emergency situation. The map is capable of providing real-time or near real-time traffic updates.

Figure 12:
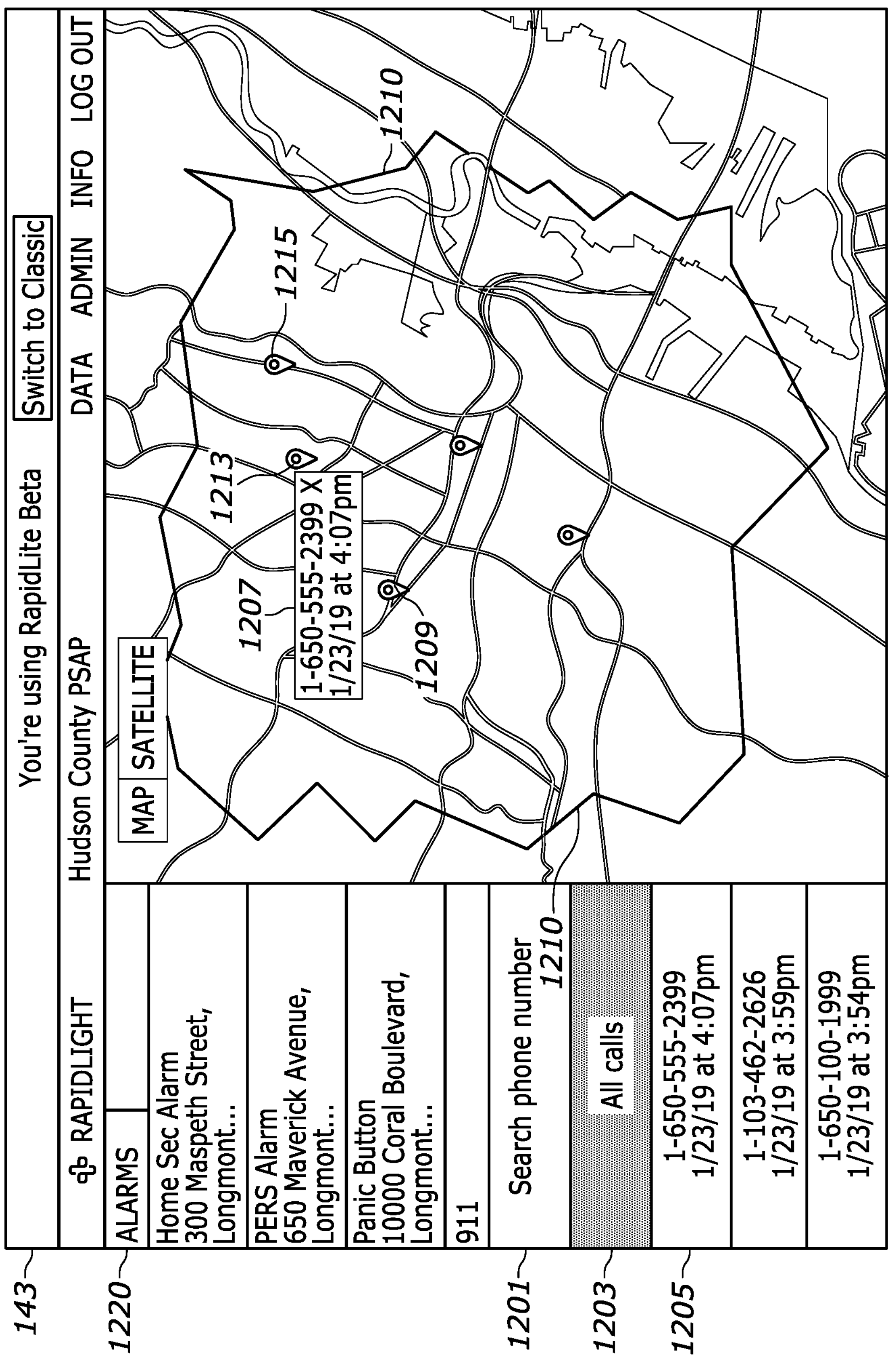
FIG. 12 is another example graphical user interface (GUI) displayed on an emergency network entity display in accordance with an embodiment having an emergency call queue and an alarm queue.

FIG. 12 depicts an emergency data manager portal GUI 143 provided by the emergency response application that provides a jurisdictional map view that includes an emergency call queue and an alarm queue. The page shown provides interactive elements that allow a user to generate an emergency data request using, for example, data entry field 1201 through which a user can submit a device identifier, such as by typing or pasting the device identifier into the entry field 1201. After submitting a device identifier through the entry field 1201, the user can prompt the emergency response application to generate and send an emergency data request by selecting a search button. In response to a user submitting a device identifier into the entry field 1201 and selecting the search button, the emergency response application generates an emergency data request including the device identifier and a temporary access token to the emergency data manager 100.

After receiving an emergency data request including a device identifier, the emergency data manager 100 retrieves or gathers emergency data associated with the device identifier from one or more databases which may include one or more locations, and a current location. Location indicators are provided on the emergency data manager portal GUI 143 to show the various locations. For example, the current location indicator 915 shows the current location of the caller, and historic location indicator 1209 and historic location indicator 1213 show past locations as the caller has traveled. By moving the cursor over a historic location indicator 1209, emergency data 1207 is displayed in an overlay showing time, date, and the phone number (i.e. device identifier) of the caller's device. On the left side of the emergency data manager portal GUI 143, an alarm queue 1220 and a call queue 1203 are displayed, from which an emergency network entity 140 user may select any alarm from the alarm queue 1220 or any call from the call queue 1203 to display further information. In the example shown in FIG. 12, the call queue entry 1205 is selected and therefore the map view within the emergency data manager portal GUI 143 shows the caller location and emergency data for the call from phone number "1-650-555-2399" within a jurisdictional boundary 1210 which corresponds to a geofence. The geofence defines the jurisdictional boundary 1210 that corresponds to the emergency network entity 140 on which the emergency data manager portal GUI 143 is displayed. The emergency data 1207 textual description of a current or historical location may include an indoor location, an amount of time elapsed since the current or historical location was received, and an amount of time elapsed since the current or historical location was generated.

For alarms, an emergency network entity 140 user may select an alarm from the alarm queue 1220 and likewise display a location indicator for the alarm on the map view. The alarm location indicator also displays a textual description of emergency data 1207 upon hovering the cursor over the alarm location indicator. The emergency data may include, type of alarm such as burglar, fire, medical, etc., an address or location coordinate of the alarm, etc. For example, a fire alarm textual description of emergency data 1207 may indicate whether the fire alarm is for a commercial building or a residential building, an address, and a contact phone number or other information, etc.

Dual Queue Operations—Prioritization of Emergency Alerts

The dual queue provided by the present disclosure enables use of various connected devices and IoT to detect and report emergencies in a variety of ways. The apparatuses and methods of the present disclosure enable emergency service providers to address surges and mass emergencies by allowing users to reach emergency services in various ways, e.g., by text messages, social media messages, app-based emergency alerts and other Internet-abled methods from smart devices such as home alarms, car alarms, wearables, mobile phones, personal digital assistants, etc.

Figure 13:
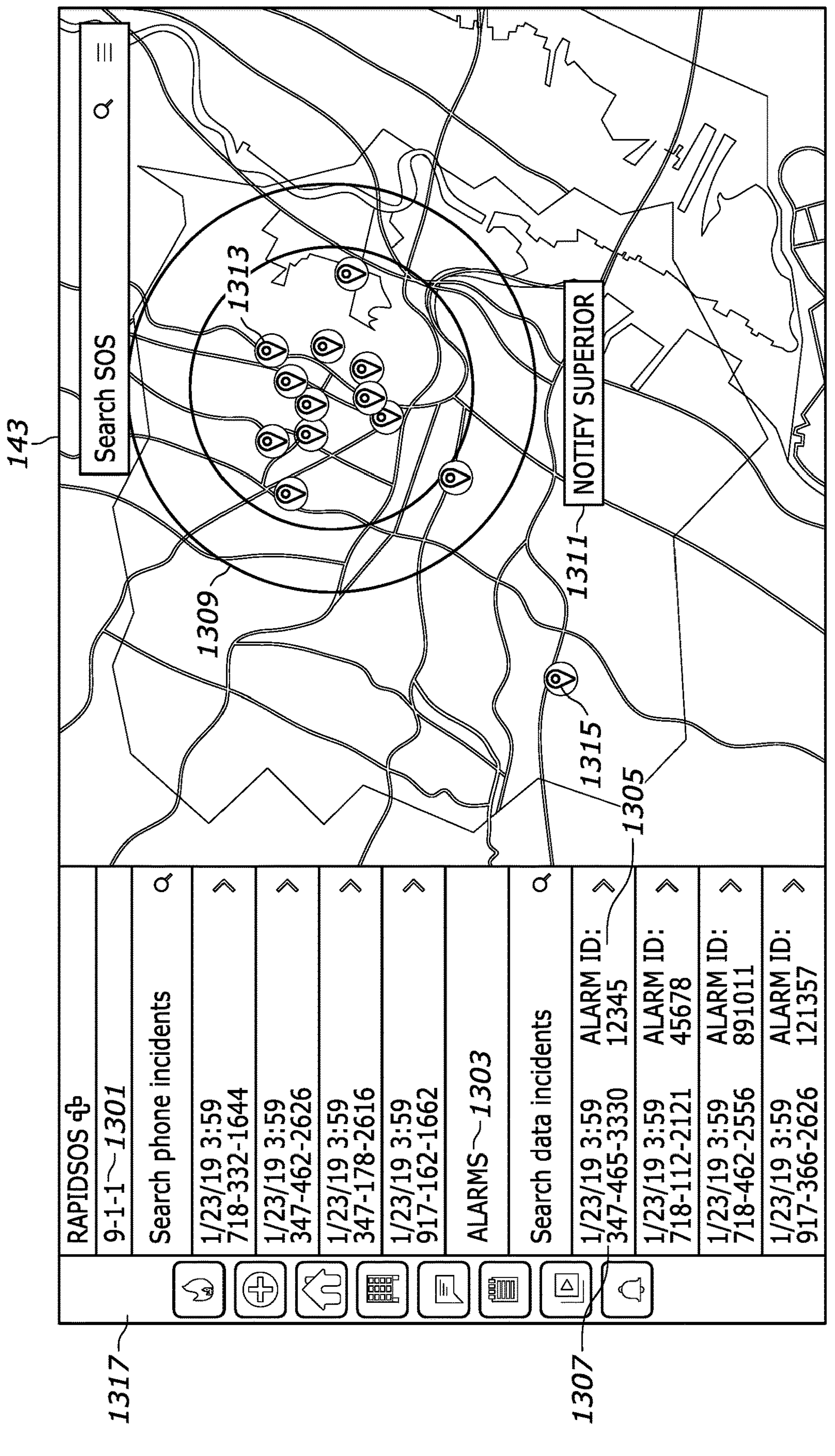
FIG. 13 is another example graphical user interface (GUI) displayed on an emergency network entity display in accordance with an embodiment.
Figure 14:
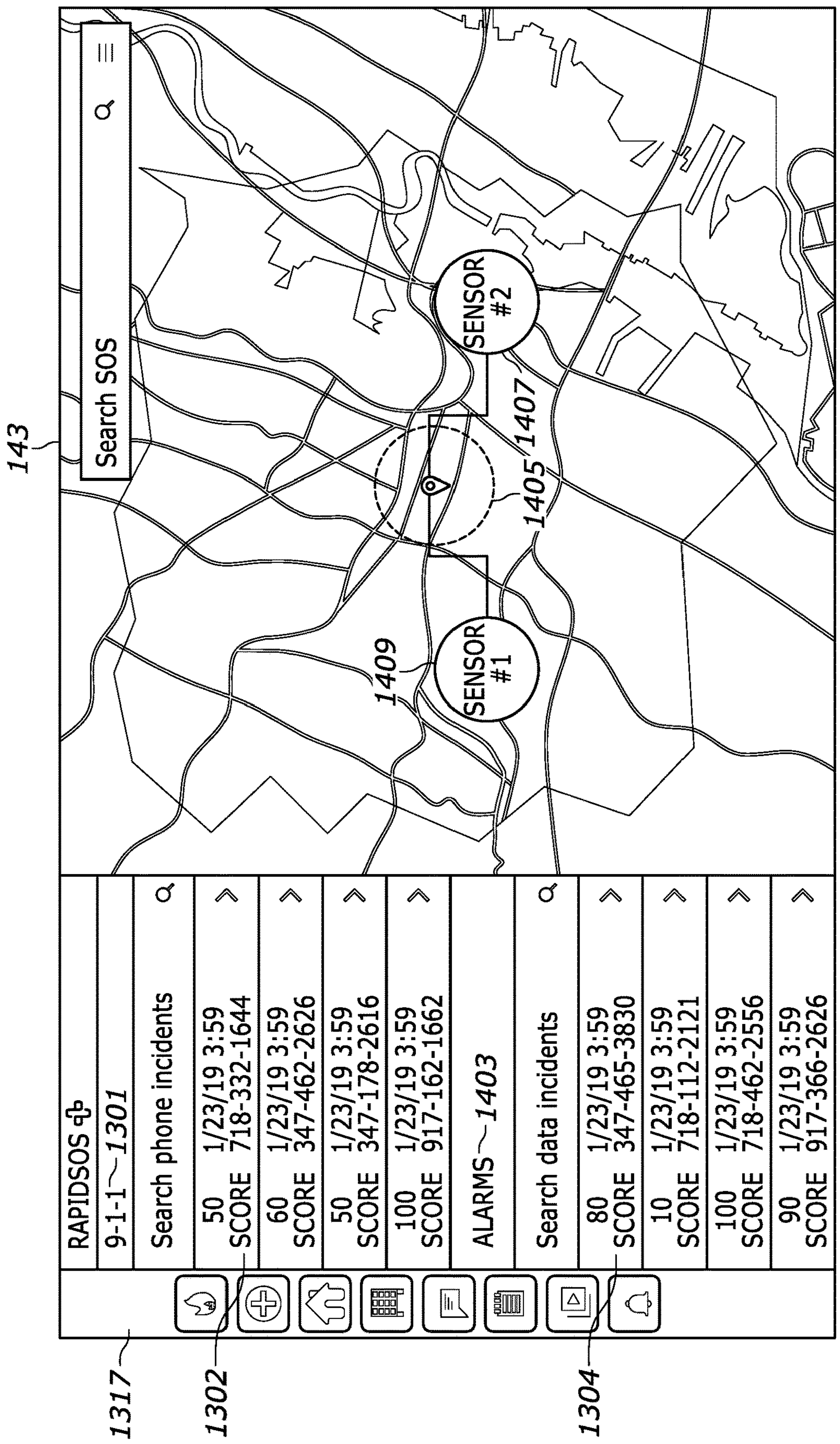
FIG. 14 is another example graphical user interface (GUI) displayed on an emergency network entity display in accordance with an embodiment.

As shown in FIGS. 12-14, the example GUI 143 screens for emergency network entities provide dual queues; one for 911 calls and one for emergency alerts based on emergency alarms generated by various smart devices. The dual queues may be handled in a variety of ways depending on local procedures, resources, etc. and may be prioritized in the queue. For example, emergency alerts may be prioritized based on type of emergency, severity of the emergency, user input, volume of emergency calls from a specific geographic area, network or power outages, emergency personnel availability, number of sensor readings outside of normal range, or other factors or criteria. For example, certain types of emergencies (e.g., a fire) may be prioritized as it can spread quickly and affect many people.

In another example, if several emergency alerts (above a threshold, such as 5 or more, 10 or more) are received from a specific geographic area within a short timeframe, these emergency alerts may be given higher or lower priority. Several alerts from the same area may mean that an emergency affecting many people may be taking place. However, if a power outage due to a storm is being responded to, it may be given lower priority. On the other hand, if there is an active shooter incident, emergency alerts may be given higher priority. Some emergency alerts may be designated as "core" emergency alerts, based on a high severity score over a threshold or other criteria or factors, and may be prioritized over other alerts and calls. Other criteria or factors may include user input, type or sub-type of emergency, volume of emergency alerts in a cluster, etc.

Prioritization may be accomplished in various ways. For example, some emergency alerts in the alert queue may be moved up in the queue, highlighted in some way such as, for example, using a specific font, size of text, highlighting, etc. In some cases, the protocol and procedures in a particular emergency agency or emergency services provider may incorporate rules of prioritization, such as prioritizations between answering emergency calls and responding to emergency alerts.

Prioritization of Emergency Alert Type or Sub-type

Some types of emergency alerts may be given higher priority with respect to the emergency response. In some cases, the type and sub-type of the emergency alert may be known based on, for example, alarm data and/or sensor data. One example of an emergency alert type is a structural fire based on smoke detector data. In a fire emergency, where multiple emergency calls or multiple emergency alerts have come in from the vicinity reporting a large fire, the system may prioritize emergency alerts emanating from the vicinity, because these emergency alerts are related to the fire emergency by the alarm signal processor.

In a similar way, some emergency alerts may be given lower priority based on the type, sub-type, location of the alert, or other factors or criteria. For example, an emergency alert based on a pulled fire alarm may be given a lower priority over other types of fires (e.g., structural fires) or other emergencies (e.g., medical emergencies), or based on whether these emergencies have additional sensor data.

On the other hand, user-initiated emergency alerts may be prioritized over sensor-based alerts. The system may require user verification or confirmation of the emergency, and the verification or confirmation may be used toward prioritization. Certain sensor triggered alerts may not involve a life safety issue, however a user-initiated emergency alert may be more likely to indicate that a life-threatening emergency situation.

Emergency Calls Versus Emergency Alerts

Emergency calls may be prioritized, while emergency alerts may be handled when there are no calls or handled by staff who are not dedicated to emergency call-handing. Emergency alerts are handled differently and are "claimed" by a staff member as described with respect to FIG. 18. Emergency calls may be prioritized when there is a mass emergency such as a large fire. In other scenarios, emergency calls in the vicinity of a large fire may be given lower priority as fire resources have been dispatched. That is, emergency agencies or emergency services providers with one or more sites may have protocols or procedures for call taking and responding to emergency alerts. Therefore, in some cases, emergency calls and emergency alerts may not be differentiated and may be handled on a first come first serve basis. Emergency alerts may be prioritized under various scenarios such as connectivity outages to networks and phone systems, shooting incidents, natural disasters, or other mass emergencies affecting a large number of people. Thus, during natural disasters and mass emergencies, emergency alerts from particular sources such as, but not limited to, social media platforms, may be prioritized.

FIG. 13 is another example of the emergency data manager portal GUI 143 in which a dual queue can be used for identifying emergency clusters. An emergency call queue 1301 and an alarm queue 1307 are positioned on the left-hand side of the GUI 143. A menu 1317 to the left of the queues provides view selections that change the right-hand side view of the emergency data manager portal GUI 143. The emergency network entity 140 user may select different views and limit the alarms displayed to certain alarm types such as home alarms, fire alarms, medical alarms, etc.

Each alarm in the alarm queue 1303 includes an alarm ID 1305 and a contact number 1307. Additionally, the alarm ID may be entered into a "Search data incidents" search field to query for additional information. Selection of an alarm in the alarm queue 1303 will display a location indicator on the map view of the emergency data manager portal GUI 143, such as location indicator 1315.

The example emergency data manager portal GUI 143 in FIG. 13 also shows how the emergency data manager 100 monitors and detects clusters of alarms. A cluster of location indicators 1313 for like alarms, such as fire alarms, are displayed on the emergency data manager portal GUI 143 within a circular perimeter 1309 which indicates that a larger emergency situation may be occurring. Thresholds may be set at the emergency data manager 100 for number of alarms and distance perimeter such that an occurrence of a given number of like alarms within a given perimeter with a given time of each other results in an alert 1311 displayed on the emergency data manager portal GUI 143. For example, the example alert 1311 displays the textual message "Notify Superior." In that case, the emergency network entity 140 operator will contact their superior to implement additional emergency network protocols.

FIG. 14 is another example screen of the emergency data manager portal GUI 143 that may be displayed on an emergency network entity 140 display in accordance with an embodiment. As in the example of FIG. 13, the left-hand portion of the emergency data manager portal GUI 143 is maintained in different views and provides the call queue 1301 for 9-1-1 emergency calls, and the alarm queue 1303 showing information related to incoming alarms coming from alarms 196 as illustrated in FIG. queue entry correlation logic 2201. As in the FIG. 13 example, the left most menu 1317 allows a network entity 140 user to limit the call queue 1301 and alarm queue 1303 view to specific emergency event types and locations such as residential, commercial, fire, medical, etc.

The emergency data manager portal GUI 143 display screen shown in FIG. 14 includes a map section displaying a location indicator 1405 for an alarm entry 1304 selected from the alarm queue 1403. Because the selected alarm has additional sensor data available, the related sensors are indicated on the map view as a first sensor indicator 1409 and a second sensor indicator 1407, along with the alarm location indicator. Moving the cursor over the sensor indicators will display additional data related to the selected sensor.

The alarm signal processor 200 determines that the two sensors are available to provide sensor data toward evaluating whether the alarm is a false alarm or one that requires a response. The alarm signal processor 200 generates alarm severity scores displayed in an alarm score field in each alarm entry in the alarm queue 1403, such as the alarm score of "80" provided for alarm entry 1304. Emergency calls in the emergency call queue 1301 may also each be assigned a severity score displayed in a score field such as the score of "50" in call entry 1002.

The alarm queue scores may be generated by the alarm signal processor 200 as a representation of confidence level that an alarm is legitimate and is not a false alarm. For example, an alarm score of 100 would indicate that the alarm is considered to be legitimate and requires dispatch of emergency responders. The emergency network operating the emergency network entity 140 receiving the alarm scores, may have determined threshold scores that determine when emergency responders are dispatched to events in the call queue 1301 and alarm queue 1403 based on the score values. In other words, the scores may be used as a priority level for dispatch of emergency responders.

Selecting either the first sensor indicator 1409 or the second sensor indicator 1407 will switch the emergency data manager portal GUI 143 to a view of sensor data corresponding to the selected sensor indicator. For example, if the first sensor indicator 1409 corresponds to a video camera, then selection of the first sensor indicator 1409 will provide an emergency data manager portal GUI 143 view as shown in FIG. 15 and FIG. 16.

Figure 15:
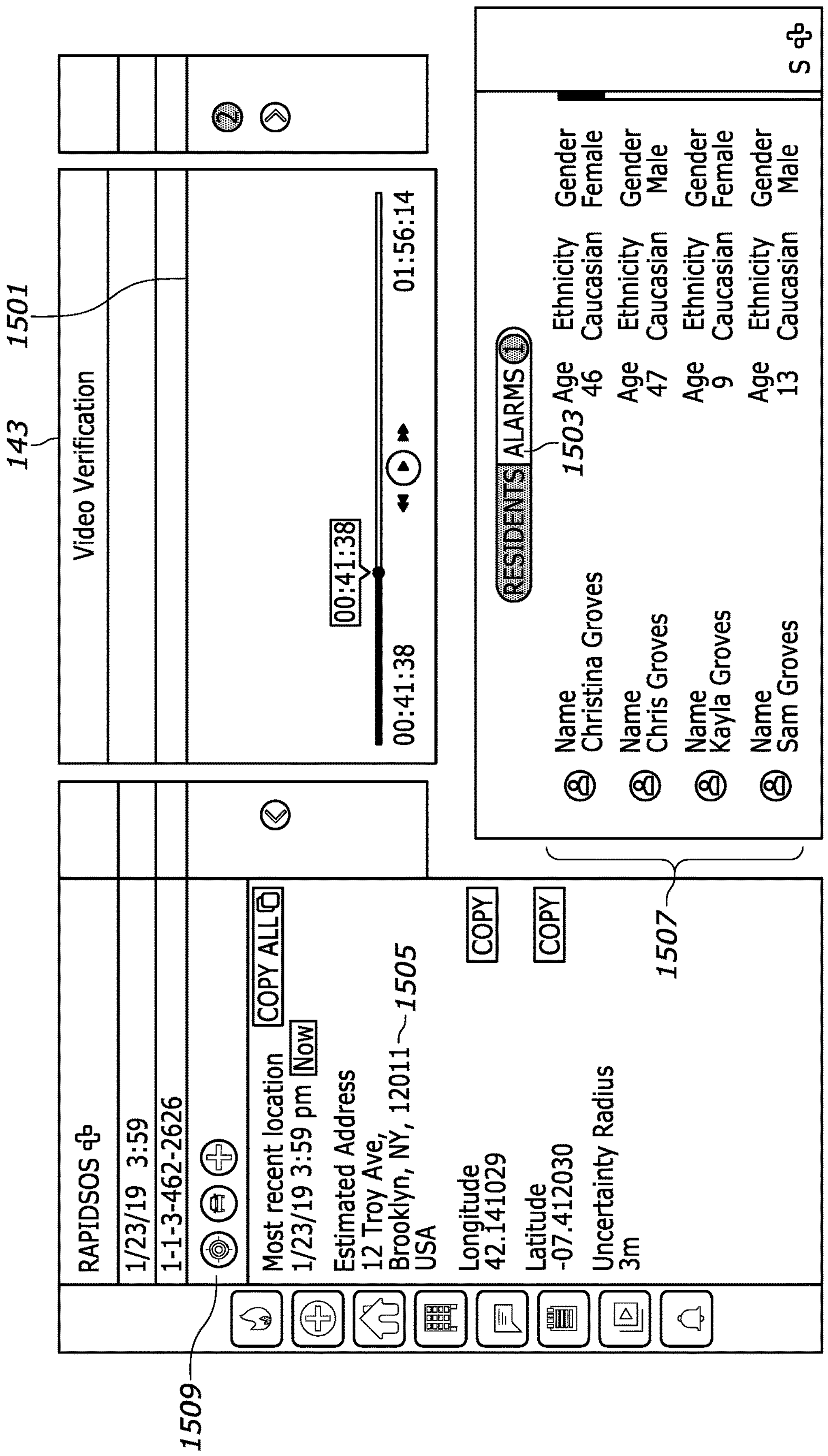
FIG. 15 is another example graphical user interface (GUI) displayed on an emergency network entity display in accordance with an embodiment.
Figure 16:
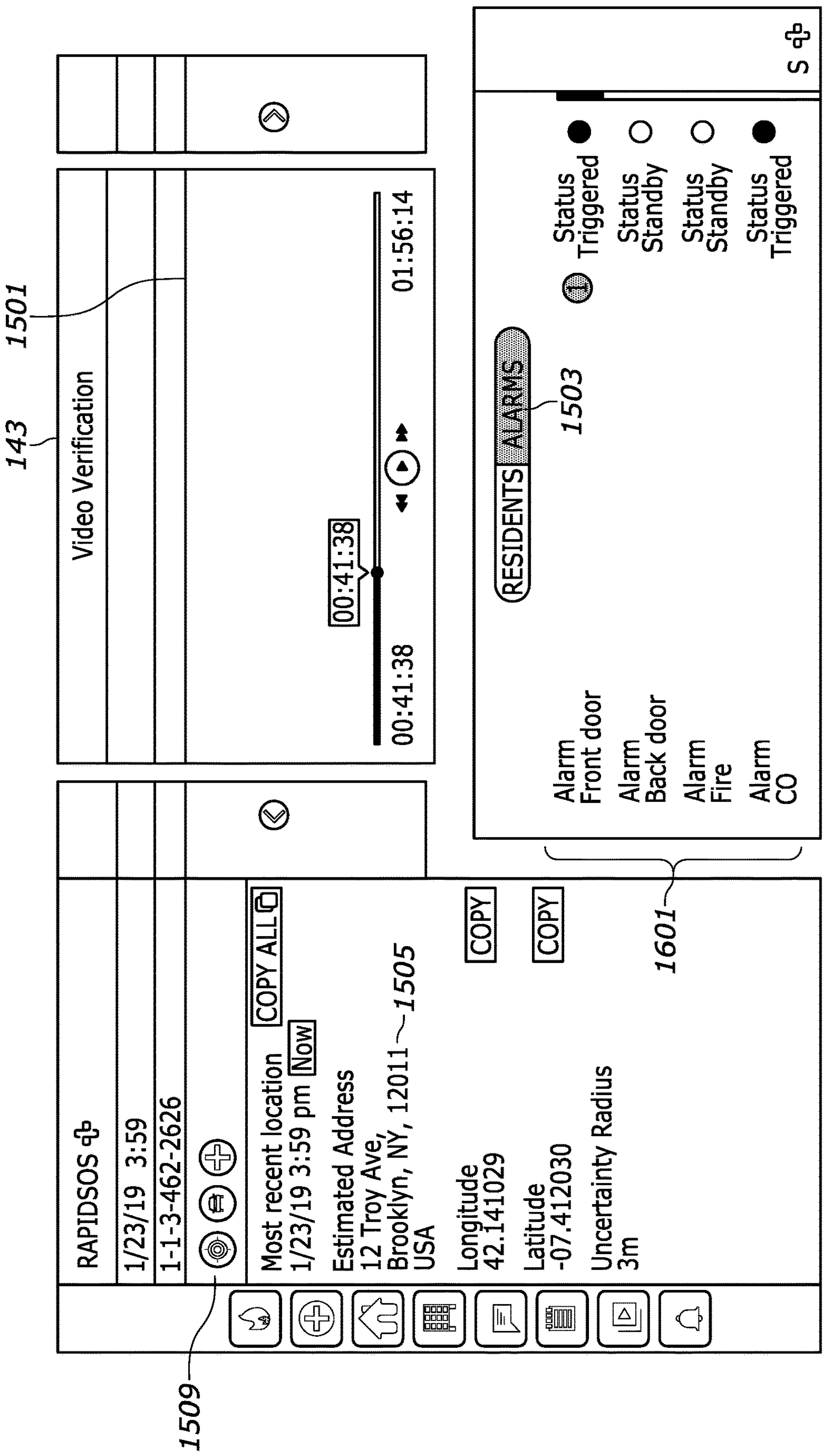
FIG. 16 is another example graphical user interface (GUI) displayed on an emergency network entity display in accordance with an embodiment.

In FIG. 15, the emergency data manager portal GUI 143 includes a video verification section 1501, and also includes a list of residents 1507 that are residents at the location of the selected alarm that was selected in the emergency data manager portal GUI 143 view of FIG. 14. A toggle button 1503 allows the emergency network entity 140 user to toggle between the residents list 1507 at the alarm location, and an alarms and sensor list 1601 as shown in FIG. 16, that shows other sensors and alarm information received from the alarm location. A menu 1509 allows for selection of other additional information related to the alarm such as the specific location, or to switch between types of alarms such as medical, fire, police, etc. Switching the toggle button 1503 from "residents" to "alarms" provides the view shown in FIG. 16. The alarm and sensor list 1601 shows all of the alarms and sensors associated with the alarm that sent the alarm data to the alarm queue 1403 shown in FIG. 14. A status indicator and the right-hand side indicates sensors that have been triggered. For example, the alarm front door sensor is shown as triggered and also a carbon monoxide alarm is shown as having been triggered. The alarm signal processor 200 receives these sensor outputs as inputs and uses them to assess whether there is an alarm condition requiring emergency dispatch.

Figure 17:
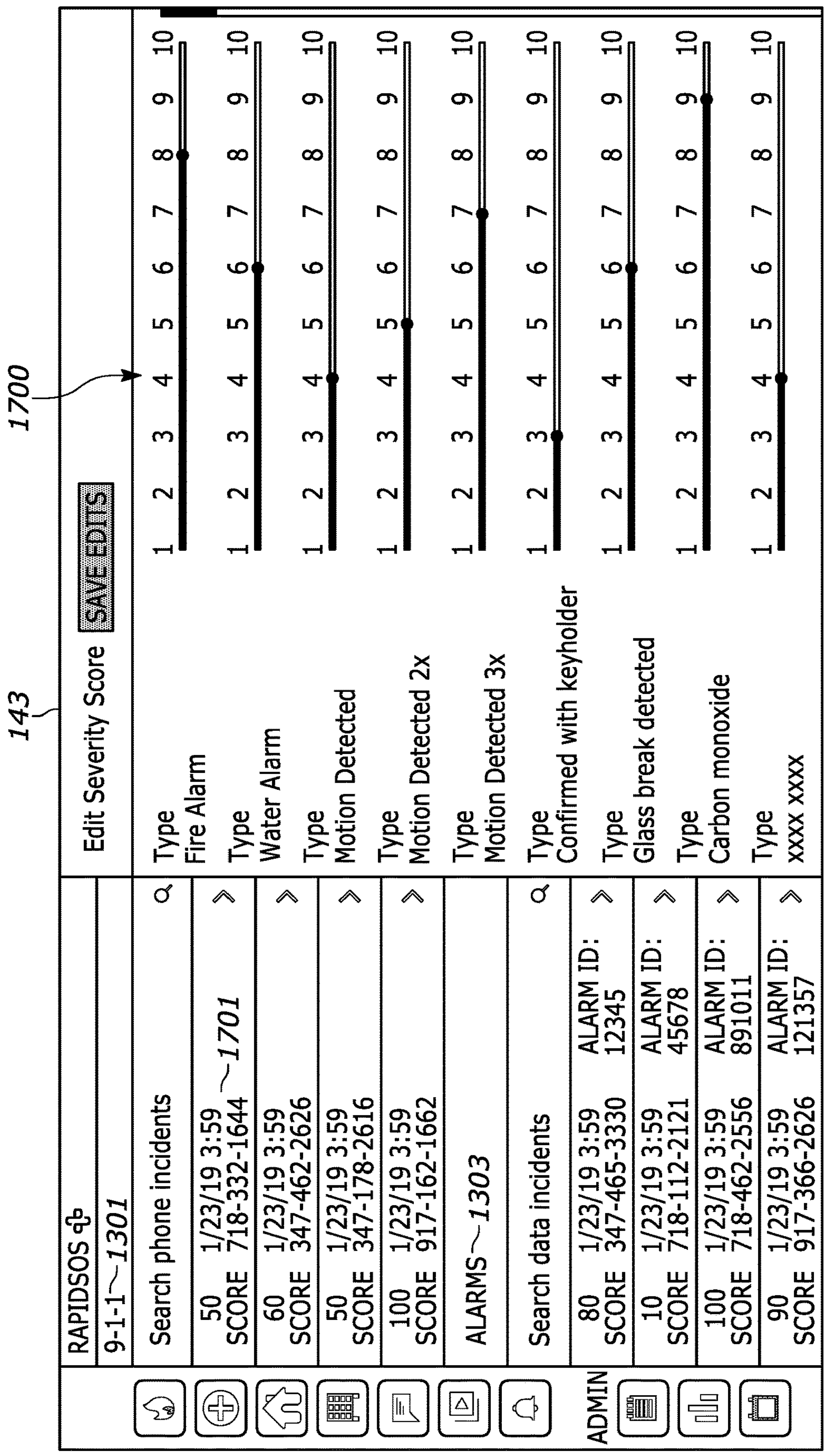
FIG. 17 is another example graphical user interface (GUI) displayed on an emergency network entity display in accordance with an embodiment.

FIG. 17 is another example screen of the graphical user interface (GUI) 143 that may be displayed on the emergency network entity 140 display in accordance with an embodiment. The emergency data manager portal GUI 143 screen shown in FIG. 17 has the emergency call queue 1301 and the alarm queue 1303, similar to the emergency data manager portal GUI 143 screen illustrated in FIG. 13 and FIG. 14. However, in FIG. 17, the right-hand side of the screen displays an alarm type list and an indicator scale 1700 for each alarm type that indicates the number of alarms of that type that have been detected. For example, eight fire alarms are present in the alarm queue 1303. As a dispatch operator dispatches emergency service personnel to the alarm scene the number of alarms in the alarm section indicator scale 1700 may be reduced to indicate that the alarm was handled or resolved. Alarms confirmed with the keyholder (such as a building owner or resident) may correspond to prioritized alarm data 213 received from screener networks 207 by the queue entry correlation logic 220 alarm signal processor 200, or alarms that were verified by the alarm signal processor 200 using IVR calls or SMS/MMS messages. Each prioritized alarm that includes an indicator from the screener network 207 that keyholder confirmation has been received, or confirmed by the alarm signal processor 200, will be added to the count of "confirmed with keyholder" type alarms on the indicator scale 1700. Confirmed alarms may be given a severity score of 100 by the alarm signal processor 200.

Each of the alarm types in the alarm type list may be color-coded such that the alarms in the alarm queue 1303 each have a color corresponding to the specific alarm type. For example, the first alarm the alarm queue 1303, having an alarm ID "12345" may be a fire alarm and therefore the text of the alarm ID or the alarm score may be displayed in a color that matches the color of the fire alarm type displayed in the alarm list in the indicator scale 1700 display field.

The scores provided in the alarm queue 1303 are generated by the queue entry correlation logic 220 alarm signal processor 200. For example, the first alarm entry in the alarm queue 1303 has a score of 80. If the alarm is a burglar alarm, sensors may be used for validation of the burglar alarm such as, but not limited to, motion detectors, glass break detectors or cameras. Thus for example, in the indicator scale 1700 display field, if a "motion detected three times" sensor has been detected that is a sensor related to the first alarm having alarm ID "12345", along with a glass break sensor indication, then this may have resulted in a score of 100 which is a score that the particular alarm is not a false alarm. However, if a burglar alarm had a correlated glass break detection, but only a single occurrence motion detection, then the burglar alarm may have received a lower score such as 80, for example.

In another example an emergency call may be received that is related to, or otherwise corroborates an alarm. In that case, a higher score for an alarm would indicate that it has been corroborated and the network entity user may adjust the score manually on the emergency data manager portal GUI 143. The score for an emergency call may also reflect that sensor data or alarm data corroborates an emergency call. The exact significance of the score values may be determined by each emergency network's specific operating procedures or operating requirements and the queue entry correlation logic 220 alarm signal processor 200 can be adjusted accordingly to reflect the procedures and requirements in the scoring. As an example, some emergency networks may decide that alarm events with a score of fifty or higher should have emergency responders dispatched because there is sufficient data available to warrant the decision. In that case, alarm events with a score of fifty or less would be handled by the call takers or dispatch operators with a lower priority. In other words, the scores shown in the figures are for example only and the threshold value can be set based on operating procedures and requirements of the emergency network operators such as municipalities, individual police and fire departments, emergency medical service providers etc. More particularly, each emergency network may have its own scoring requirements. In other scenarios however, the scoring values may become standardized and only the thresholds determined individually by emergency network operators.

The scores are multifunctional and may provide a confidence level in an alarm, an indication of emergency severity, and also provide an indication that an alarm corresponds to an event having data from multiple sources such as the various sensors listed on the emergency data manager portal GUI 143 in FIG. 17. The terms "alarm event" or "event" as used herein refer to an indication of an incoming emergency such as an emergency alert, alarm, or a sensor data indication that an emergency may be occurring. Each alarm type count or sensor type count on the indicator scale 1700 corresponds to an "event."

An event type may be a fire emergency event, a police emergency event and a medical emergency or other specially defined event which may be sub-events of fire, police and medical emergency events. Examples of sub-events for a medical emergency may be anaphylactic shock, cardiac arrest, epileptic seizure, bleeding, asthma attack, etc. Examples of sub-events for a police emergency may be burglary in-progress, armed robbery in-progress, active shooter, riot, etc. Examples of sub-events for a fire emergency may be, residential fire, office complex, high-rise, school, etc. Some events may consist of two or more different event types. For example, an event may include a fire emergency and a medical emergency, or a police emergency and a medical emergency, etc.

Further in FIG. 17 each incoming emergency call in the call queue 1301 is an event, and each incoming alarm in the alarm queue 1303 is an event. In one example of an event, an incoming emergency call and an incoming alarm may be related to the same emergency. Therefore, these two "events" may be consolidated into a single event. For example, if an emergency call in the call queue 1301 is related to the burglar alarm having alarm ID 12345, then the queue may display only a single event in the queue and the operator may either drag and drop the events together or click each one on the emergency data manager portal GUI 143 to note that they are related. In that case, they may be given a matching color code or a label that indicates that they are related. In the specific example of the burglar alarm event having a related emergency call event, the emergency call event may be displayed with a high confidence or severity score. For example, the last call entry in the call queue 1301 is displayed having a score of 100. The calls in the call queue 1301 may also be color-coded to represent the type of emergency, or type of alarm to which they are related. Alternatively, related events may still have all individual events shown on the emergency data manager portal GUI 143, with a special color code or icon indicator to show that the event is related to other events in the queues.

Alternative to color-coded, an icon may be displayed next to the entries within the call queue 1301 and the alarm queue 1303 that indicate the emergency type. For example, a fire symbol may be displayed for a fire emergency, a medical cross may be displayed for a medical emergency situation, and a police badge may be displayed for a police emergency or crime in progress.

Figure 18:
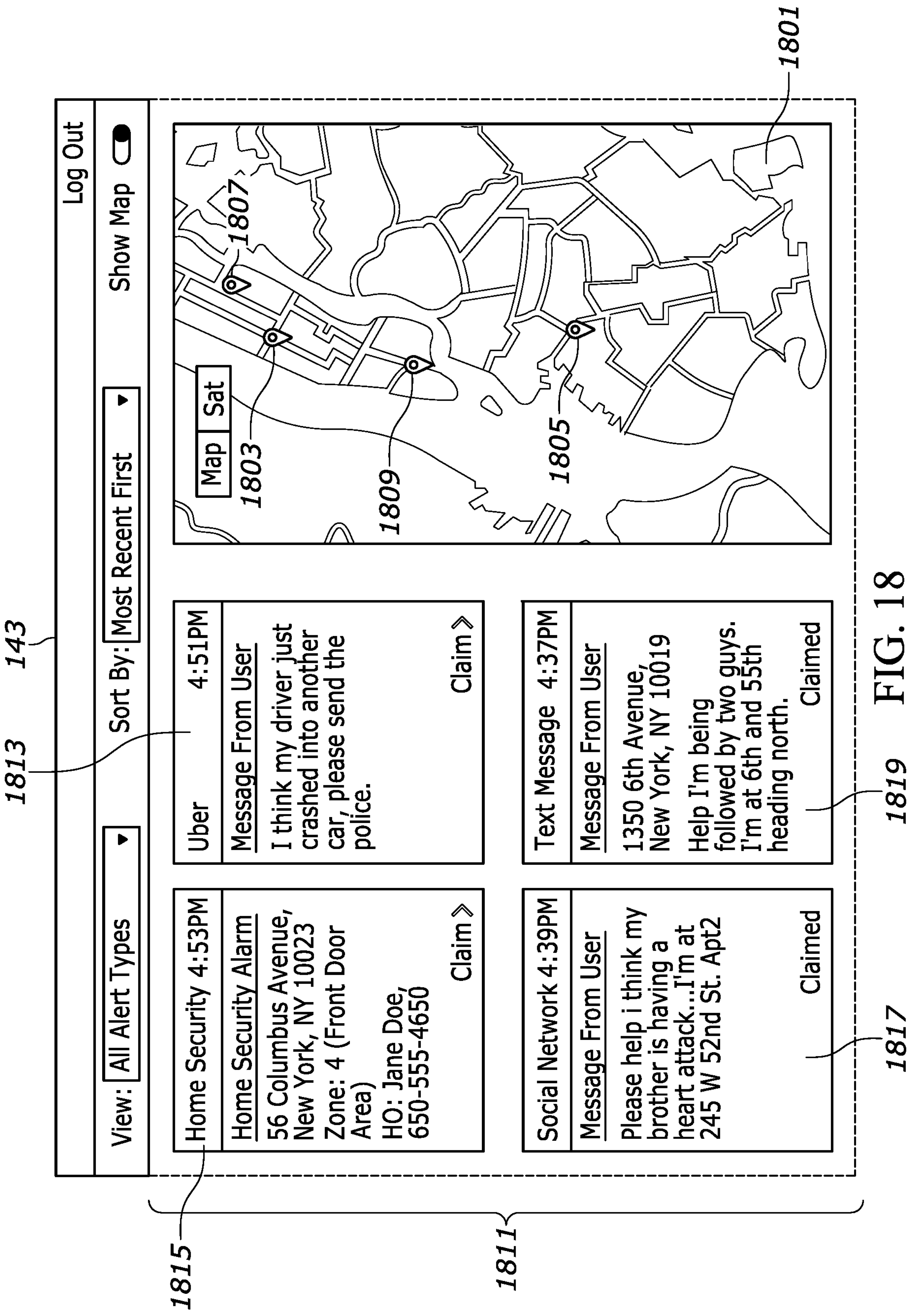
FIG. 18 is another example graphical user interface (GUI) displayed on an emergency network entity display in accordance with an embodiment.

FIG. 18 is another example of the emergency data manager portal GUI 143 in which various details may be displayed on a message portion 1811 with a map portion 1801 showing location indicators for each alarm or alert in the message portion 1811. In the example message 1815, a home security alarm may provide the address and home owner phone number while the location indicator 1803 shows the home location on the map view. Each message includes a "claim" selection such that the operator may take ownership of the alarm and any related dispatching operation.

In example message 1813, a passenger in a ride sharing vehicle informs the emergency network of a car crash and the location indicator 1809 shows the location of the user's mobile device used to send the text message. Example message 1817 is sent to the emergency network via a social networking application and is associated with location indicator 1807. The indication "claimed" shows that the emergency has already been handled by either the emergency network entity operator viewing the message, or by another emergency network entity operator. Thus, if the alert is claimed by another emergency network entity operation, no further action is required and the present operator can proceed to handle other emergencies. Example message 1819 is a text message, such as an SMS message and is associated with location indicator 1805. Message 1819 is also shown to have been handled.

When the emergency network entity operator claims one of the messages, more information can be obtained by clicking the mouse cursor on the message box to make a selection of that particular message box. For example, by selecting the message 1813, the emergency data manager portal GUI 143 provides the view in FIG. 19. The sole location indicator 1809 is then shown on the map portion 1801 and the message 1813 is displayed on the left-hand side below ride sharing information 1901. The emergency network entity operator may appropriately select a disposition for the emergency by selecting one of the soft buttons labeled "Dispatched" 1903, "Resolved" 1905 or "CAD" (computer aided dispatch) 1907 to send the item to a CAD emergency network entity operator. The current operator may also respond to the text message. Selecting "Back to All Alerts" would return to the previous emergency data manager portal GUI 143 view.

Figure 20:
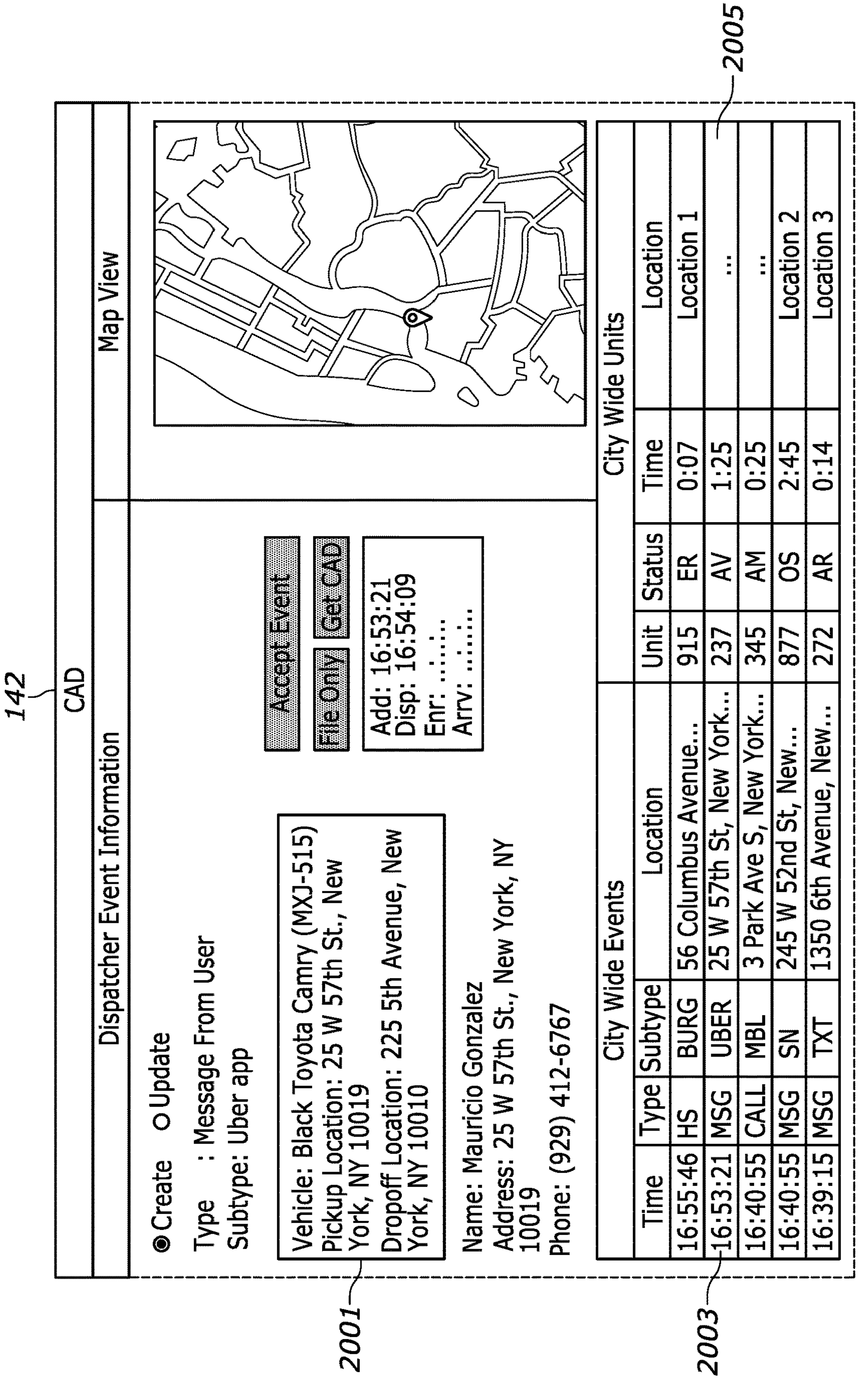
FIG. 20 is an example graphical user interface (GUI) displayed on an emergency network entity display and showing an associated event identifier field.

When the emergency network entity is a call handling workstation, and the operator selects the "CAD" (computer aided dispatch) 1907 button, the CAD workstation GUI 142 is shown in FIG. 20. The CAD GUI 142 provides the ride sharing information 2001 for the received event, and may also display a list of events 2003 and a list of available units 2005.

Each event in the list of events 2003 may have an associated event identifier ("event ID") which may be provided in an event ID column 2009. An event ID, which may also be referred to as an "event number," "incident ID" or "incident number" may also be shown in an event ID field 2007 that is specific to the event being displayed on the CAD GUI 142. In this example the event ID field 2007 shows an event ID for an incident/event related to the ride sharing information 2001. The emergency data manager 100 is operative to correlate emergency queue entry event IDs and to provide links to correlated event IDs in those correlated emergency queue entries.

Figure 21:
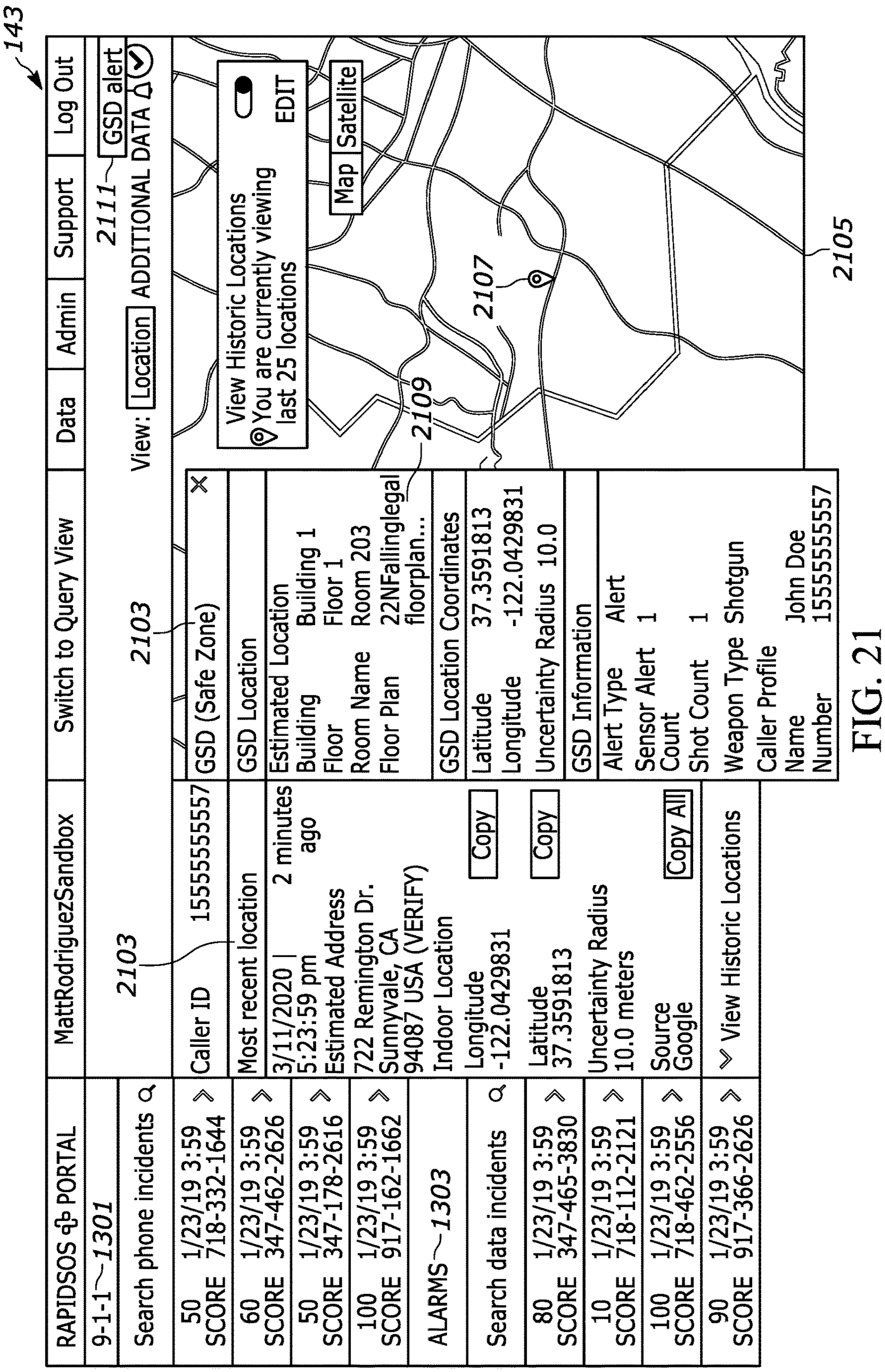
FIG. 21 is another example graphical user interface (GUI) displayed on an emergency network entity display in accordance with an embodiment.

FIG. 21 provides an example of the emergency data manager portal GUI 143 for a gunshot detection system (GSD) alarm. An emergency call selected from the emergency call queue 1301 provides the "most recent location" data 2103. If any related sensors or alarms exist, an icon such as a bell icon and a text indicator 2111 will show the emergency network entity operator that additional data is available. For example, the text indicator 2111 shows that data from a GSD system is available. By selecting the bell icon, a popup card 2103 is displayed that shows information detected by the GSD including location, direction and weapon type. The location indicator 2107 in the map view 2105 shows the caller's location and a second indictor may also be displayed related to the GSD estimated location. In the case of the GSD estimated location being within a building a floorplan indicator 2109 may be provided that is selectable to retrieve the floorplan when available. The emergency network entity operator may send the floorplan to emergency responder devices such that the emergency responders may navigate within the building upon their arrival.

Figure 22:
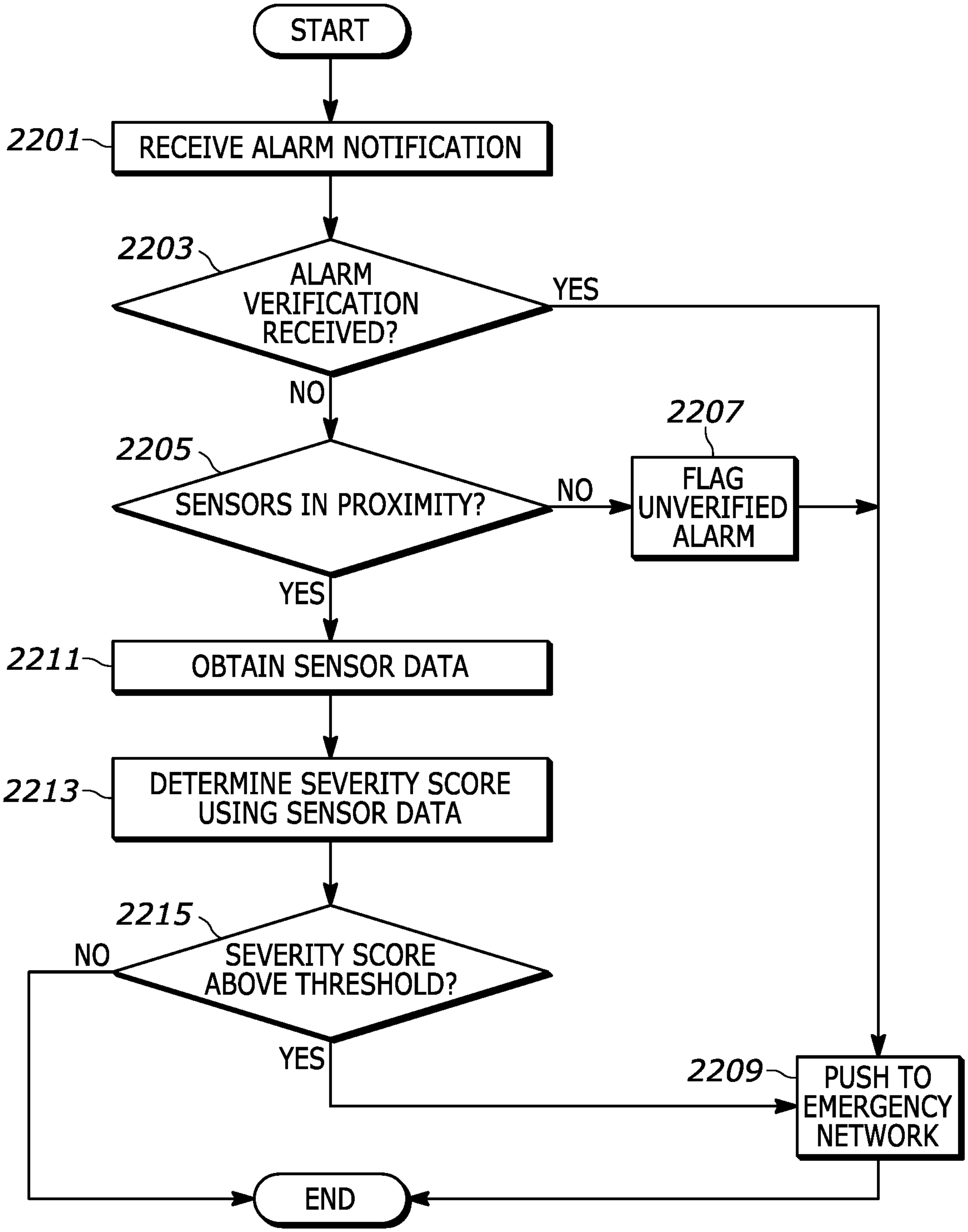
FIG. 22 is a flowchart showing a method of operation of an alarm signal processor in an emergency data manager in accordance with various embodiments.

FIG. 22 is a flowchart showing a method of operation of the alarm signal processor 200 in accordance with various embodiments. The method of operation begins, and in operation block 2201, the alarm signal processor 200 receives an alarm notification. The alarm notification may be prioritized alarm data 213 or may be non-prioritized alarm data 215. Therefore, in decision block 2203, the alarm signal processor 200 checks whether an alarm verification was received from one of the screener networks 207, or via the IVR call flow logic 380 or SMS/MMS client 381. The emergency data manager 100 has access to a database of contact phone numbers that are associated with various alarms, such as a home owner's phone number for a home having a fire alarm and burglar alarm, or for medical patients, etc. Likewise, the database may contain contact phone numbers for commercial building alarms.

If alarm verification is received at decision block 2203, then the method of operation proceeds to operation block 2209 and pushes the alarm data to the emergency network. However, if an alarm verification has not been received at decision block 2203, then the method of operation proceeds to decision block 2205 and the alarm signal processor 200 checks whether there are any sensors and proximity to the location from which the alarm notification was received. If not, then the alarm signal processor 200 flags the alarm as an unverified alarm in operation block 2207, and pushes the alarm data to the emergency network with the unverified alarm flag in operation block 2209. However, if sensor data is available at decision block 2205, then the method of operation proceeds to operation block 2211 and the alarm signal processor 200 obtains sensor data from the sensors 197. In operation block 2213, the alarm signal processor 200 determines a severity score using the sensor data. In decision block 2215, alarm signal processor 200 may determine whether the severity score is above a threshold. If not, the method of operation terminates as shown. However, if the severity score is above a threshold at decision block 2215, then the alarm signal processor 200 will push the alarm data to the emergency network in operation block 2209. In other words, the alarm signal processor 200 will not push the alarm to the emergency network if it is determined that the alarm is a false alarm. The severity score, and the predetermined thresholds may be used to determine whether an alarm is false alarm or not.

Figure 23:
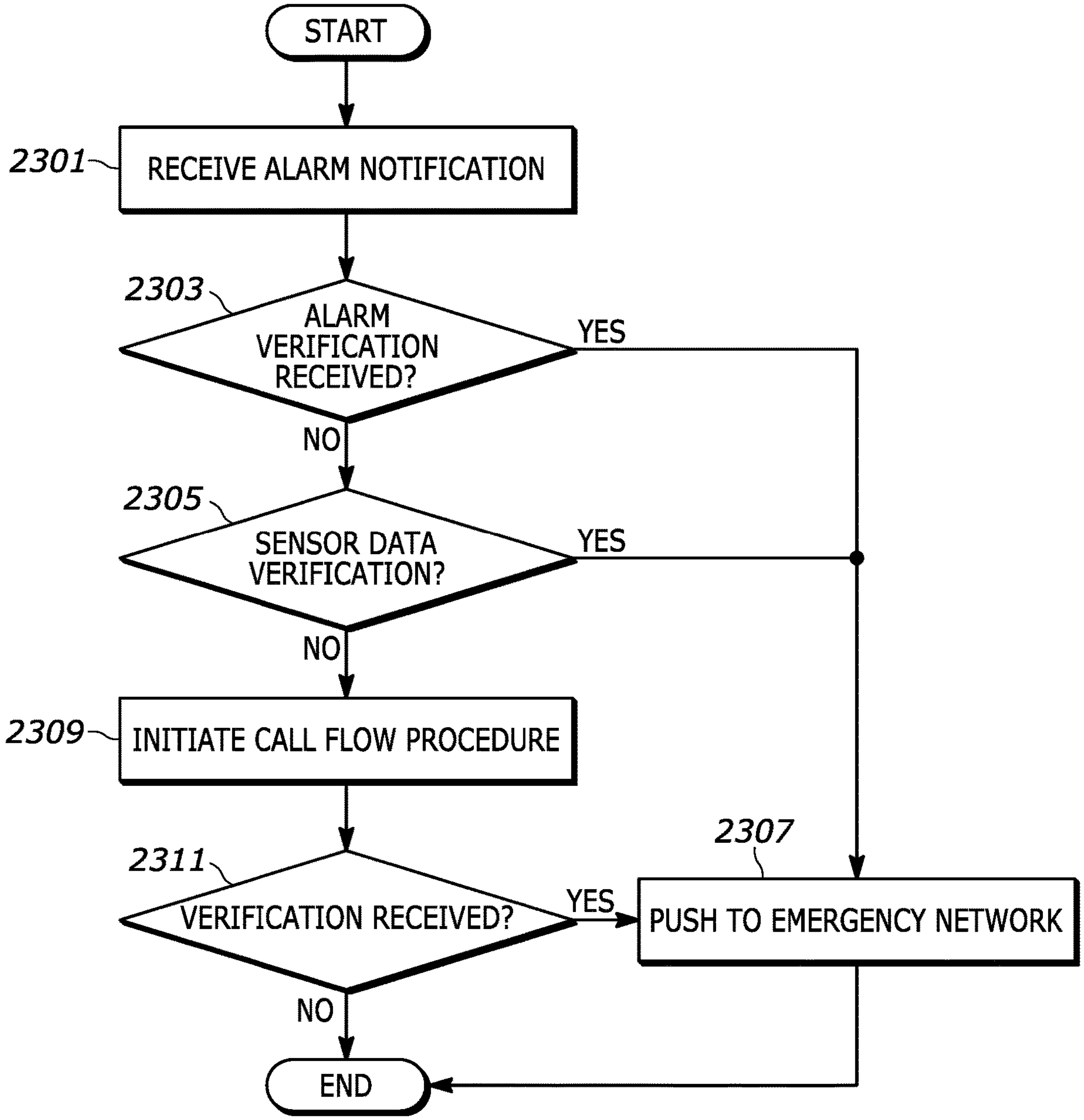
FIG. 23 is a flowchart showing a method of operation of an alarm signal processor in an emergency data manager in accordance with various embodiments.

FIG. 23 is a flowchart showing a method of operation of the alarm signal processor 300 in accordance with various embodiments. The method of operation begins, and in operation block 2301, the alarm signal processor 200 receives an alarm notification. At decision block 2303, the alarm signal processor 300 determines whether an alarm verification has been received from one of the screener networks 195. If an alarm verification has been received at decision block 2303, then the method of operation proceeds to operation block 2307 and pushes the alarm data to the emergency network. The method of operation then terminates as shown. However, if no alarm verification was received at decision block 2303, then the alarm signal processor 300 will check for sensor data verification in decision block 2305 and perform an analysis. If sensor verification data is obtained in decision block 2305, and the analysis indicates alarm verification, i.e. not a false alarm condition, then the alarm signal processor 300 will push the alarm data to the emergency network in operation block 2307. However, if no sensor verification data is obtained at decision block 2305 or if the alarm analysis indicates a false alarm condition, then in operation block 2309 the alarm signal processor 300 may initiate a call flow procedure via the IVR call flow logic 380, send messages using the SMS/MMS client 381, or both. The call procedure may use an automated IVR call (i.e. a robot call) to the keyholder related to the alarm and request verification by an input. Messaging will request a text reply with a given character, such as "1" to verify or "2" for false alarm, or will provide one or more web links such as for verify alarm and for false alarm. Alternatively, a single web link may be provided that, when selected, provides a web page with two selectable soft buttons, one for "verify alarm" and one for "false alarm." By selecting one or the other soft buttons, the webpage will provide the user input to the emergency data manager 100 and to the alarm signal processor 300. If the verification is received at decision block 2311, then the alarm data is pushed to the emergency network in operation block 2307 as a verified alarm. However, if no verification is received at decision block 2311, then the method of operation terminates as shown and the alarm is not pushed to the emergency network because it is determined to be a false alarm. Alternatively, the alarm is still pushed to the emergency network, but it is flagged and displayed on the emergency data manager portal GUI 143 as an unverified alarm. The specific emergency network may then follow their internal response protocol regarding how to handle or respond to the unverified alarm. The analysis performed in decision block 2305 may utilize machine learning where the alarm signal processor 300 is trained using alarm and sensor big data that was collected previously by alarm dealers, central stations, the emergency data manager 100 or some combination of these. In other implementations, the alarm signal processor 300 uses rules-based methods to perform the false alarm detection analysis. In either of these implementations, the alarm signal processor 300 may assign scores to alarms and these scores may be displayed in the alarm queue on the emergency data manager portal GUI 143 at the emergency network entity 140.

Figure 24:
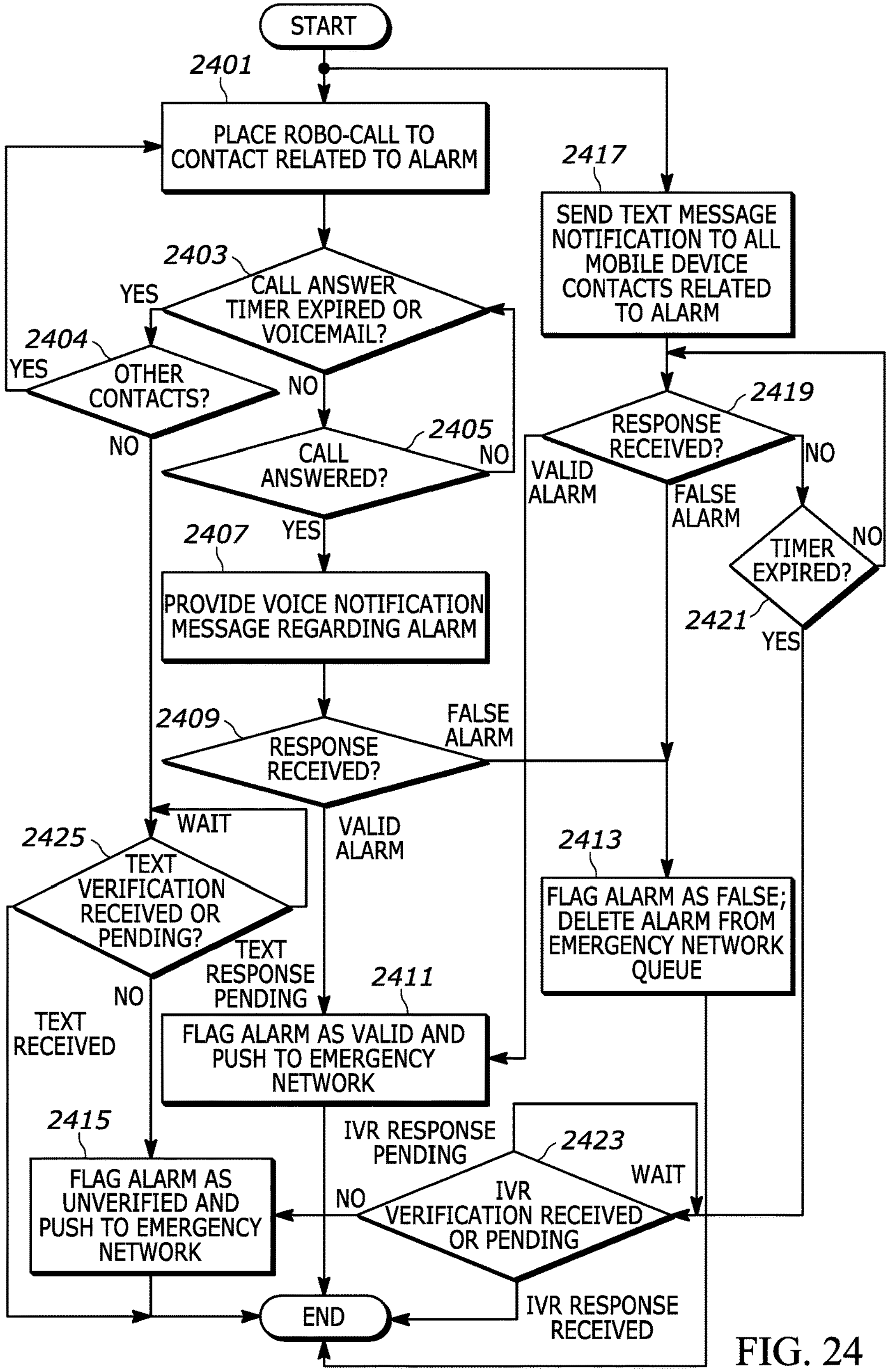
FIG. 24 is a flowchart showing a method of operation of an alarm signal processor in an emergency data manager in accordance with various embodiments.

FIG. 24 is a flowchart showing a method of operation of queue entry correlation logic 220 the alarm signal processor 200 in accordance with various embodiments. The flowchart of FIG. 24 is a method of operation that verifies that an alarm is valid by contacting a party responsible for the alarm such as a property keyholder, etc. Verification may be obtained by an IVR robo-call response or via a text message response. Both an IVR robo-call and a text message notification may be sent in parallel with logic that handles the verification depending upon which response is received first, or if a response is not received at all. The method of operation begins and in operation block 2401, the queue entry correlation logic 220 IVR call flow logic 380 places an IVR robo-call to a contact related queue entry correlation logic 220 queue entry correlation logic 220 to an alarm. In operation block 2417, a text message notification may also be sent to all contacts related to the queue entry correlation logic 220 alarm in parallel with the IVR robo-call. A timer is set in decision block 2403 and the system detects whether the call is answered or goes to a voice mail system. If the timer expires, or the call goes to voice mail in decision block 2403, then the queue entry correlation logic 220 method of operation proceeds to decision block 2404 and checks for other contacts. If other contacts exist, then the queue entry correlation logic 220 process returns to operation block queue entry correlation logic 2202401 and places a robo-call to the next contact. This process loops until attempts to reach all contacts via IVR calls have been exhausted.

At decision block 2425, the status of any text message sent at operation block 2417 is checked. If no text message was received or is pending at decision block 2425, and if no other contacts are available in decision block 2404, then in operation block 2415, the alarm signal processor 300 may flag the alarm as unverified and push the alarm to an emergency network with the unverified indication, or alternatively delete the alarm. The method of operation then terminates as shown. A second timer is set in decision block 2421 that sets a predetermined time interval to wait for a text message response for the text message notification sent in operation block 2417. If no text response is received before the timer expires in decision block 2421, and if no IVR response is received or pending in decision block 2423 based on the decision block 2403 timer, then the process again proceeds to operation block 2415, in which the alarm signal processor 300 may flag the alarm as unverified and push the alarm to an emergency network with the unverified indication, or delete the alarm and terminate the method of operation.

If an IVR response remains pending at decision block 2423 meaning that the timer in decision block 2403 has not yet timed out, the alarm signal processor 300 waits until the IVR call process is completed. If an IVR response is received at decision block 2423, then this leg of the method of operation terminates as shown. Likewise, if a text verification in decision block 2425 is still pending meaning that the timer in decision block 2421 has not yet timed out, the alarm signal processor 300 waits until the text verification process is completed. If a text verification is received at decision block 2425, then this leg of method of operation terminates as shown. In other words, a first-in-first-out (FIFO) approach is used for verification in that whichever verification is received first, whether IVR input or text message response, that response will be used to verify or clear the alarm.

If the IVR robo-call is answered in decision block 2405, then in operation block 2407 the IVR call flow logic 380 provides a voice notification message and prompts the user to provide a response either by voice response or by making a keypad entry. If a response is received in decision block 2409, this constitutes an acknowledgement input that verifies that the alarm is valid, then in operation block 2411 the alarm signal processor 300 flags the alarm as valid and verified and pushes it to an appropriate emergency network. The method of operation then terminates as shown. However, if the response received in decision block 2409 indicates that the alarm is a false alarm, then in operation block 2413 the alarm signal processor 300 flags the alarm as a false alarm and deletes the alarm from the emergency network queue, or does not push the alarm to the emergency network, depending on the specific implementation. The method of operation then terminates as shown. If no response to the IVR prompt is received in decision block 2409 within a predetermined number of seconds, then the process returns to decision block 2404 and attempts to reach other contacts.

The text messaging operation in operation block 2417 operates similarly, and the alarm signal processor 300 accepts the first source, i.e. IVR call or text response, as the determination of whether an alarm is valid or is a false alarm. Thus, if a text message response is received in decision block 2419 indicating that the alarm is valid, this constitutes an acknowledgement input being received. Then in operation block 2411, the alarm signal processor 300 flags the alarm as valid and verified and pushes it to an appropriate emergency network. The method of operation then terminates as shown. However, if the text message response received in decision block 2419 indicates that the alarm is a false alarm, then in operation block 2413 the alarm signal processor 300 flags the alarm as a false alarm and deletes the alarm from the emergency network queue, or does not push the alarm to the emergency network, depending on the specific implementation, just as in the IVR call scenario.

Figure 25:
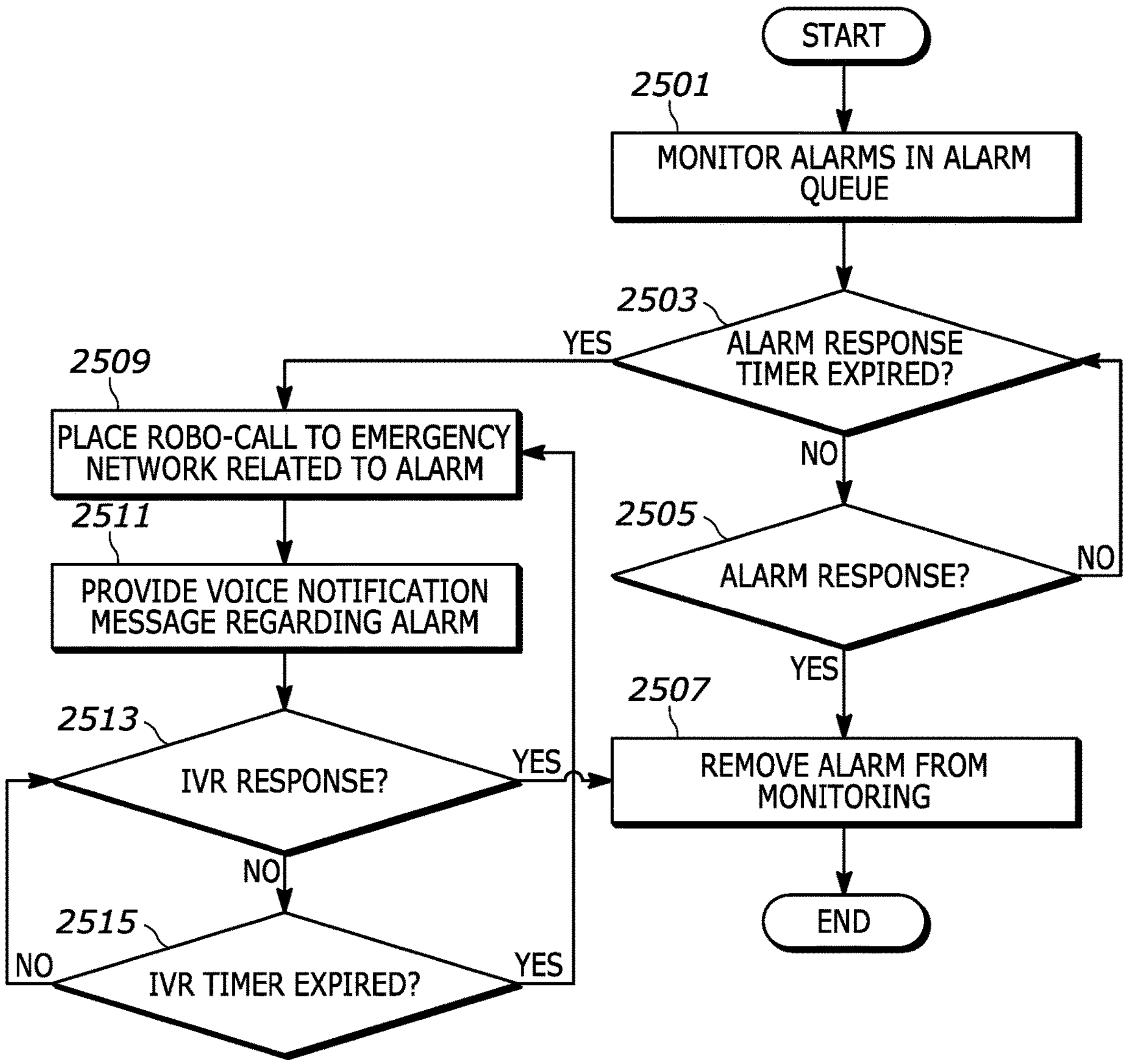
FIG. 25 is a flowchart showing a method of operation of an alarm signal processor in an emergency data manager in accordance with various embodiments.

FIG. 25 is a flowchart showing another method of operation of the alarm signal processor 300. The flowchart of FIG. 25 is a method of operation that serves as a fail-safe to ensure that alarms pushed to an emergency network entity are handled within a given period of time and not overlooked. The emergency network entity 140 operator can claim an alert in the alarm queue using the emergency data manager portal GUI 143. If an operator takes ownership of an alert entry in the alarm queue, the emergency data manager 100 no longer monitors that entry. However, all other alarm queue entries are monitored until action is taken at the emergency network entity 140. The method of operation begins and in operation block 2501, the alarm signal processor 300 monitors alarms an emergency network entity's alarm queue to determine whether an operator has claimed the alarms to take action. A fail-safe timer is set and monitored in decision block 2503 for each alarm in the alarm queue. In other words, monitoring each alarm requires associating each alarm with a timer, and then determining if an operator has performed an action on the alarm prior to expiration of the timer. When an operator selects the alarm from the alarm queue, this constitutes the operator performing an action and is an "alarm response" such that the timer is terminated and the alarm may be removed from monitoring. If an alarm response is not received at decision block 2505, then the process continues to monitor the time in decision block 2503. If a response to an alarm occurs at the emergency network entity in decision block 2505, then in operation block 2507 that particular alarm is removed from the monitoring list and the method of operation terminates as shown.

If the fail-safe timer expires at decision block 2503, then the process proceeds to operation block 2509 and the IVR call flow logic 380 places an IVR robo-call to the emergency network with a message related to the alarm. In operation block 2511, an IVR message is provided upon the call being answered. For example, the IVR message may state "Alarm ID 123456 generated at 3:00 PM has not been responded to at this time, please respond to alarm ID 123456" or something similar. The IVR system may prompt the call taker to respond with an acknowledgement, such as by pressing the "1" key.

If a response to the IVR message is not received in decision block 2513, then the IVR call flow logic 380 waits for a timer to expire in decision block 2515. If the fail-safe timer expires in decision block 2515, the process will return to operation block 2509 and the IVR call flow logic 380 will place another emergency call. This process will continue until an acknowledgement is received in decision block 2513. Once an IVR response is received in decision block 2513, it is understood that the emergency network entity operator is aware of the alarm and will handle it accordingly. Therefore, the process proceeds to operation block 2507 and the alarm is removed from the monitoring list and the method of operation terminates as shown.

The interval setting for the fail-safe timer may vary based on emergency type, emergency severity, characteristics of the emergency service provider such as estimated or expected response times, administrative input, etc. The fail-safe timer interval may be, for example, between five seconds to six-hundred seconds, one minute to thirty minutes, five minutes, ten minutes or some other timer interval, etc.

In some embodiments, a machine learning algorithm is fed appropriate amounts of emergency data from alarms, emergency calls and sensors to form a training procedure that is used to train the alarm signal processor 200. In other words, in some embodiments the alarm signal processor 200 is trained by machine learning algorithms subsequent to the machine learning algorithms evaluating appropriate amounts of emergency data and/or comparing actions of the machine learning algorithm with the actions of an experienced call taker and adjusting the algorithm accordingly. Thus, in some embodiments, the alarm signal processor 200 is a rule-based logic system that applies predetermined rules stored either within the logic component, or within operatively coupled external memory. While in other embodiments, the alarm signal processor 200 is trained via one or more machine learning algorithms.

The alarm signal processor 200 may implement a rule-based system and may use logic conditions to make false alarm determinations. For example, if a burglar alarm is triggered, the alarm signal processor may check motion sensors, and glass break detectors, etc. if available. An example rule may be: "{burglar alarm triggered: glass break detected AND motion sensor=VALID; NOT glass break detected AND NOT motion sensor=FALSE; glass break detected AND NOT motion sensor=FALSE; NOT glass break detected AND motion sensor=VALID}. Thus, if both the glass break sensor is triggered and motion is present within the premises, the burglar alarm is deemed verified and valid. However, if there is no glass break, and no motion detected, the alarm is deemed to be a false alarm. If a glass break is detected, but there is no motion detector triggered, likely indicated that no one entered the property through the broken window, the alarm is deemed to be a false alarm. If there is no glass broken, but motion is detected inside the property, likely indicating that a burglar has gained entry to the property, the alarm is deemed valid. As should be understood, any of various logical rules may be constructed using sensor data and these logical rules may be used as an indication of a valid alarm or a false alarm accordingly. Therefore, such rules may be used to provide verification of alarms. The rules may also be used to assign priority scores to alarms. For example, each of the logical rule conditions may contribute to determination of a priority score.

In an example of operation, if a home burglar alarm is triggered and the alarm is received at the alarm signal processor 200, a rule-based verification process may be invoked as described by the example provided above. If the result of the rule-based verification is that the alarm is valid, then the emergency alert will be pushed to an emergency network entity 140 for display in an emergency alert queue of the GUI 143.

The alarm signal processor 200 may implement a machine learning based system in which machine learning algorithms apply predictive analytics and use previously and currently gathered big data from all alarm and sensors that have been connected to and monitored by the system. For example, clusters of alarms, trends, social media events, weather and other factors may contribute to the predictive analytics such that, when combined with sensor data indicate certain probabilities that an event, such as a burglary, fire, medical emergency, etc. is occurring. Thus, the verification of an alarm may include the insights obtained from predictive analytics on collected big data in addition to the sensor data local and specific to a given alarm.

When incorporating machine learning algorithms, the alarm signal processor 200 may analyze environmental and other data which may include, but is not limited to, weather conditions, historic emergency alerts in a proximal geographic area, concurrent emergency alerts in a proximal geographic area, infrastructural data, social media, sensor data, etc. The alarm signal processor 200 may maintain a database with the various historic and concurrent data and update it as additional data is received, further updated various predictive analysis models based on the updated data. The data may include, for example, information on emergency alerts that were verified or determined to be false alarms by a rule-based system, and any other information that may show that the rule-base verification was contradicted by actual or empirical data as to the actual status. In other words, verification successes and failures are tracked, and the machine learning algorithm learns from the successes and failures of both rule-based verifications and predictive analytics model predictions/verifications. For example, a predictive analytics model may be used for verification of an alarm when the predication model shows a probably of a valid alarm greater than a threshold probability. Likewise, a predictive analytics model may be used for determination that an emergency alert received is a false alarm when the predication model shows a probably of a valid alarm less than a threshold probability, or conversely shows a probability of a false alarm greater than a threshold probability, etc. The machine learning algorithm may use an average of the verification statuses such as percentage of emergency alerts received from a particular source that were confirmed valid or determined to be false alarms, etc. Comparison of averages of such statuses to predefined thresholds may be applied to newly received emergency alerts to determine whether the sensor data and or other conditions related to the received emergency alert "fit" within one of the average scenarios.

Cluster detection is also one capability of the machine learning algorithms. For example, if two or more emergency alerts are received proximate in time and are verified by the alarm signal processor 200 to be valid, and if a subsequent emergency alert is received also proximate in time, then the machine learning algorithm may use data from the initial two or more previous emergency alerts to determine status of the subsequent emergency alert. Other factors that may be used by the machine learning algorithm to make alarm validity or false alarm decisions include, but are not limited to, the vicinity of the emergency alert and other alerts, the time frames of all received emergency alerts, and the emergency types, etc. For example, if an emergency alert is received from a vicinity where a thunderstorm and a power outage are occurring or have occurred, then the machine learning algorithm may take this information as factors toward determining whether an emergency alert is valid or is a false alarm caused by the power outage or some related condition.

In an example of operation in which machine learning is utilized, if a burglar alarm is received from a commercial building, the alarm signal processor will invoke a machine learning algorithm and associated predictive analytics models to determine whether the alarm is valid or is a false alarm. If the alarm is determined to be valid, then the emergency alert will be pushed to an emergency network entity 140 for display in an emergency alert queue of the GUI 143.

Prioritizing Emergency Alerts

Priorities for emergency alerts and emergency calls may be changed as needed by emergency networks during emergency situations. In an example situation in which prioritization may be used, a tornado warning may be in place for a southwestern portion of a city. Three local emergency networks, PSAP A, B and C that service the city may be placed on high alert. Assuming PSAP A is located in the southwestern part of the city and is the first in the path of the tornado, and cell towers within the PSAP A jurisdiction go down due to the storm severely impacting network connectivity, PSAP A may setup or adjust its emergency queue prioritization such that emergency calls are answered first and emergency alerts are responded to when there are no calls in the queue. In another example, the manager of PSAP A may respond to the cellular system outage and initiate a “connectivity outage protocol” in which calls and alerts are responded to with equal priority. Under such a protocol, an emergency call from the queue may be answered first by an operator, before an alert in the emergency alert queue is claimed and responded to.

While such a protocol is being invoked, various alarms may be handled accordingly. For example, if a “structural fire alert” comes in regarding a fire in a chemical factory, this emergency alert may be given higher priority and moved to the top of the emergency alert queue because of the high risk of damage and/or if the emergency alert was initiated by a chemical factory worker, which may be used as a factor for determining validity of the incoming alarm.

In order to help ensure that a PSAP operator sees a critical emergency alert such as for the example structural fire alert, the emergency alert entry in the queue may be set to a flashing state for some period time such as for one minute. It may also use a special font type, font size, font color or some combination. If the alert is not claimed by the PSAP operator within a time threshold, the emergency alert may be escalated by making an emergency call from a monitoring station such as may be associated with the security company for the factory in the structural fire alarm example. The central station 401 shown in FIG. 4 is an example of a monitoring station that may make an emergency call to a PSAP or other type of emergency network. The central station 401 may have associated operating procedures in which it receives feedback information from an emergency network entity of a PSAP, i.e. from an emergency data manager portal GUI 143 such as when an emergency alert in the queue is claimed by an operator, or that an emergency alert has not been claimed within a threshold period of time as was described with respect to FIG. 25. The flowchart of FIG. 25 illustrates an automated procedure for dealing with emergency alerts in an emergency alert queue that have not been claimed by an emergency network entity operator within a threshold period of time. A central station 401 such as shown in FIG. 4 may also implement operating procedures such as manual calling procedures as described above, to ensure that emergency alerts in the queue are appropriately handled.

The emergency network operators/call-takers will be trained to claim and respond to emergency alerts in the emergency alert queue. Thus for example, if a PSAP operator sees an emergency alert such as the example structural fire alarm at a chemical factory, the operator may select the alert from the emergency alert queue on the GUI 143 to claim it, and to read through the description which may include a message from the chemical factor owner, for example. The PSAP operator may then push the emergency alert to a CAD station so as to dispatch fire trucks to the factory to contain the fire.

In another example of an incoming alarm, which may occur at or around the same time as other received alarms such as the structural fire alarm example, a fire alarm from a fire alarm pull-box at a local high school may arrive in the emergency alert queue. Prior to the alarm being pushed to the PSAP from the emergency data manager, the alarm signal processor 200 may have data showing that several false alarms were triggered previously from the high school location and/or that it was a sensor triggered alert with no verification by eyewitnesses. In that case, the alarm signal processor 200 may set a lower priority to the corresponding emergency alert before it is pushed to the emergency alert queue, such that it is kept as the last item in the queue or otherwise below higher priority emergency alerts. Such lower priority emergency alerts may be handled according to the specific emergency networks operating procedures. For example, the PSAP A operator in the example may wait until the end of the shift to call the high school security officer to discuss the fire alarm and confirm that it was indeed a false alarm such as a prank, and that the fire alarm had been reset.

Queue Entry Correlation

Figure 26:
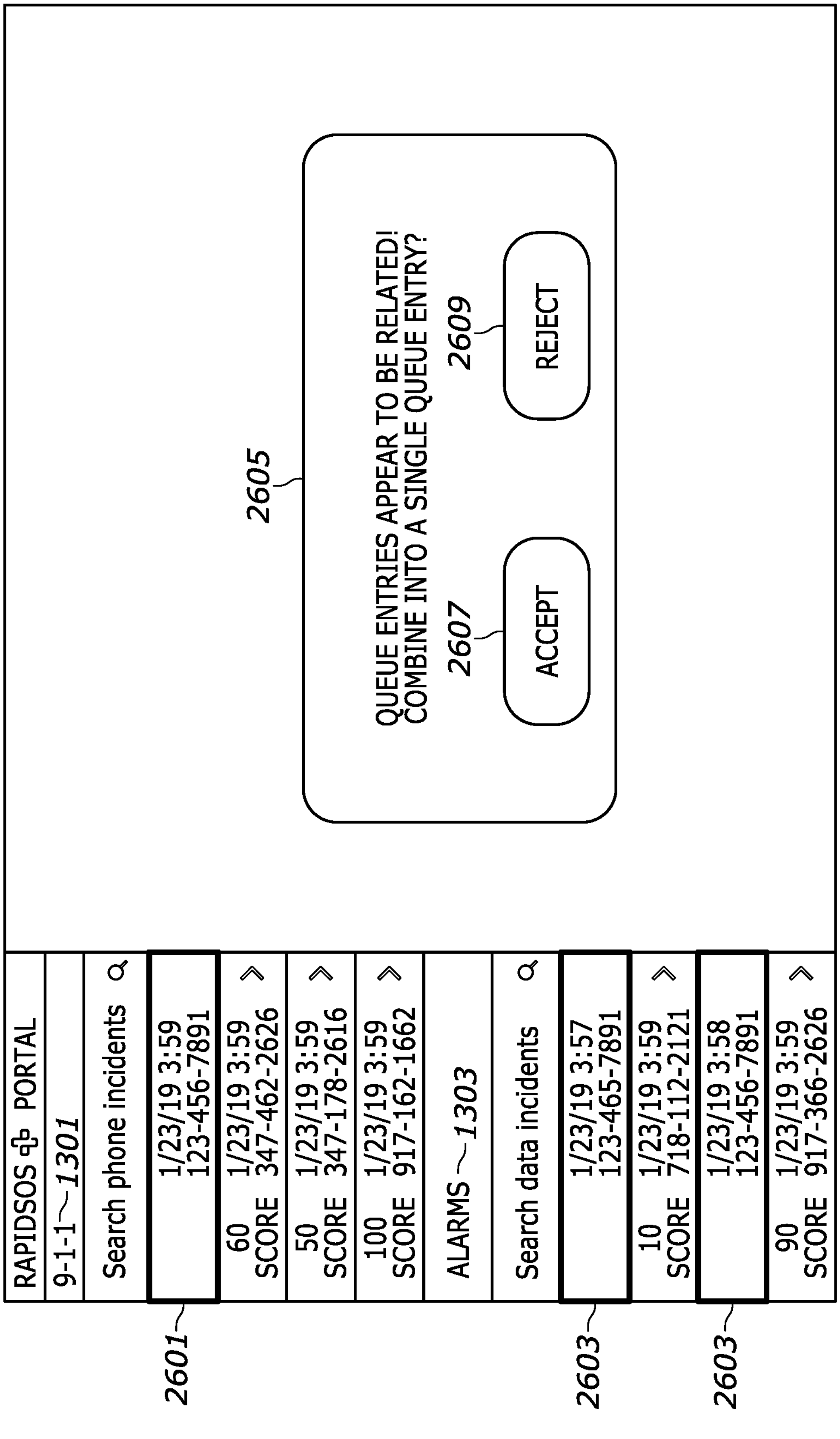
FIG. 26 is an example emergency data manage portal GUI with a dialogue suggesting queue entry consolidation for correlated queue entries.

FIG. 26 is a diagram of the emergency data manager portal displayed at an emergency network entity, showing an example of how the queue entry correlation logic 382 may suggest a combination of queue entries to an emergency network entity operator. The queue entry correlation logic 382 monitors entries in the emergency call queue 1301 and alarms in the alarm queue 1303. The queue entry correlation logic 382 may be implemented using a rules-based approach, a machine learning approach or a combination of the two in which a rules-based rubric is used to initiate training of the machine learning algorithm.

The rules-based rubric includes performing database lookup operations for incoming emergency calls, alerts and alarms and comparing the telephones numbers in alarm databases to telephone numbers of incoming emergency calls. When a match is found between a telephone number associated with an alarm entry in the alarm queue 1303 and a telephone number in the caller ID of an emergency call in the emergency call queue 1301, these two entries are assumed to be related. For alarms that have multiple sensors, or for multiple alarms locations within the same building, alarm entries in the alarm queue 1303 are likewise assumed to be related. For example, an entry alarm that has a door sensor activated and also a glass break sensor activated are assumed to be related. In some cases, the sensors will already be related by an alarm panel at which the related sensors are connected, and the alarms will include a common alarm ID. In that case, the alarms in the alarm queue 1303 is already a single alarm queue 1303 entry because it is based on an alarm ID which is associated with the alarm panel. That is, many sensors of various types may be connected to a common alarm panel, and the alarm panel sends the alarm signal to the emergency data manager 100.

In an example in which two alarm sensors from different alarm systems or alarm panels, a burglar alarm may send an alarm signal from a door entry sensor connected to an alarm panel, and another alarm may be sent from a car alarm from a car located in a garage. In this example, the car alarm is an IoT alarm and sends the alarm signal wirelessly. Two alarm entries may be displayed in the alarm queue 1303 in this case. However, the queue entry correlation logic 382 will suggest that these two alarm entries be combined, because the keyholder’s telephone number is identical, and the home address location is the same for both alarm entries When the queue entry correlation logic 382 detects that two queue entries appear related, a popup dialogue box 2605 may be displayed on the emergency data manager portal GUI notifying the emergency network entity operator that two or more entries may be related. The popup dialogue box 2605 may request verification by the emergency network entity operator via, for example, an accept button 2607 and a reject button 2609. The emergency network entity operator may use their mouse cursor to select the accept button 2607 to combine the queue entries, or may select the reject button 2609 to ignore the suggestion. Selecting the reject button 2609 returns the GUI to the previous view with the emergency call entry 2601 shown in the emergency call queue 1301 and the alarm queue 1303 alarm entries 2603 each shown separately. The queue entries may be organized using a timestamp as a default setting with the oldest calls and alarms shown at the top of the queues. Selecting the accept button 2607 may change the GUI to the view show in FIG. 27.

Figure 27:
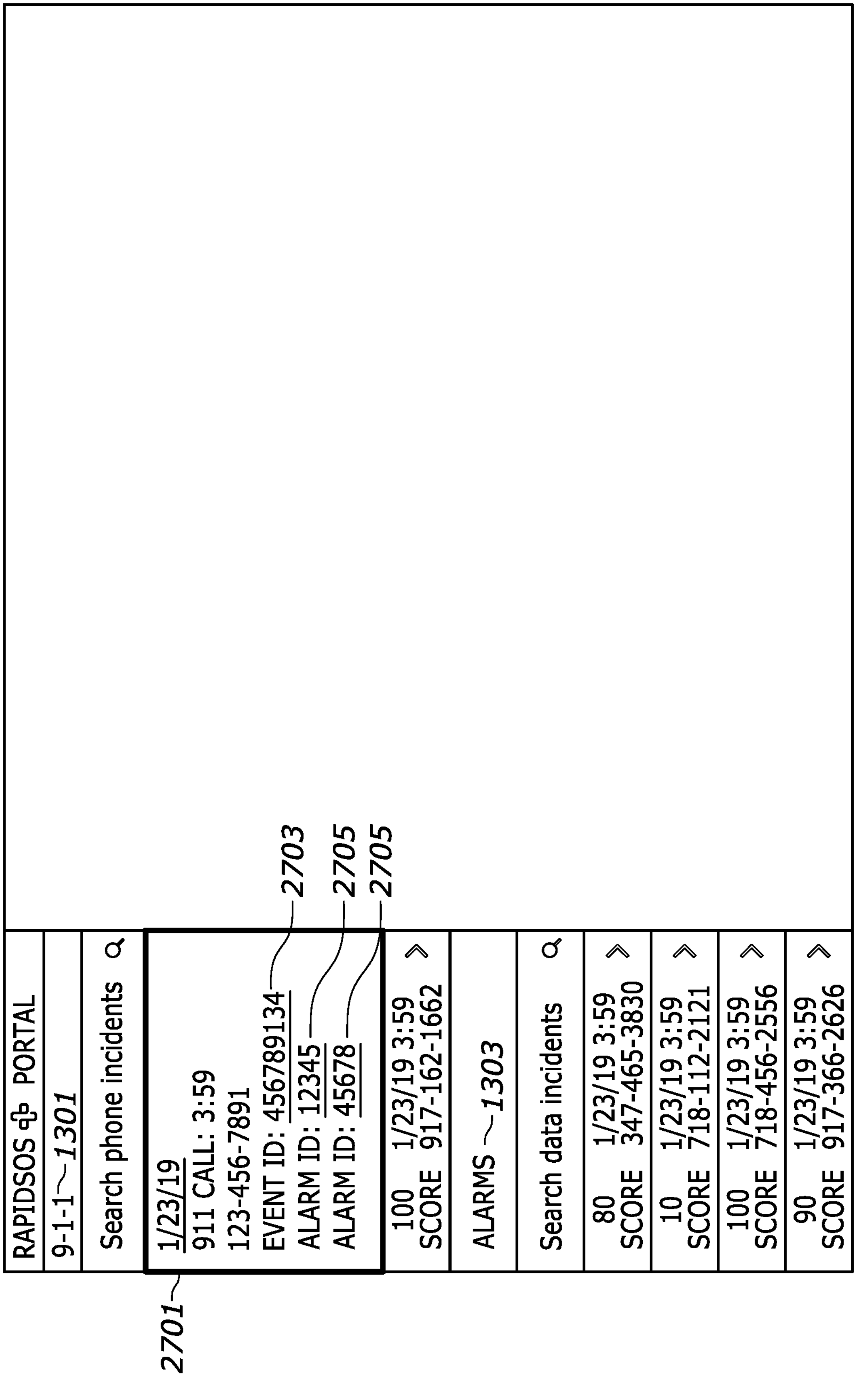
FIG. 27 is an example emergency data manage portal GUI with a consolidated queue entry with links to each correlated queue entry.

In FIG. 27, a single consolidated queue entry 2701 lists all correlated queue entries including all related emergency calls and alarms. In this example, the emergency call entry 2601 is combined with the two alarm queue entries 2603. Combinations of queue entries may only be acceptable to an emergency network depending on their defined operating procedures and preferences. The display of combined queue entries is flexible and the emergency data manager portal GUI is configurable to accommodate various preferences.

For example, the emergency data manager portal GUI may be configured to have a third queue for consolidated entries. Alternatively, a setting may enable alarm queue entries to be consolidated by not emergency calls in the emergency call queue.

Figure 28:
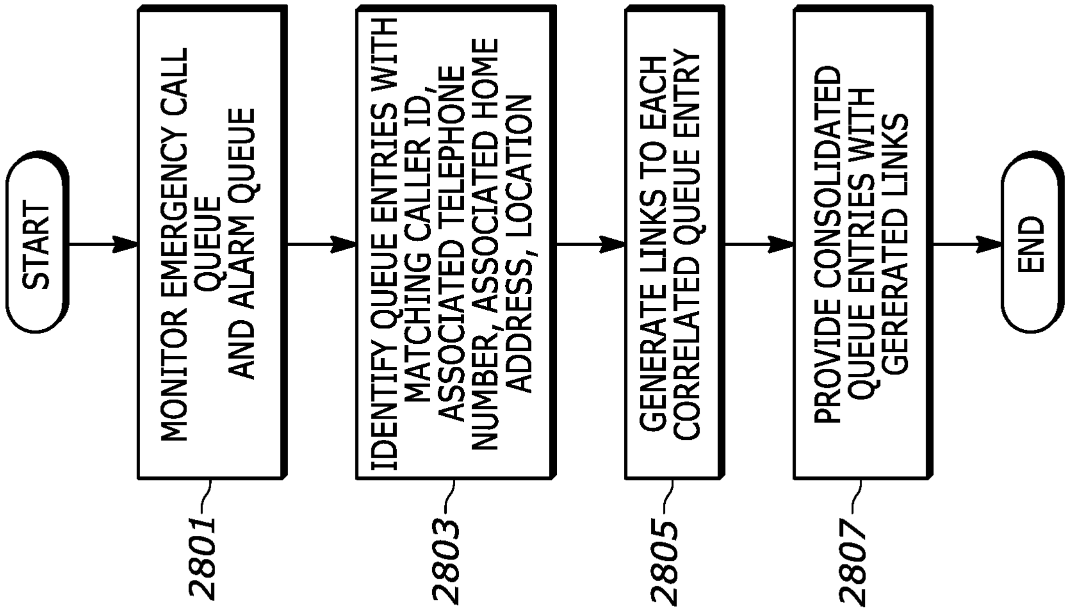
FIG. 28 is a flowchart showing a method of operation of queue entry correlation logic in an emergency data manager in accordance with various embodiments.

FIG. 28 provides an example method of operation of the queue entry correlation logic 220 shown in FIG. 2. The method of operation begins, and in operation block 2801, the queue entry correlation logic monitors an emergency call queue and an alarm queue on the emergency data manager portal GUI of an emergency network entity. For example, the emergency call queue 1301 and alarm queue 1303 as shown in the example GUI of FIG. 26 are monitored. More particularly, monitoring of the queues refers to detecting new entries added such that correlation logic rules can be applied to the new entries. In operation block 2803, for each incoming emergency call and for each incoming alarm that is added to the respective queues, the queue entry correlation logic performs a rule-based procedure and checks for matching caller ID, associated telephone numbers and associated home addresses in alarm owner/customer databases, location from mobile devices, and other data. In operation block 2805, the queue entry correlation logic generates links, such as Hypertext Transfer Protocol (HTTP) links), for each queue entry that matches another based on the matching rules such that it is correlated with another queue entry. In operation block 2807, the queue entry correlation logic provides a consolidated queue entry with the generated links. The emergency network entity operator may select the links in the consolidated queue entry to obtain display of additional data related to the linked correlated event or alarm. For each consolidated queue entry, one of the queue entries is considered a primary queue entry, and this event or alarm is listed first in the consolidated queue entry. The primary queue entry may be chosen based on a variety of criteria such as, but not limited to, timestamp, related event type, severity score, primary service request or supplemental data, response, response status, or other criteria such as specified by an emergency network's operating procedures or preferences, etc. A primary queue entry may also be chosen based on an emergency network entity operator selecting a queue entry. Upon the user's selection, the selected queue entry may be displayed as a primary queue entry along with links for any correlated queue entries that may have been received by the emergency data manager. Additionally, the primary queue entry in a consolidated queue entry may change, based on for example, the primary queue entry being resolved while one or more correlated linked queue entries remain pending. In that case, a new primary queue entry may be selected from the remaining pending queue entries. This selection is performed by the queue entry correlation logic.

Figure 29:
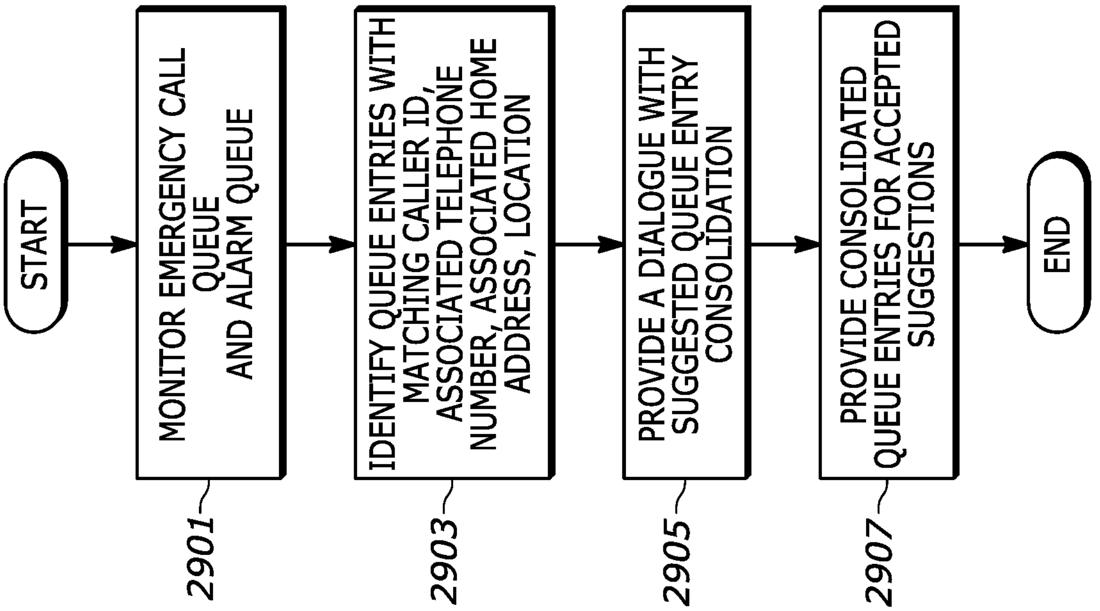
FIG. 29 is a flowchart showing a method of operation of queue entry correlation logic in an emergency data manager in accordance with various embodiments.

FIG. 29 provides an example method of operation of the queue entry correlation logic 220 shown in FIG. 2. The method of operation begins, and in operation block 2901, the queue entry correlation logic monitors an emergency call queue and an alarm queue on the emergency data manager portal GUI of an emergency network entity. For example, the emergency call queue 1301 and alarm queue 1303 as shown in the example GUI of FIG. 26 are monitored. In operation block 2903, for each incoming emergency call and for each incoming alarm that is added to the respective queues, the queue entry correlation logic performs a rule-based procedure and checks for matching caller ID, associated telephone numbers and associated home addresses in alarm owner/customer databases, location from mobile devices, and other data. In operation block 2905, the queue entry correlation logic provides a dialogue on the GUI with a suggested queue entry for each queue entry that matches another based on the matching rules. In operation block 2907, the queue entry correlation logic provides a consolidated queue entry for each accepted suggestion, that is accepted by the emergency network entity operator according to the respective emergency network's operating procedures and settings. The consolidated queue entry provides links, such as HTTP links, to alarm IDs, event IDs or both for all correlated events, where the emergency network entity operator may select the links in the consolidated queue entry to obtain display of additional data related to the linked correlated event or alarm. As the emergency network entity operator handles the alarms and events, and they are resolved or cleared, the links are either removed from the consolidated queue entry or are visually changed, such as to a different font type or color, to indicate that they have been resolved or cleared. The queue entry correlation logic makes the status changes in response to detecting action by the emergency network entity operator via the emergency data manager portal GUI.

Figure 30:
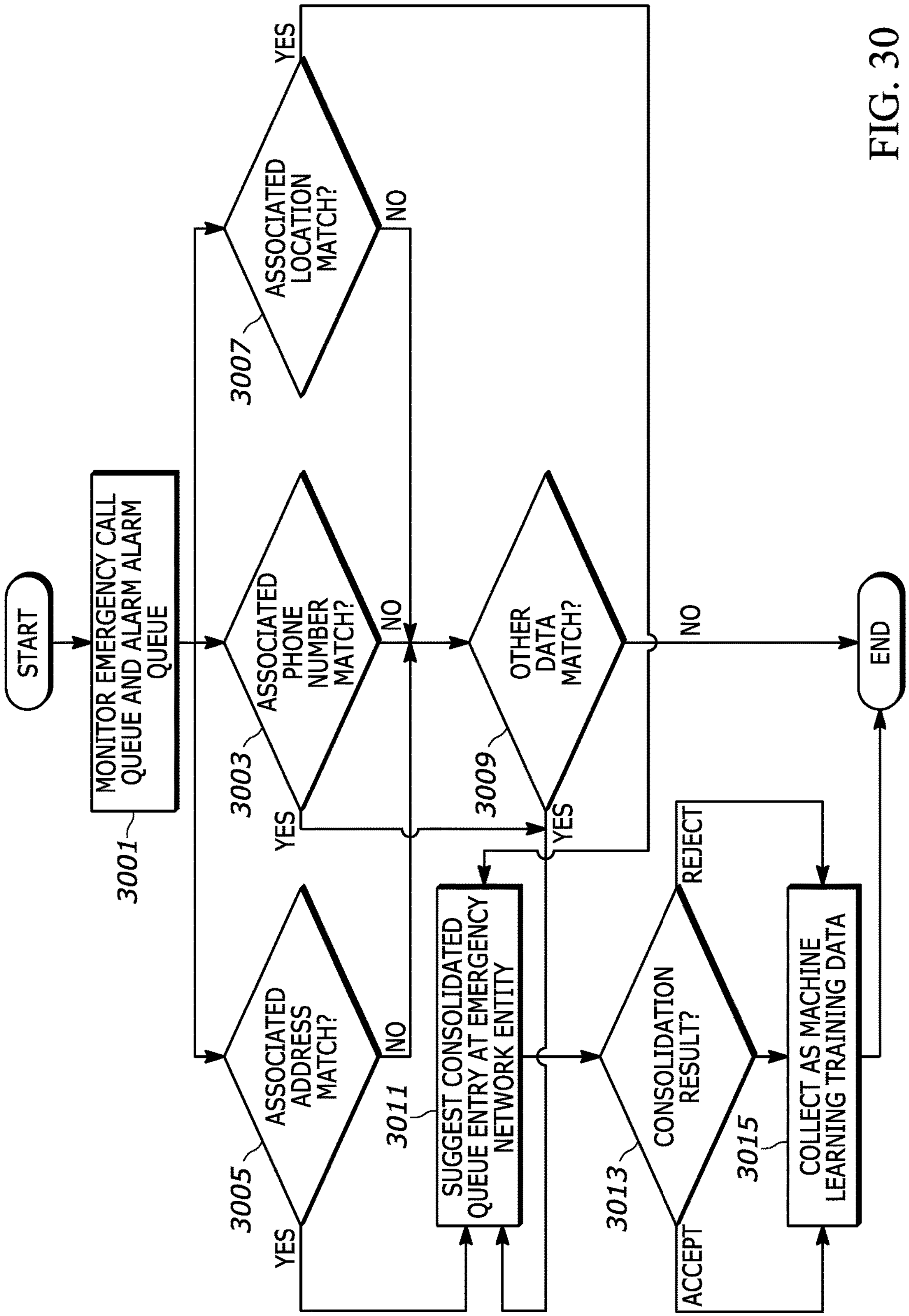
FIG. 30 is a flowchart showing a method of operation of queue entry correlation logic in an emergency data manager in accordance with various embodiments.

FIG. 30 is a flowchart of another example method of operation of the queue entry correlation logic that also shows how training data is collected for a machine learning algorithm The method of operation begins, and in operation block 3001, the queue entry correlation logic monitors the emergency call queue and the alarm queue on the emergency data manager portal GUI at an emergency network entity. The queue entry correlation logic checks various criteria including an address match in decision block 3005, an associated telephone number match in decision block 3003 and an associated location match in decision block 3007. If no match is found, the queue entry correlation logic may also check other data in decision block 3009. For example, for emergency calls, the queue entry correlation logic may check trajectory and speed along with proximity to other devices that may be on the same trajectory and similar speed. This may detect, for example, a crowd moving in a certain direction where multiple parties are calling in the same emergency. Because each member of the crowd may have the same or a similar trajectory, speed and locations within a given small radius, in addition to timestamps of each emergency call being within a given time interval, these calls can be identified as an anomalous emergency call cluster.

Another example situation that may be detected by other such data is a vehicle accident situation where passersby are calling in the same event. In this example, the vehicle drivers or passengers making the call will likely make the emergency calls from approximately the same location, and be traveling in the same direction with approximately the same trajectory and speed. Therefore, these calls can be identified as a cluster. For example, a relatively large number of calls (5 calls occurring within a 10 minute interval) incoming for an area could be identified as a cluster. As location data is received and tracked, some callers may appear to be moving away in one direction and others may be moving in another direction. In addition, some calls or emergency alarms (e.g., from a vehicular sensor) may be stationary, and therefor may be at the location of the accident. The map view displayed on the emergency network entity may include road overlay or map layers, which indicate that callers or alarms are located on a road, indicating a likelihood that a vehicular accident occurred. The emergency data manager 100 may create a link between all the emergency calls and emergency alerts that may be related to a vehicular accident, wherein the emergency network entity user can see the links when they select one emergency call or emergency alarms. The primary queue entry may be the one that is first answered or selected by an emergency network entity user, but may change when another is selected. Thus, a group of incoming queue entries may be correlated based on being associated with a vehicular accident, and a consolidated queue entry may be displayed that has links to each of the correlated queue entries with one queue entry being chosen as a primary queue entry.

Returning to the flowchart and decision block 3009, if no matching data is found for a given queue entry, the method of operation terminates as shown. However, as each new queue entry comes in, it is checked against previous existing queue entries so an unmatched entry may become a matched entry as time progresses.

For matched queue entries, the queue entry correlation logic may automatically consolidate the queue entries if the network entity setting permit this process. Otherwise, the queue entry correlation logic will display a suggested consolidation on the emergency data manager portal GUI as shown in operation block 3011, and the emergency network entity operator can select whether to accept or reject the suggestion in decision block 3013. Whether the emergency network entity operator accepts or rejects the suggestion, in operation block 3015 the result is collected as machine learning training data so that the machine learning algorithm will learn which queue entries should be consolidated for future automation of the consolidation process.

Figure 31:
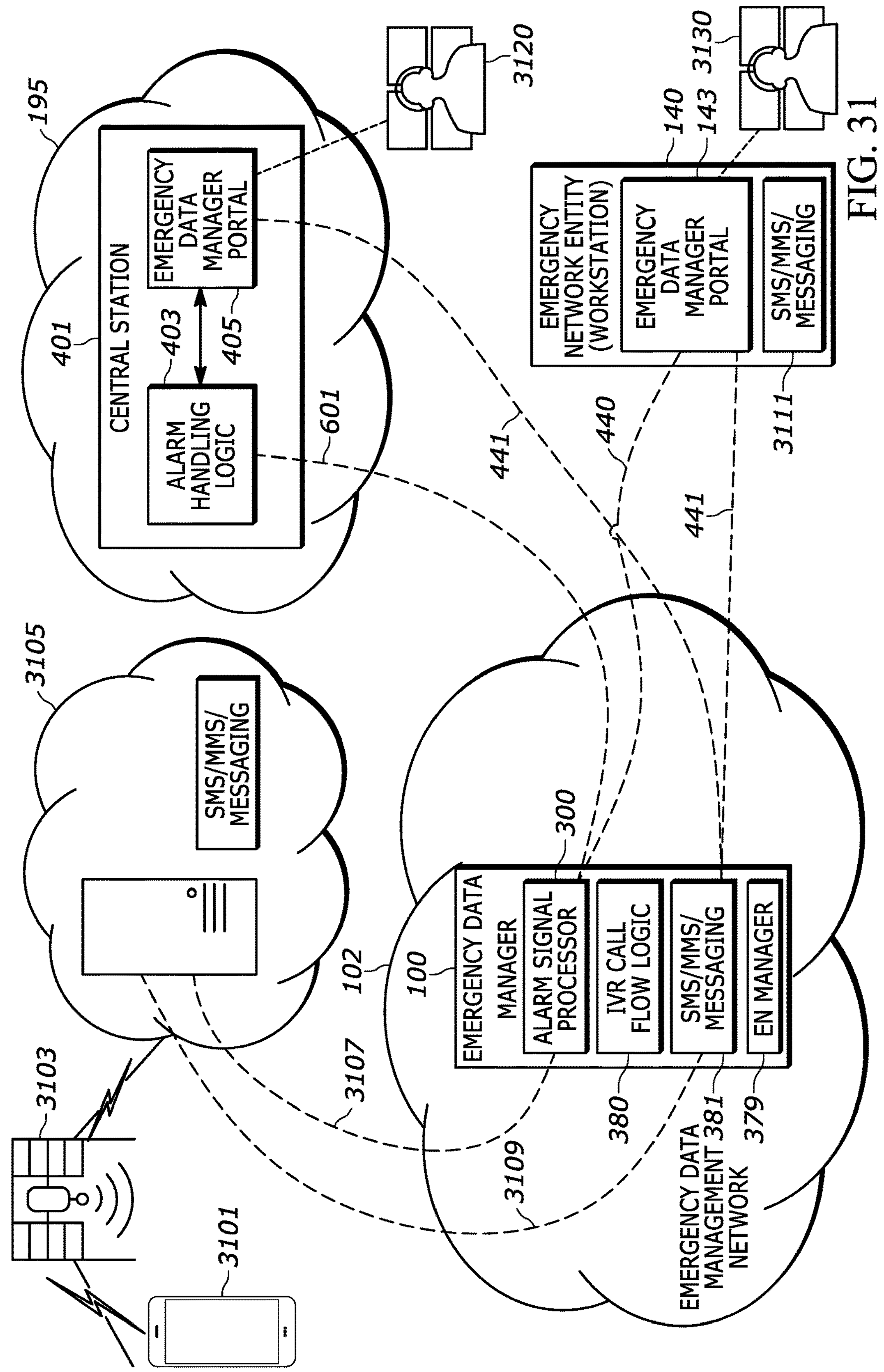
FIG. 31 is a diagram illustrating an emergency data manager in communication with an emergency network entity, and an emergency satellite system.

FIG. 31 is a diagram illustrating an emergency data manager in communication with an emergency network entity, and an emergency satellite system. In some embodiments, the emergency data manager 100 provides a direct connection between the emergency caller using mobile device 3101 and the emergency network entity 140 which may be a PSAP. If the mobile device 3101 is unable to place an emergency call using WiFi or cellular communication because it is outside the coverage area or if there is a system outage, the mobile device 3101 will provide the user with an option of using the emergency satellite system. The emergency satellite system includes satellite 3103 (and may include a number of satellites in the system) and a cloud-based platform 3105 that is operative to receive the satellite communication from the mobile device 3101. The cloud-based platform 3105 communicates with the emergency data manager 100 which may receive the communication as a text message, such as an SMS message, and may also enable direct voice or messaging from the mobile device 3101 directly to the emergency network via 911 services. In some implementations, the SMS message will be a data SMS message and will be decoded by the SMS/MMS/messaging client 381. In other embodiments, the message may be a rich communication services (RCS) message. There may be a data SMS that includes hybrid location data generated by the mobile device 3101 and other information such as a device identifier and other user identification information. There may be a data SMS message sent automatically when the user of mobile device 3101 initiates an emergency text message using the emergency satellite system. There may also be a user-initiated SMS message sent to the 911/emergency network entity 140. The emergency data manager 100 is operative to handle both of these types of SMS message, and sends pertinent emergency data from one or both SMS messages to the emergency data manager portal 143 displayed on the emergency network entity workstation 140. The emergency data being sent from the emergency data manger 100 to the emergency network entity 140 may provide a direct connection between the mobile device 3101 user in need of help and eliminates the need for an intermediary operator to handle the satellite-initiated emergency call. The emergency data manager 100 receives mobile device 3101 emergency data from the cloud-based platform 3105 which includes, but is not limited to, mobile device 3101 location data such as hybrid location data, or GPS location data, depending on the circumstances. When the mobile device 3101 initiates a satellite emergency call or text, the mobile device 3101 emergency data (including location) is sent to the emergency data manager 100 by the cloud-based platform 3105. The emergency data manager 100 then pushes the mobile device 3101 emergency data to the emergency data manager portal GUI 143 at the emergency network entity 140 (which may be, for example, a PSAP workstation).

Once the emergency network entity 140 receives the emergency data, the emergency network entity operator may proceed to dispatch emergency responders to the location of mobile device 3101 to assist the user. The emergency data manager 100 is also operative to send status to the mobile device 3101 via the emergency satellite system to verify that the emergency call is being handled and that help is on the way with an estimated time of arrival.

Figure 38:
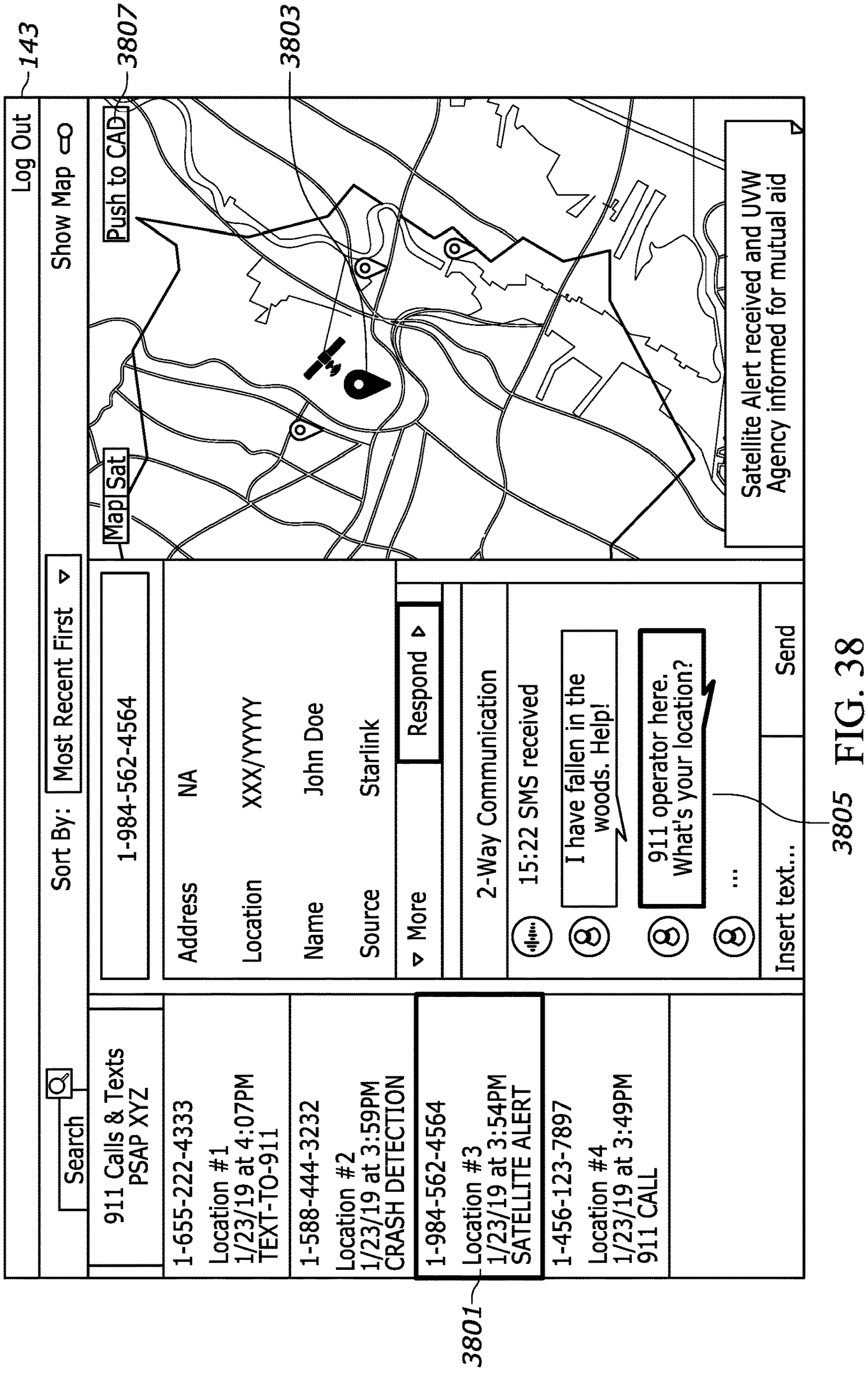
FIG. 38 is an example emergency data manager portal GUI when a satellite-initiated alert and text messaging are received.

The emergency data manager 100 provides a notification of the satellite-initiated emergency call within the alarm queue 1220 (or alert queue) as shown in FIG. 12 and FIG. 38 and facilitates a digital primary request for service and bi-directional messaging between the emergency network entity such as a PSAP, and an end-user or a monitoring user using mobile device 3101. Alerts from the emergency satellite system automatically populate in the alarms queue 1220 of the emergency data manager portal 143 and may also be pushed to the CAD interface. Location indicators are also shown on the map view within the emergency network's jurisdictional boundary. Each incident is explicitly accepted by a PSAP, and the alert contains all required information to dispatch with bi-directional messaging if the PSAP has additional questions. In one example implementation, if a PSAP telecommunicator 3130 does not accept or decline the alert within 30 seconds of the alert arriving, an agent (such as at central station 401 for example) will call the 911 center to ensure that the alert was received. This may be done via an IVR system or via a central station telecommunicator 3120.

Thus, in one example implementation, when a user of mobile device 3101 initiates an emergency message (such as an emergency call or an emergency text message) via the emergency satellite system, a key incident is pushed from the emergency data manager 100 to the emergency data manager portal 143 and the PSAP telecommunicator 3130 is given 30 seconds to accept the incident before they receive a call from an agent such as central station telecommunicator 3120. Location updates are also pushed to the map view as the mobile device 3101 changes position. The alert sound can be customized to distinguish it from other alarm types in the alarm queue 1220. The alert sound may repeat, for example, every 5 seconds for a total 30 second interval. The alert may also create a CAD incident. Thus, the satellite-initiated emergency call is integrated into the existing emergency network call queue just like a regular 911 call which simplifies the operations for the emergency network.

In situation where a PSAP does not have the capability to receive the emergency message (for example if the message is chat, rich communication services (RCS) message, etc.) then the messaging client 381 will establish communication link 3109 to set up communication with mobile device 3101 and the messaging will be facilitated by the emergency data manage portal GUI 143. An example of a messaging field 3805 is shown in FIG. 38. If the emergency network entity has a messaging capability 3111 it may receive certain messages directly from the cloud-based platform 3105.

Figure 32:
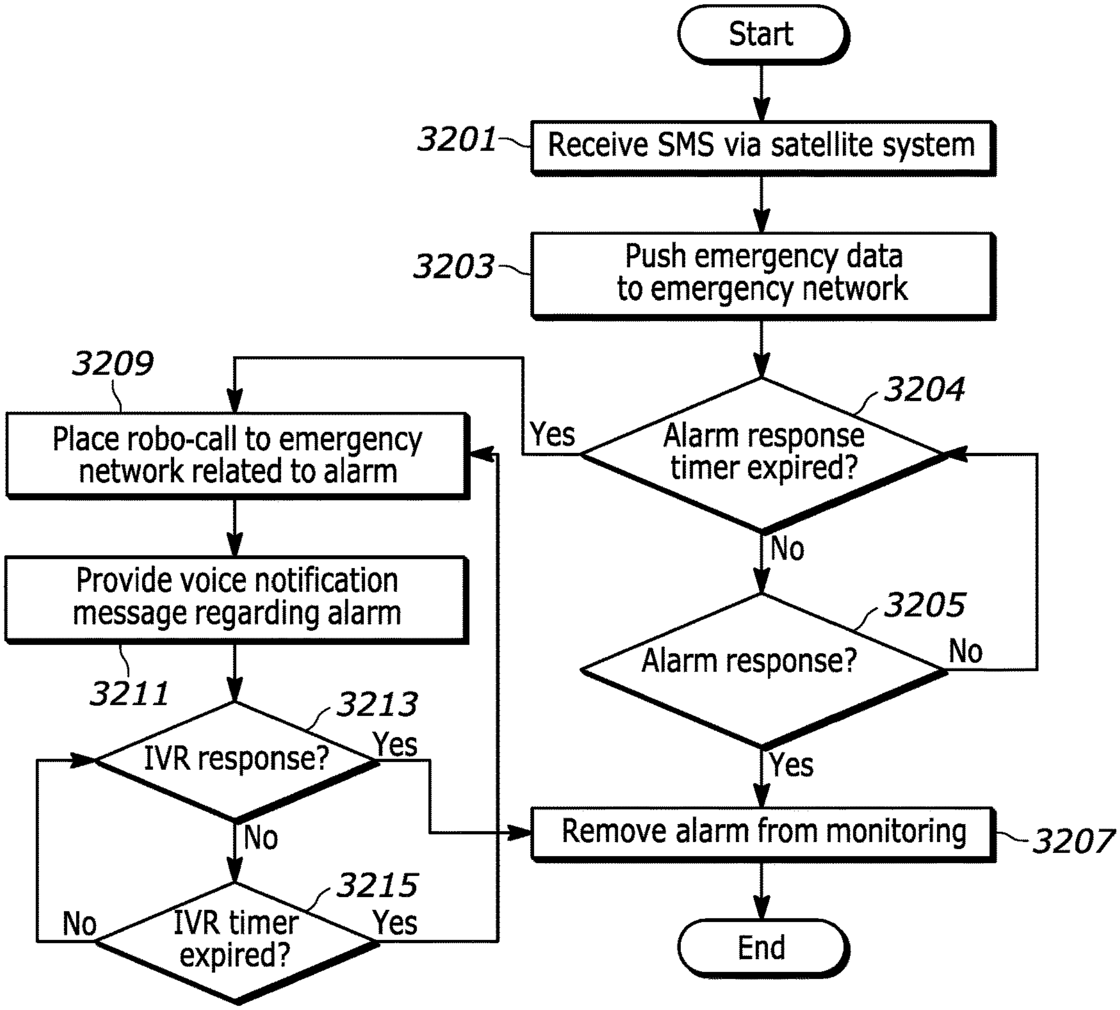
FIG. 32 is a flowchart showing a method of operation of an emergency data manager in conjunction with an emergency satellite system in accordance with various embodiments.

FIG. 32 is a flowchart showing a method of operation of an emergency data manager in conjunction with an emergency satellite system in accordance with various embodiments. In operation 3201, the emergency data manager 100 receives an SMS message from a mobile device, via the cloud-based platform 3105 and pushes emergency data associated with the SMS message to the emergency network entity in operation 3203. The flowchart of FIG. 32 is a method of operation that serves as a fail-safe to ensure that satellite-initiated alarms pushed to an emergency network entity are handled within a given period of time and not overlooked. The emergency network entity 140 operator can claim an alert in the alarm queue using the emergency data manager portal GUI 143. If an operator takes ownership of a satellite-initiated alert entry in the alarm queue, the emergency data manager 100 no longer monitors that entry. However, all other satellite-initiated alert queue entries are monitored until action is taken at the emergency network entity 140. In decision block 3205, the alarm signal processor 300 monitors satellite-initiated alerts in an emergency network entity's alarm queue to determine whether an operator has claimed the satellite-initiated alerts to take action. A fail-safe timer is set and monitored in decision block 3204 for each satellite-initiated alert in the alarm queue. In other words, monitoring each satellite-initiated alert requires associating each satellite-initiated alert with a timer, and then determining if an operator has performed an action on the satellite-initiated alert prior to expiration of the timer. When an operator selects the satellite-initiated alert from the alarm queue, this constitutes the operator performing an action and is an "alarm response" such that the timer is terminated and the satellite-initiated alert may be removed from monitoring. If an alarm response is not received at decision block 3205, then the process continues to monitor the time in decision block 3204. If a response to an satellite-initiated alert occurs at the emergency network entity in decision block 3205, then in operation block 3207 that particular satellite-initiated alert is removed from the monitoring list and the method of operation terminates as shown.

If the fail-safe timer expires at decision block 3204, then the process proceeds to operation block 3209 and the IVR call flow logic 380 places an IVR robo-call to the emergency network with a message related to the alarm. In some implementations, a call agent will place the call to the emergency network. In operation block 3211, an IVR message is provided upon the call being answered. For example, the IVR message may state "satellite-initiated alert ID 123456 generated at 3:00 PM has not been responded to at this time, please respond to satellite-initiated alert ID 123456" or something similar. The IVR system may prompt the call taker to respond with an acknowledgement, such as by pressing the "1" key.

If a response to the IVR message is not received in decision block 3213, then the IVR call flow logic 380 waits for a timer to expire in decision block 3215. If the fail-safe timer expires in decision block 3215, the process will return to operation block 3209 and the IVR call flow logic 380 will place another emergency call. This process will continue until an acknowledgement is received in decision block 3213. Once an IVR response is received in decision block 3213, it is understood that the emergency network entity operator is aware of the alarm and will handle it accordingly. Therefore, the process proceeds to operation block 3207 and the satellite-initiated alert is removed from the monitoring list and the method of operation terminates as shown.

The interval setting for the fail-safe timer may vary based on emergency type, emergency severity, characteristics of the emergency service provider such as estimated or expected response times, administrative input, etc. The fail-safe timer interval may be, for example, between five seconds to six-hundred seconds, one minute to thirty minutes, five minutes, ten minutes or some other timer interval, etc.

Figure 33:
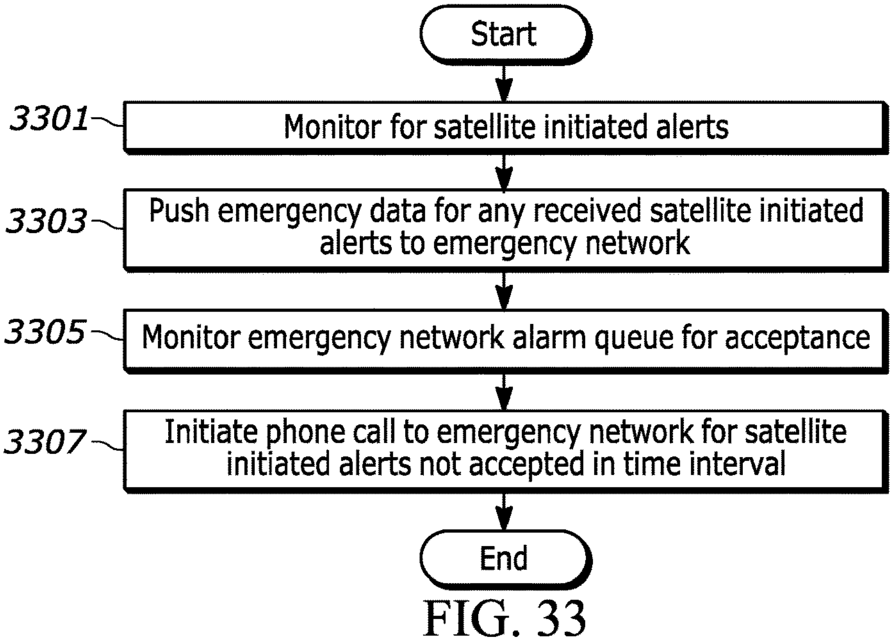
FIG. 33 is a flowchart showing a method of operation of an emergency data manager in conjunction with an emergency satellite system in accordance with various embodiments.

FIG. 33 is a flowchart showing a method of operation of an emergency data manager in conjunction with an emergency satellite system in accordance with various embodiments. In operation 3301 the emergency data manager monitors for satellite-initiated alerts. The satellite-initiated alerts may be received by the emergency data manager as one or more text messages such as a user-initiated text message, a data text message (such as a data SMS message) or a voice call. In operation 3303, the emergency data manager pushes emergency data associated with the satellite-initiated alerts to the emergency network that has the emergency caller located within its jurisdictional boundary. In some implementations, the type of emergency, nature/severity, available resources at the emergency network entity may be used to determine the appropriate emergency network entity to which the alert should be sent. In some implementations, the emergency data manger will perform a geofence analysis of the location data contained in the emergency message to determine to which emergency network the message should be pushed. In operation 3305, the emergency data manager monitors the alarm queue at the emergency data manager portal of the emergency network entity, to ensure that an operator explicitly accepts the satellite-initiated alert. The operator may accept the satellite-initiated alert via clicking on the alert with a mouse cursor, or via selecting acceptance in a dialog box similar to the dialog box 2605 shown in FIG. 26 having an accept or reject button. If an operator does not accept a satellite-initiated alert within a timeout period, for example 30 seconds, then in operation 3307 a phone call will be initiated to the emergency network to ensure that the satellite-initiated alert is handled. The phone call may be an IVR call in some implementations and may be a human initiated phone call in other implementations. In an alternative implementation, the operation 3307 will send a message, such as a text message, with the emergency network entity, which may prompt the agency to check their queue for the alert. In some implementations, a phone call and a text message are sent at the same time. In another alternative implementation, instead of the fail safe call or text, a two-way text session will be setup between an operator at the emergency network entity and an operator at the monitoring center and/or with the emergency caller (i.e. the user who placed the emergency call, sent an emergency text message or pushed a panic button on their mobile device or other device.

In remote areas, the quality of satellite connection may be interfered with by obstructions or shadowing such as tree foliage or other obstructions. If the emergency caller is outside of cellular or other radio coverage, the emergency satellite system is used to facilitate emergency text messaging or emergency phone calls. If the emergency satellite system cannot maintain a phone call, due to intermittence, obstructions, etc. emergency text messaging between the emergency caller and the emergency network entity may be the best alternative and may still be possible to facilitate through the emergency satellite system barring any complete obstruction or shadowing of the satellite connection between the mobile device and the satellite.

For satellite-initiated emergency calls or text messages, these will appear in the emergency data manager portal 143 in the message portion 1811 as was described with respect to FIG. 18. For example, a satellite-initiated emergency text message will appear in the message portion 1811 similar to the example message 1819.

Satellite-initiated emergency calls or text messages can be "claimed" as was described with respect to example message 1813. That is, indication "claimed" shows that the emergency has already been handled by either the emergency network entity operator viewing the message, or by another emergency network entity operator. Likewise, if an alert caused by a satellite-initiated emergency message is claimed by another emergency network entity operator, no further action is required and the present operator can proceed to handle other emergencies. Example message 1819 is a text message, such as an SMS message and is associated with location indicator 1805, which in the case of a satellite-initiated message would show the location of the emergency caller. The example message 1819 is also shown to have been handled as was described above regarding FIG. 18 operations.

Figure 19:
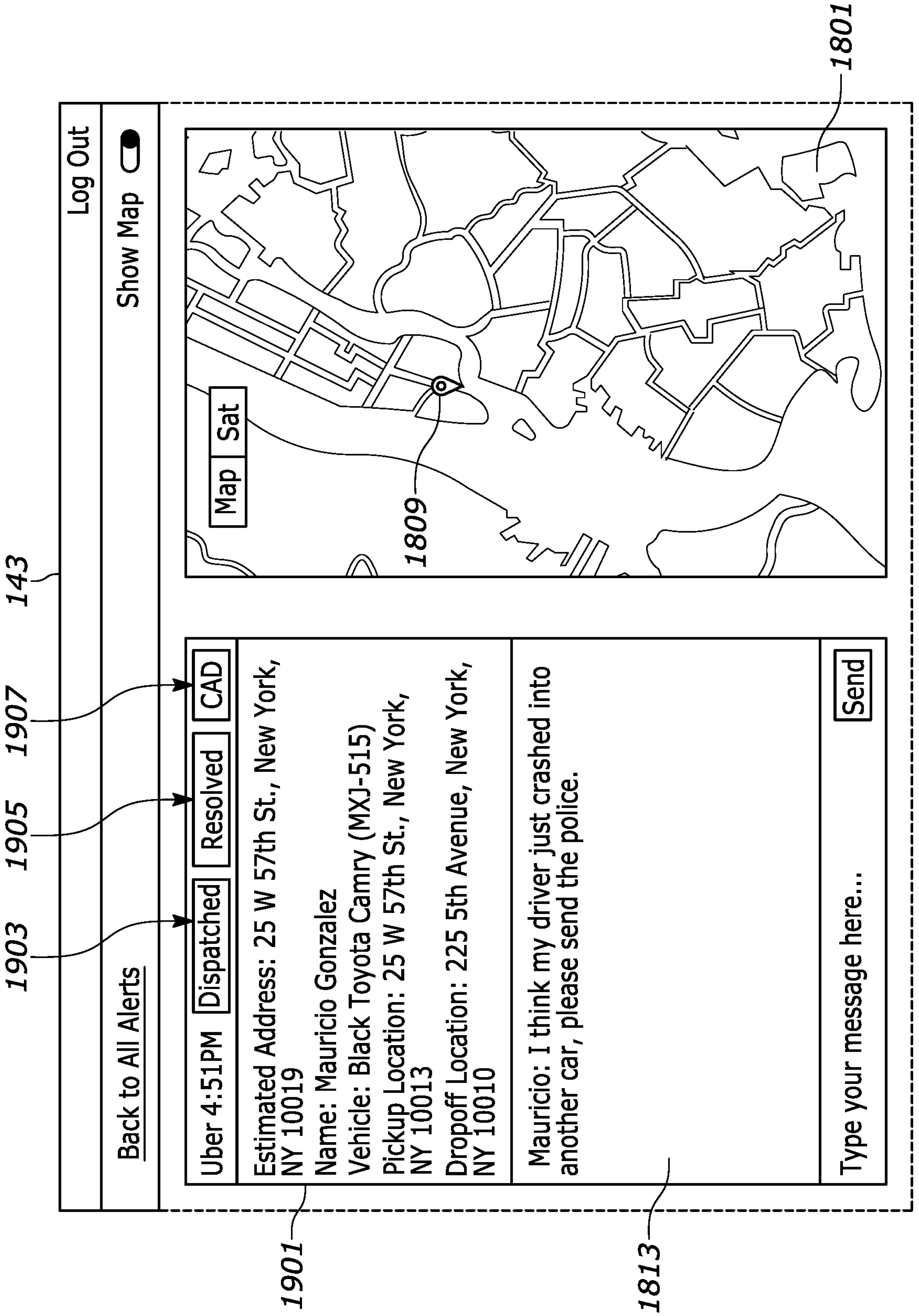
FIG. 19 is another example graphical user interface (GUI) displayed on an emergency network entity display in accordance with an embodiment.

Likewise, for satellite-initiated messages, when the emergency network entity operator claims one of the messages, more information can be obtained by clicking the mouse cursor on the message box to make a selection of that particular message box. For example, by selecting a satellite-initiated message, the emergency data manager portal GUI 143 provides a view such as shown in FIG. 19. The sole location indicator 1809 is then shown on the map portion 1801 and the message 1813 is displayed on the left-hand side below ride sharing information 1901. The emergency network entity operator may appropriately select a disposition for the emergency by selecting one of the soft buttons labeled "Dispatched" 1903, "Resolved" 1905 or "CAD" (computer aided dispatch) 1907 to send the item to a CAD emergency network entity operator. The current operator may also respond to the text message. Selecting "Back to All Alerts" would return to the previous emergency data manager portal GUI 143 view.

On the GUI 143, the operator may also initiate a CAD "incident" by selecting the "CAD" (computer aided dispatch) 1907 button. An example CAD workstation GUI 142 is shown in FIG. 20. The CAD GUI 142 provides details for the received event, and may also display a list of events 2003 and a list of available units 2005. For a satellite-initiated emergency, this will also show up in the list of events 2003.

As described previously with respect to operation of the CAD GUI 142 example provided in FIG. 20, each event in the list of events 2003 may have an associated event identifier ("event ID") which may be provided in an event ID column 2009. An event ID, which may also be referred to as an "event number," "incident ID" or "incident number" may also be shown in an event ID field 2007 that is specific to the event being displayed on the CAD GUI 142. In this example the event ID field 2007 shows an event ID for an incident/event related to the ride sharing information 2001. The emergency data manager 100 is operative to correlate emergency queue entry event IDs and to provide links to correlated event IDs in those correlated emergency queue entries. Thus, a satellite-initiated event may be pushed to the CAD system as a CAD incident.

Figure 34B:
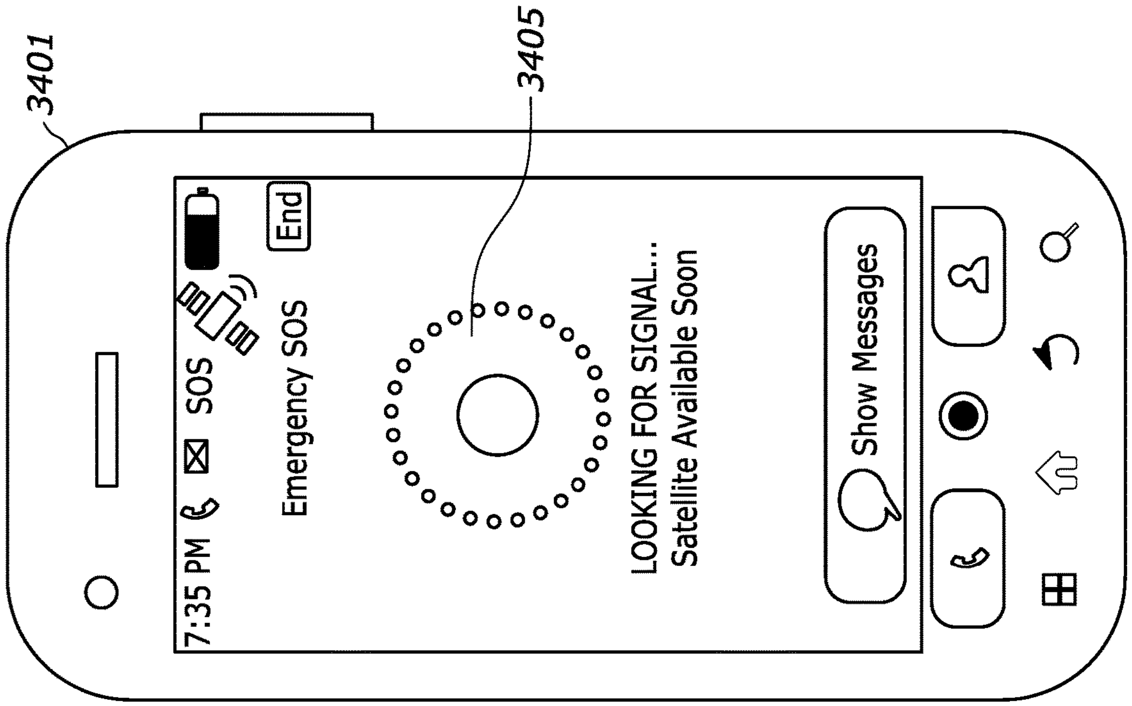
FIG. 34B is a diagram of the mobile device display screen shown in FIG. 3A, after the user has initiated satellite emergency communications and the mobile device is searching for a satellite connection.
Figure 34A:
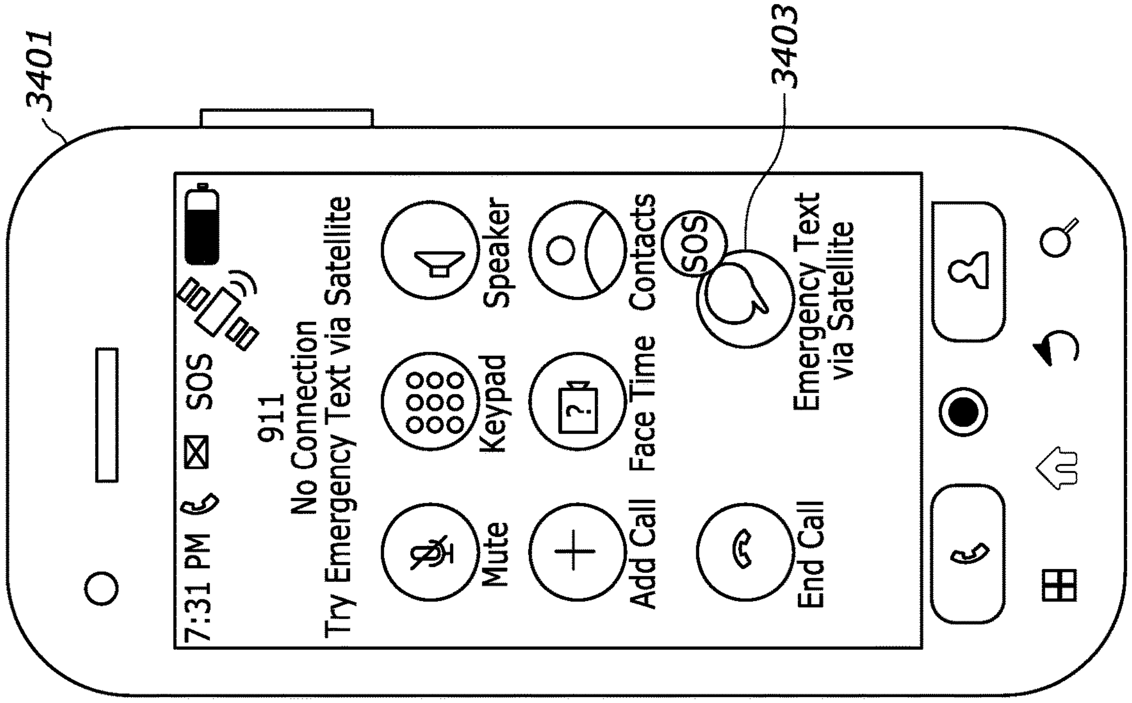
FIG. 34A is a diagram of a mobile device display screen during initiation of an emergency call in a situation where radio coverage is insufficient to place the emergency call.
Figure 34C:
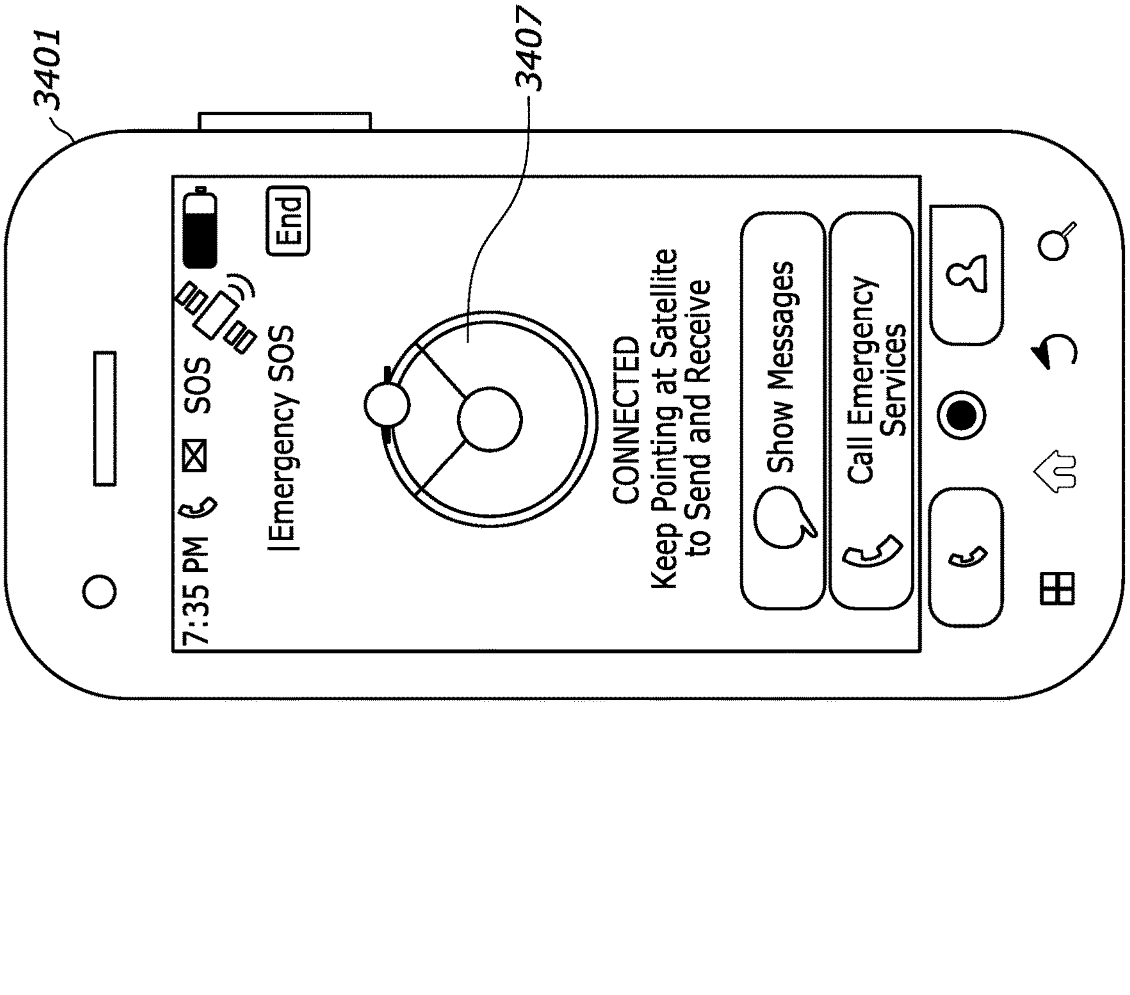
FIG. 34C is a diagram of the mobile device display screen shown in FIG. 3A and FIG. 3B, after the mobile device has established a satellite connection.

FIG. 34A, FIG. 34B and FIG. 34C are diagrams of a mobile device 3401 display screen during initiation of an emergency call in a situation where radio coverage is insufficient to place the emergency call. The mobile device 3401 includes an app 3403 for sending an emergency text via satellite. FIG. 34B show the mobile device display screen after the user has initiated satellite emergency communications and the mobile device is searching for a satellite connection. A searching indicator 3405 is displayed to inform the user that the mobile device 3401 is attempting to establish a satellite connection. FIG. 34C shows the mobile device 3401 display screen after the mobile device 3401 has established a satellite connection, and a connection indicator 3407 is displayed.

Figure 35A:
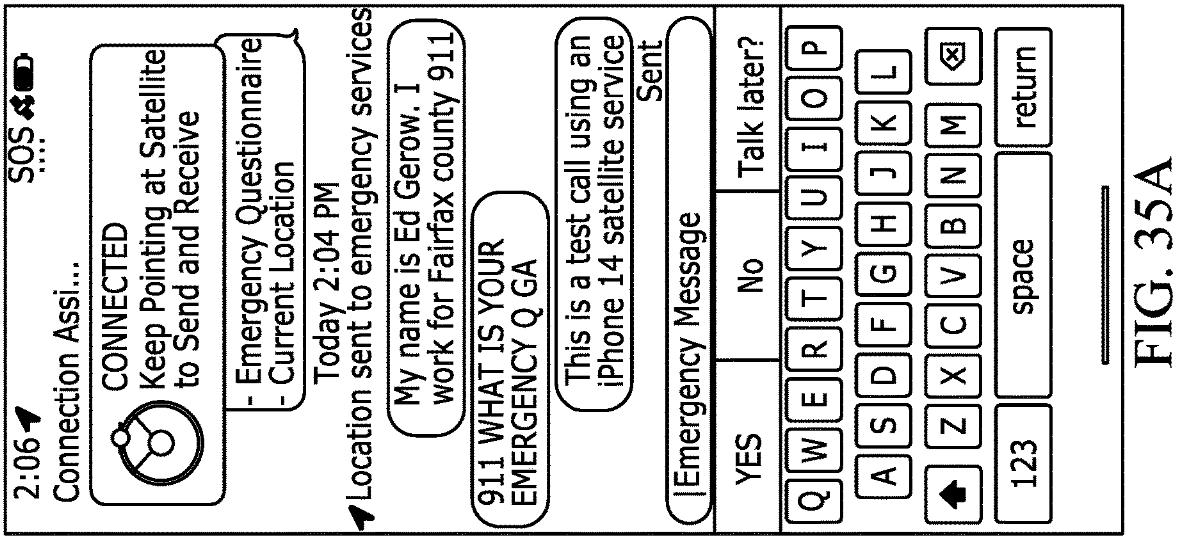
FIG. 35A is a diagram of a mobile device display screen showing a text message interchange, when an initial satellite connection has been established, between a user and a PSAP during testing of the herein disclosed emergency satellite communication apparatuses, systems, and methods.
Figure 35B:
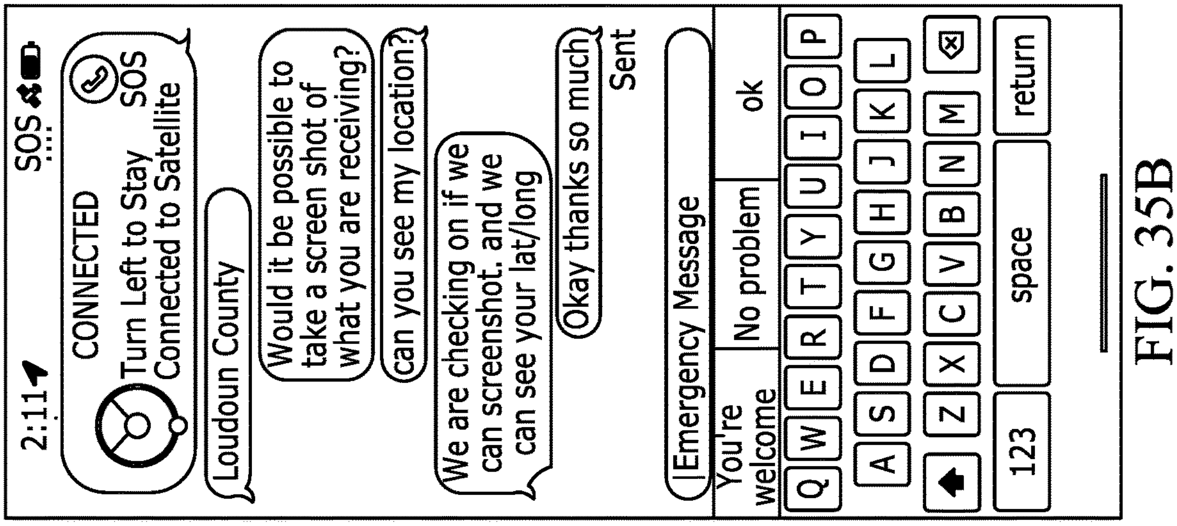
FIG. 35B is a diagram of a mobile device display screen shown in FIG. 35A, showing a further text message interchange, during testing of the herein disclosed emergency satellite communication apparatuses, systems, and methods.
Figure 35C:
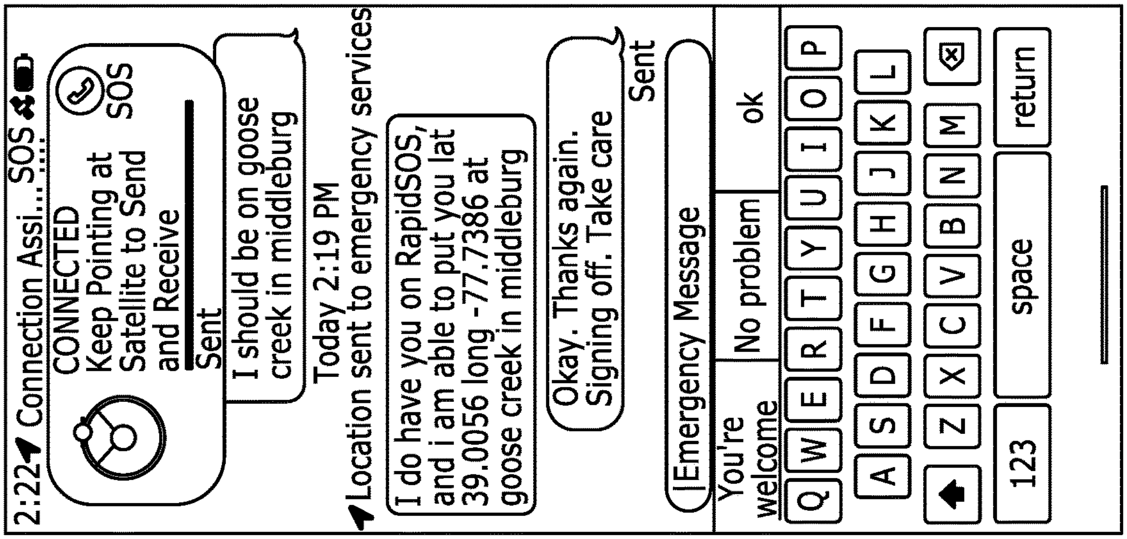
FIG. 35C is a diagram of a mobile device display screen shown in FIG. 35A and FIG. 35B, showing a further text message interchange during testing of the herein disclosed emergency satellite communication apparatuses, systems, and methods, and confirm receipt of location information at the PSAP.
Figure 35D:
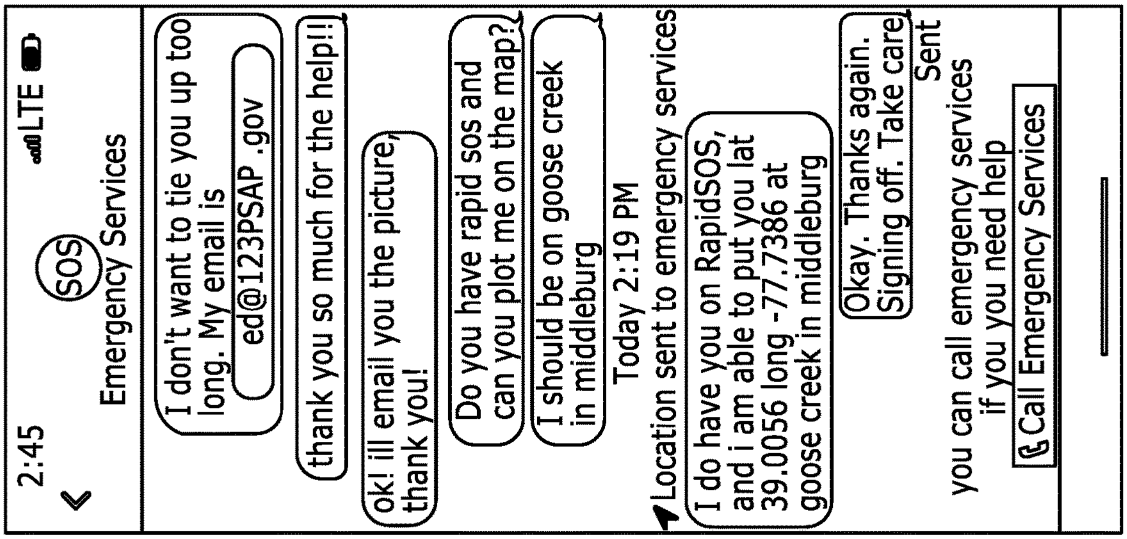
FIG. 35D is a diagram of a mobile device display screen shown in FIG. 35A, FIG. 35B, and FIG. 35C showing a further text message interchange during testing of the herein disclosed emergency satellite communication apparatuses, systems, and methods, and termination of the test.

FIG. 35A, FIG. 35B, FIG. 35C and FIG. 35D are diagrams of a mobile device display screen showing a text message interchange while a system test was conducted. In FIG. 35A after an initial satellite connection was established between the test caller and a PSAP, the test caller informed the PSAP operator that the text was for a test being conducted. In FIG. 35B and FIG. 35C, the test caller is asking the PSAP operator to confirm that the test caller's location is being provided and displayed on the emergency data manager portal GUI 143, and the PSAP operator confirmed that the location was being received and displayed. In FIG. 35D the PSAP operator confirms the test caller's location and the test is terminated.

Figure 36:
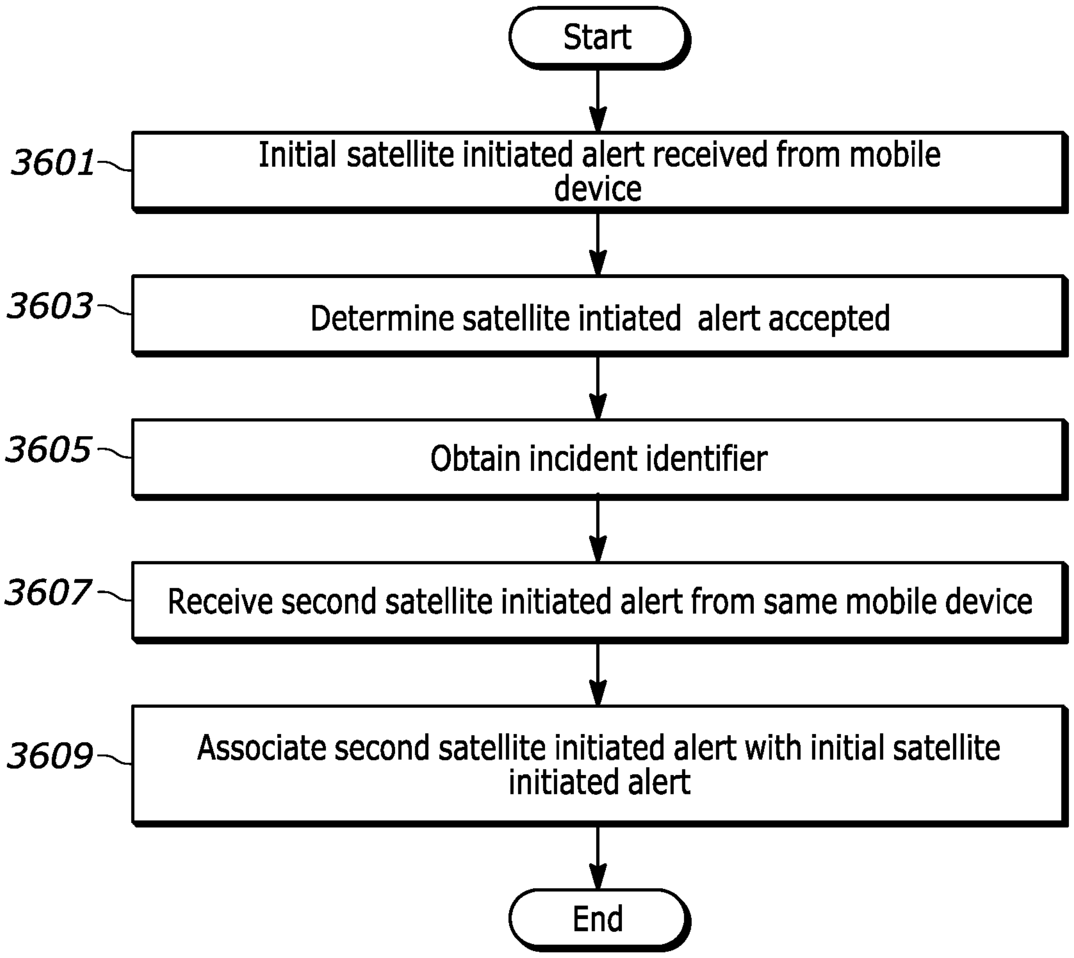
FIG. 36 is a flowchart showing a method of operation of an emergency data manager in conjunction with an emergency satellite system in accordance with various embodiments.

FIG. 36 is a flowchart showing a method of operation of an emergency data manager in conjunction with an emergency satellite system in accordance with various embodiments. With reference to FIG. 31, the method of operation begins and at operation 3601 the mobile device 3101 initiates a satellite emergency call or emergency text via a connection with satellite 3103. The emergency data manager 100 receives an alert from the cloud-based platform 3105 via communications link 3107. The alert is provided to the emergency data manager portal GUI 143 and displayed in the alert queue. When an emergency network operator accepts the alert, by the mechanisms described previously above, the emergency data manager 100 determines, as at operation 3603, that the alert was accepted. The emergency network operator may also send the incident to CAD, which creates a CAD incident having a unique incident ID. The emergency data manager 100 obtains the incident ID at operation 3605. In some situations, the emergency caller may lose their initial satellite connection and may have to reestablish their connection. They may also move and change their location. In the case of lost connection, the emergency data manager 100 may receive a second alert from the same mobile device at operation 3607. In that case, the emergency data manager 100 will associate the newly received alert with the previous alert at operation 3609. The emergency data manager portal GUI 143 will show an association of the alerts, either by a visual distinction, grouping them together in the queue, using the incident ID, etc. The emergency data manager 100 may also send any new or updated information, such as the mobile device location, to the CAD system record using the incident ID such that the correct CAD record is populated with the updated information.

Figure 37:
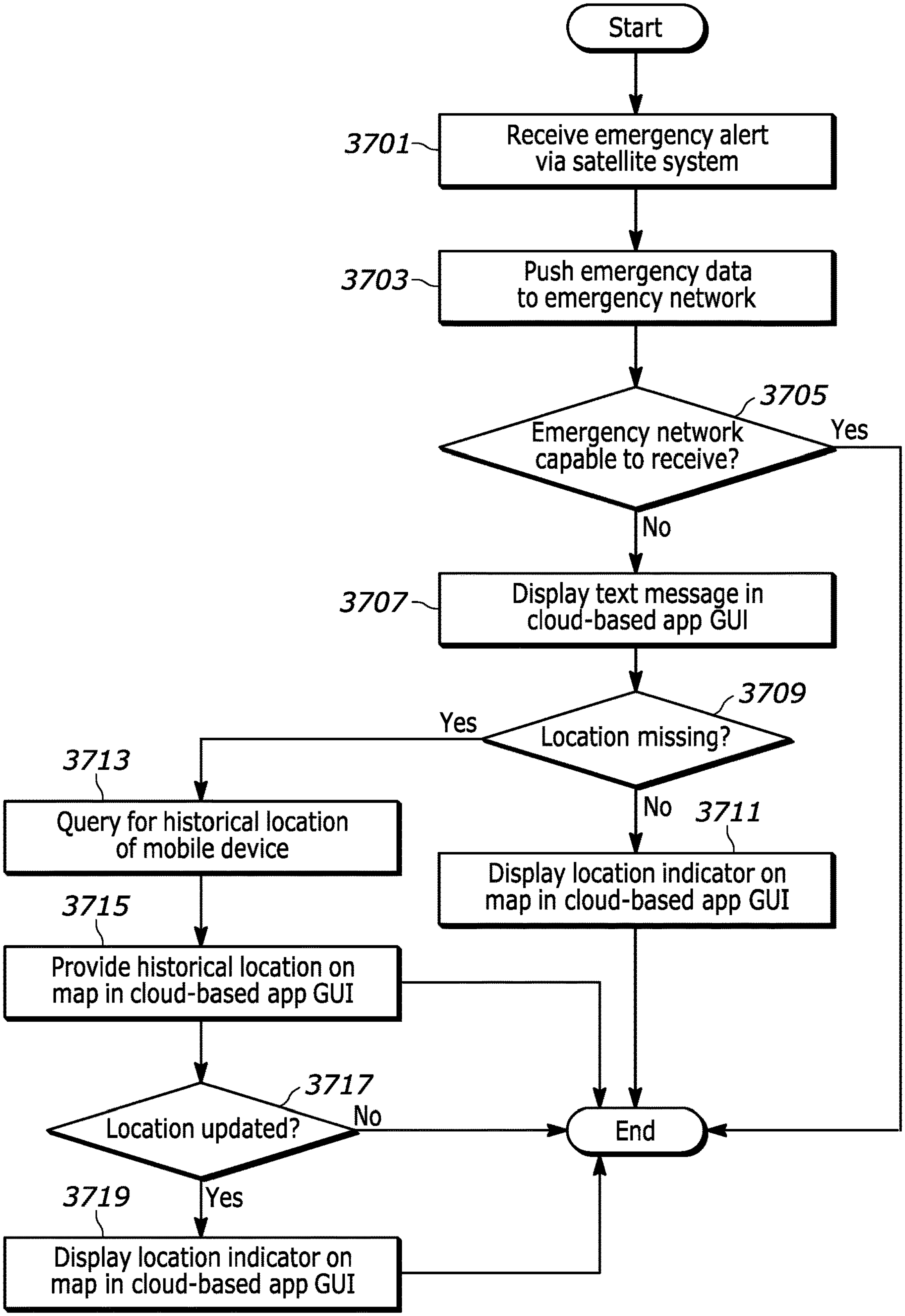
FIG. 37 is a flowchart showing a method of operation of an emergency data manager in conjunction with an emergency satellite system in accordance with various embodiments.

FIG. 37 is a flowchart showing a method of operation of an emergency data manager in conjunction with an emergency satellite system in accordance with various embodiments. With reference to FIG. 31, the method of operation begins and at operation 3701 the emergency data manager 100 receives an alert via the cloud-based platform 3105 in response to the mobile device 3101 initiating a satellite emergency call or emergency text via a connection with satellite 3103. At operation 3703, the alert is provided to the emergency data manager portal GUI 143 and displayed in the alert queue. In the case of emergency text messages, at decision 3705, the emergency data manager 100 determines if the specific emergency network to which the message should be directed is capable to receive the communication. For example, if the communication is being sent as a rich communication services (RCS) message, the particular emergency network may not be able to receive the message. In that case, at operation 3707, the emergency data manager 100 will display the message in the emergency data manager portal GUI 143. An example of this is shown in FIG. 38.

FIG. 38 is an example emergency data manager portal GUI 143 when a satellite-initiated alert and text messaging are received. The alert shows up as alert queue entry 3801, and a corresponding location indicator 3803 may be displayed in the map section. The text messages of operation 3707 may be displayed in a communication field 3805. The emergency network operator may also create a CAD incident using the "Push to CAD" button 3807.

Returning to FIG. 37, at decision 3709, the emergency data manager 100 may check if location information was received. If the location information is not missing, then at operation 3711 the location will be displayed and a location indicator 3803 will be displayed in the map section. However, if location information is missing at decision 3709, then at operation 3713 the emergency data manager 100 may query the cloud-based platform 3105 and try to obtain a historical location for the mobile device 3101. Having the historical location may at least provide an initial perimeter that emergency responders may begin to search for the emergency caller. At operation 3715, the historical location is provided in the emergency data manager portal GUI 143 with an appropriate indication that it is historical location only.

At decision 3717, the emergency data manager 100 may check for a location update. If none, then the method ends as shown. However, if location information is received at decision 3717, then at operation 3719 a location indicator 3803 will be displayed on the map section.

If the emergency network operator creates a CAD incident using the Push to CAD button 3807, then the emergency data manager 100 will obtain the incident ID for reference and use it to provide any updates or to associate future emergency call or emergency texts from the same mobile device with the correct incident ID to update the correct incident record.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method comprising:

receiving a satellite-initiated alert, the satellite-initiated alert sent from a mobile device;

pushing emergency data associated with the satellite-initiated alert to an emergency network entity comprising mobile device location data;

providing a cloud-application graphical user interface to the emergency network entity as an instance of the cloud-application;

displaying the satellite-initiated alert in an alert queue of the cloud-application graphical user interface; and initiating a call to the emergency network if no acceptance input for the satellite-initiated alert is received within a timeout period.

2. The method of claim 1, further comprising:

monitoring the satellite-initiated alert at the cloud-application graphical user interface for an acceptance input indicating acceptance of the satellite-initiated alert.

3. The method of claim 1, further comprising:

receiving location information from the mobile device.

4. The method of claim 1, further comprising:

receiving location information from the mobile device via the satellite-initiated alert.

5. The method of claim 1, further comprising:

receiving the satellite-initiated alert as a text message from the mobile device, sent from the mobile device using a satellite communications link.

6. The method of claim 1, further comprising:

establishing a text messaging session between the mobile device and the emergency network entity, using a satellite communication link; and receiving the satellite-initiated alert at a cloud-based server, the cloud-based server providing the cloud-application graphical user interface to the emergency network entity.

7. The method of claim 1, further comprising:

receiving the satellite-initiated alert at a cloud-based server, the cloud-based server providing the cloud-application graphical user interface to the emergency network entity;

determining that the satellite-initiated alert does not contain location data for the mobile device; and sending a query from the cloud-based server to obtain a historical location of the mobile device.

8. The method of claim 7, further comprising:

pushing the historical location of the mobile device to the cloud-application graphical user interface, to establish a search perimeter for user of the mobile device.

* * * * *